US009113207B2

(12) United States Patent
Schein et al.

(10) Patent No.: US 9,113,207 B2
(45) Date of Patent: Aug. 18, 2015

(54) SYSTEMS AND METHODS FOR CONTEXTUALLY LINKING TELEVISION PROGRAM INFORMATION

(75) Inventors: Steven M. Schein, Menlo Park, CA (US); Sean A. O'Brien, San Jose, CA (US); James J. Leftwich, Palo Alto, CA (US); Susan Broughton, Tracy, CA (US)

(73) Assignee: ROVI GUIDES, INC., Santa Clara, CA (US)

( * ) Notice: Subject to any disclaimer, the term of this patent is extended or adjusted under 35 U.S.C. 154(b) by 0 days.

(21) Appl. No.: 13/082,178

(22) Filed: Apr. 7, 2011

(65) Prior Publication Data
US 2011/0185387 A1 Jul. 28, 2011

Related U.S. Application Data

(63) Continuation of application No. 11/894,782, filed on Aug. 20, 2007, now abandoned, which is a continuation of application No. 10/725,170, filed on Dec. 1, 2003, now abandoned, which is a continuation
(Continued)

(51) Int. Cl.
*H04N 5/445* (2011.01)
*H04N 21/443* (2011.01)
(Continued)

(52) U.S. Cl.
CPC ....... *H04N 21/4435* (2013.01); *H04N 5/44543* (2013.01); *H04N 5/782* (2013.01); *H04N 7/08* (2013.01); *H04N 7/0884* (2013.01); *H04N 7/165* (2013.01); *H04N 21/2362* (2013.01); *H04N 21/25891* (2013.01); *H04N 21/2625* (2013.01);
(Continued)

(58) Field of Classification Search
CPC .................................... H04N 21/4532
USPC ....................................... 725/46, 47
See application file for complete search history.

(56) References Cited

U.S. PATENT DOCUMENTS 3,492,577 A 1/1970 Reiter et al.
3,493,674 A 2/1970 Houghton
(Continued)

FOREIGN PATENT DOCUMENTS

AU 731010 7/1998
AU 733993 2/1999
(Continued)

OTHER PUBLICATIONS

Brugliera, Vito, "Digital OnScreen Display: A New Technology for the Consumer Interface" (Jun. 1993).
(Continued)

*Primary Examiner* — Olugbenga Idowu
(74) *Attorney, Agent, or Firm* — Ropes & Gray LLP

(57) ABSTRACT

The present invention provides systems and methods for providing television schedule information to a viewer, and for allowing the viewer to link, search, select and interact with information in a remote database, e.g., a database on the internet. The television schedule information can be displayed on a variety of viewer interfaces, such as televisions screens, computer monitors, PCTV screens and the like. The television schedule information may be stored on the viewer's computer, television, PCTV, or a remote server (e.g., a website), or the television schedule information may be downloaded from a remote database to the viewer's computer, television or PCTV.

24 Claims, 32 Drawing Sheets

Related U.S. Application Data of application No. 08/837,298, filed on Apr. 11, 1997, now Pat. No. 6,732,369.

(60) Provisional application No. 60/022,826, filed on Jul. 26, 1996, provisional application No. 60/015,648, filed on Apr. 19, 1996.

(51) Int. Cl.

| | |
|---|---|
| H04N 5/782 | (2006.01) |
| H04N 7/08 | (2006.01) |
| H04N 7/088 | (2006.01) |
| H04N 7/16 | (2011.01) |
| H04N 21/2362 | (2011.01) |
| H04N 21/258 | (2011.01) |
| H04N 21/262 | (2011.01) |
| H04N 21/4143 | (2011.01) |
| H04N 21/4227 | (2011.01) |
| H04N 21/433 | (2011.01) |
| H04N 21/434 | (2011.01) |
| H04N 21/442 | (2011.01) |
| H04N 21/45 | (2011.01) |
| H04N 21/458 | (2011.01) |
| H04N 21/462 | (2011.01) |
| H04N 21/472 | (2011.01) |
| H04N 21/475 | (2011.01) |
| H04N 21/478 | (2011.01) |
| H04N 21/4782 | (2011.01) |
| H04N 21/4786 | (2011.01) |
| H04N 21/482 | (2011.01) |
| H04N 21/81 | (2011.01) |
| H04N 21/84 | (2011.01) |
| H04N 21/858 | (2011.01) |
| H04N 5/45 | (2011.01) |
| H04N 5/775 | (2006.01) |
| H04N 21/422 | (2011.01) |
| H04N 21/431 | (2011.01) |
| H04N 21/47 | (2011.01) |

(52) U.S. Cl.
CPC ..... *H04N 21/26266* (2013.01); *H04N 21/4143* (2013.01); *H04N 21/4227* (2013.01); *H04N 21/4332* (2013.01); *H04N 21/4334* (2013.01); *H04N 21/4345* (2013.01); *H04N 21/44222* (2013.01); *H04N 21/458* (2013.01); *H04N 21/4532* (2013.01); *H04N 21/4622* (2013.01); *H04N 21/4753* (2013.01); *H04N 21/4755* (2013.01); *H04N 21/4782* (2013.01); *H04N 21/4786* (2013.01); *H04N 21/47202* (2013.01); *H04N 21/47214* (2013.01); *H04N 21/47815* (2013.01); *H04N 21/4821* (2013.01); *H04N 21/4828* (2013.01); *H04N 21/812* (2013.01); *H04N 21/8133* (2013.01); *H04N 21/84* (2013.01); *H04N 21/8586* (2013.01); *H04N 5/45* (2013.01); *H04N 5/775* (2013.01); *H04N 21/42204* (2013.01); *H04N 21/4316* (2013.01); *H04N 21/47* (2013.01)

(56) References Cited

U.S. PATENT DOCUMENTS

| | | |
|---|---|---|
| 3,729,581 A | 4/1973 | Anderson |
| 3,833,757 A | 9/1974 | Kirk, Jr. et al. |
| 3,936,868 A | 2/1976 | Thorpe |
| 3,996,583 A | 12/1976 | Hutt et al. |
| 4,004,085 A | 1/1977 | Makino et al. |
| 4,016,361 A | 4/1977 | Pandey et al. |
| 4,024,401 A | 5/1977 | Bernstein et al. |
| 4,026,555 A | 5/1977 | Kirschner et al. |
| 4,031,548 A | 6/1977 | Kato et al. |
| 4,052,719 A | 10/1977 | Hutt et al. |
| 4,058,830 A | 11/1977 | Guinet et al. |
| 4,079,419 A | 3/1978 | Siegle et al. |
| 4,081,753 A | 3/1978 | Miller |
| 4,096,524 A | 6/1978 | Scott et al. |
| 4,134,127 A | 1/1979 | Campioni et al. |
| 4,139,860 A | 2/1979 | Micic et al. |
| 4,150,254 A | 4/1979 | Schussler et al. |
| 4,156,850 A | 5/1979 | Beyers, Jr. |
| 4,161,728 A | 7/1979 | Insam et al. |
| 4,162,513 A | 7/1979 | Beyers, Jr. et al. |
| 4,170,782 A | 10/1979 | Miller |
| 4,186,413 A | 1/1980 | Mortimer |
| 4,203,130 A | 5/1980 | Doumit et al. |
| 4,205,343 A | 5/1980 | Barrett et al. |
| 4,218,698 A | 8/1980 | Bart et al. |
| 4,228,543 A | 10/1980 | Jackson |
| 4,231,031 A | 10/1980 | Crowther et al. |
| 4,233,628 A | 11/1980 | Ciciora |
| 4,249,211 A | 2/1981 | Baba et al. |
| 4,249,213 A | 2/1981 | Imaide et al. |
| 4,261,006 A | 4/1981 | Weintraub et al. |
| 4,264,924 A | 4/1981 | Freeman |
| 4,264,925 A | 4/1981 | Freeman et al. |
| 4,270,145 A | 5/1981 | Farina et al. |
| 4,271,532 A | 6/1981 | Wine |
| 4,276,597 A | 6/1981 | Dissly et al. |
| 4,280,148 A | 7/1981 | Saxena |
| 4,283,787 A | 8/1981 | Chambers et al. |
| 4,288,809 A | 9/1981 | Yabe |
| 4,290,142 A | 9/1981 | Schnee et al. |
| 4,305,101 A | 12/1981 | Yarbrough et al. |
| 4,331,974 A | 5/1982 | Cogswell et al. |
| 4,337,480 A | 6/1982 | Bourassin et al. |
| 4,337,483 A | 6/1982 | Guillou et al. |
| 4,344,090 A | 8/1982 | Belisomi et al. |
| 4,367,559 A | 1/1983 | Tults |
| 4,375,651 A | 3/1983 | Templin et al. |
| 4,381,522 A | 4/1983 | Lambert |
| 4,388,645 A | 6/1983 | Cox et al. |
| 4,390,901 A | 6/1983 | Keiser |
| 4,393,376 A | 7/1983 | Thomas |
| 4,405,946 A | 9/1983 | Knight |
| 4,412,244 A | 10/1983 | Shanley, II |
| 4,413,281 A | 11/1983 | Thonnart et al. |
| 4,420,769 A | 12/1983 | Novak |
| 4,425,579 A | 1/1984 | Merrell |
| 4,425,581 A | 1/1984 | Schweppe et al. |
| 4,429,385 A | 1/1984 | Cichelli et al. |
| 4,439,784 A | 3/1984 | Furukawa et al. |
| 4,449,249 A | 5/1984 | Price |
| 4,456,925 A | 6/1984 | Skerlos et al. |
| 4,466,017 A | 8/1984 | Banker |
| 4,477,830 A | 10/1984 | Lindman et al. |
| 4,488,179 A | 12/1984 | Kru/ger et al. |
| 4,495,654 A | 1/1985 | Deiss |
| 4,496,171 A | 1/1985 | Cherry |
| 4,496,976 A | 1/1985 | Swanson et al. |
| 4,510,623 A | 4/1985 | Bonneau et al. |
| 4,520,404 A | 5/1985 | Von Kohorn |
| 4,523,228 A | 6/1985 | Banker |
| 4,527,194 A | 7/1985 | Sirazi |
| 4,531,020 A | 7/1985 | Wechselberger et al. |
| 4,533,910 A | 8/1985 | Sukonick et al. |
| 4,536,791 A | 8/1985 | Campbell et al. |
| 4,547,804 A | 10/1985 | Greenberg |
| 4,554,584 A | 11/1985 | Elam et al. |
| 4,555,775 A | 11/1985 | Pike |
| 4,566,034 A | 1/1986 | Harger et al. |
| 4,573,072 A | 2/1986 | Freeman |
| 4,587,520 A | 5/1986 | Astle |
| 4,595,951 A | 6/1986 | Filliman |
| 4,595,952 A | 6/1986 | Filliman |
| 4,598,288 A | 7/1986 | Yarbrough et al. |
| 4,602,279 A | 7/1986 | Freeman |
| 4,605,964 A | 8/1986 | Chard |

(56) References Cited

U.S. PATENT DOCUMENTS

| | | |
|---|---|---|
| 4,605,973 A | 8/1986 | Von Kohorn |
| 4,620,229 A | 10/1986 | Amano et al. |
| 4,622,545 A | 11/1986 | Atkinson |
| 4,625,080 A | 11/1986 | Scott |
| 4,635,109 A | 1/1987 | Comeau |
| 4,635,121 A | 1/1987 | Hoffman et al. |
| 4,641,205 A | 2/1987 | Beyers, Jr. |
| 4,677,466 A | 6/1987 | Lert, Jr. et al. |
| 4,685,131 A | 8/1987 | Horne |
| 4,689,022 A | 8/1987 | Peers et al. |
| 4,691,351 A | 9/1987 | Hayashi et al. |
| 4,694,490 A | 9/1987 | Harvey et al. |
| 4,701,794 A | 10/1987 | Froling et al. |
| 4,704,725 A | 11/1987 | Harvey et al. |
| 4,706,121 A | 11/1987 | Young |
| 4,712,105 A | 12/1987 | Kohler |
| 4,718,107 A | 1/1988 | Hayes |
| RE32,632 E | 3/1988 | Atkinson |
| 4,745,549 A | 5/1988 | Hashimoto |
| 4,748,618 A | 5/1988 | Brown et al. |
| 4,750,036 A | 6/1988 | Martinez |
| 4,750,213 A | 6/1988 | Novak |
| 4,751,578 A | 6/1988 | Reiter et al. |
| 4,754,326 A | 6/1988 | Kram et al. |
| 4,761,684 A | 8/1988 | Clark et al. |
| 4,768,228 A | 8/1988 | Clupper et al. |
| 4,772,882 A | 9/1988 | Mical |
| 4,775,935 A | 10/1988 | Yourick |
| 4,785,408 A | 11/1988 | Britton et al. |
| 4,787,063 A | 11/1988 | Muguet |
| 4,812,834 A | 3/1989 | Wells |
| 4,814,883 A | 3/1989 | Perine et al. |
| 4,821,102 A | 4/1989 | Ichikawa et al. |
| 4,821,211 A | 4/1989 | Torres |
| 4,829,558 A | 5/1989 | Welsh |
| 4,847,604 A | 7/1989 | Doyle |
| 4,847,700 A | 7/1989 | Freeman |
| 4,857,999 A | 8/1989 | Welsh |
| 4,862,268 A | 8/1989 | Campbell et al. |
| 4,864,429 A | 9/1989 | Eigeldinger et al. |
| 4,873,623 A | 10/1989 | Lane et al. |
| 4,882,732 A | 11/1989 | Kaminaga |
| 4,884,223 A | 11/1989 | Ingle et al. |
| 4,888,796 A | 12/1989 | Olivo, Jr. |
| 4,890,320 A | 12/1989 | Monslow et al. |
| 4,890,321 A | 12/1989 | Seth-Smith et al. |
| 4,894,789 A | 1/1990 | Yee |
| 4,899,136 A | 2/1990 | Beard et al. |
| 4,905,094 A | 2/1990 | Pocock et al. |
| 4,908,707 A | 3/1990 | Kinghorn |
| 4,908,713 A | 3/1990 | Levine |
| 4,908,859 A | 3/1990 | Bennett et al. |
| 4,914,517 A | 4/1990 | Duffield |
| 4,914,732 A | 4/1990 | Henderson et al. |
| 4,930,158 A | 5/1990 | Vogel |
| 4,930,160 A | 5/1990 | Vogel |
| 4,931,783 A | 6/1990 | Atkinson |
| 4,937,821 A | 6/1990 | Boulton |
| 4,937,863 A | 6/1990 | Robert et al. |
| 4,939,507 A | 7/1990 | Beard et al. |
| 4,959,719 A | 9/1990 | Strubbe et al. |
| 4,959,720 A | 9/1990 | Duffield et al. |
| 4,963,994 A | 10/1990 | Levine |
| 4,965,825 A | 10/1990 | Harvey et al. |
| 4,977,455 A | 12/1990 | Young |
| 4,987,486 A | 1/1991 | Johnson et al. |
| 4,991,011 A | 2/1991 | Johnson et al. |
| 4,991,012 A | 2/1991 | Yoshino |
| 4,992,940 A | 2/1991 | Dworkin |
| 4,995,078 A | 2/1991 | Monslow et al. |
| 4,996,642 A | 2/1991 | Hey |
| 4,998,171 A | 3/1991 | Kim et al. |
| 5,008,853 A | 4/1991 | Bly et al. |
| 5,014,125 A | 5/1991 | Pocock et al. |
| 5,016,273 A | 5/1991 | Hoff |
| 5,027,400 A | 6/1991 | Baji et al. |
| 5,036,314 A | 7/1991 | Barillari et al. |
| 5,038,211 A | 8/1991 | Hallenbeck |
| 5,045,947 A | 9/1991 | Beery |
| 5,047,867 A | 9/1991 | Strubbe et al. |
| 5,062,060 A | 10/1991 | Kolnick |
| 5,068,734 A | 11/1991 | Beery |
| 5,072,412 A | 12/1991 | Henderson, Jr. et al. |
| 5,075,771 A | 12/1991 | Hashimoto |
| 5,083,800 A | 1/1992 | Lockton |
| 5,089,885 A | 2/1992 | Clark |
| 5,090,049 A | 2/1992 | Chen |
| 5,091,785 A | 2/1992 | Canfield et al. |
| 5,093,921 A | 3/1992 | Bevins, Jr. |
| 5,099,319 A | 3/1992 | Esch et al. |
| 5,103,314 A | 4/1992 | Keenan |
| 5,105,184 A | 4/1992 | Pirani et al. |
| 5,113,259 A | 5/1992 | Romesburg et al. |
| 5,119,188 A | 6/1992 | McCalley et al. |
| 5,121,476 A | 6/1992 | Yee |
| 5,123,046 A | 6/1992 | Levine |
| 5,126,851 A | 6/1992 | Yoshimura et al. |
| 5,132,992 A | 7/1992 | Yurt et al. |
| 5,148,154 A | 9/1992 | MacKay et al. |
| 5,151,782 A | 9/1992 | Ferraro |
| 5,151,789 A | 9/1992 | Young |
| 5,155,591 A | 10/1992 | Wachob |
| 5,155,806 A | 10/1992 | Hoeber et al. |
| 5,157,768 A | 10/1992 | Hoeber et al. |
| 5,161,023 A | 11/1992 | Keenan |
| 5,162,905 A | 11/1992 | Itoh et al. |
| 5,170,388 A | 12/1992 | Endoh |
| 5,172,111 A | 12/1992 | Olivo, Jr. |
| 5,177,604 A | 1/1993 | Martinez |
| 5,179,439 A * | 1/1993 | Hashimoto .................. 348/731 |
| 5,179,654 A | 1/1993 | Richards et al. |
| 5,189,630 A | 2/1993 | Barstow et al. |
| 5,191,423 A | 3/1993 | Yoshida et al. |
| 5,195,092 A | 3/1993 | Wilson et al. |
| 5,195,134 A | 3/1993 | Inoue et al. |
| 5,200,823 A | 4/1993 | Yoneda et al. |
| 5,204,897 A | 4/1993 | Wyman |
| 5,206,722 A | 4/1993 | Kwan |
| 5,210,611 A | 5/1993 | Yee et al. |
| 5,212,553 A | 5/1993 | Maruoka et al. |
| 5,214,622 A | 5/1993 | Nemoto et al. |
| 5,220,420 A | 6/1993 | Hoarty et al. |
| 5,223,924 A | 6/1993 | Strubbe |
| 5,227,874 A | 7/1993 | Von Kohorn |
| 5,231,493 A | 7/1993 | Apitz et al. |
| 5,231,494 A | 7/1993 | Wachob |
| RE34,340 E | 8/1993 | Freeman |
| 5,233,423 A | 8/1993 | Jernigan et al. |
| 5,233,654 A | 8/1993 | Harvey et al. |
| 5,235,415 A | 8/1993 | Bonicel et al. |
| 5,236,199 A | 8/1993 | Thompson, Jr. |
| 5,237,411 A | 8/1993 | Fink et al. |
| 5,237,417 A | 8/1993 | Hayashi et al. |
| 5,237,418 A | 8/1993 | Kaneko et al. |
| 5,239,540 A | 8/1993 | Rovira et al. |
| 5,245,420 A | 9/1993 | Harney et al. |
| 5,247,347 A | 9/1993 | Litteral et al. |
| 5,247,364 A | 9/1993 | Banker et al. |
| 5,247,580 A | 9/1993 | Kimura et al. |
| 5,253,066 A | 10/1993 | Vogel |
| 5,253,067 A | 10/1993 | Chaney et al. |
| 5,260,778 A | 11/1993 | Kauffman et al. |
| 5,260,788 A | 11/1993 | Takano et al. |
| 5,262,860 A | 11/1993 | Fitzpatrick et al. |
| 5,283,639 A | 2/1994 | Esch et al. |
| 5,283,819 A | 2/1994 | Glick et al. |
| 5,301,028 A | 4/1994 | Banker et al. |
| 5,307,173 A | 4/1994 | Yuen et al. |
| 5,311,423 A | 5/1994 | Clark |
| 5,313,282 A | 5/1994 | Hayashi |
| 5,317,403 A | 5/1994 | Keenan |
| 5,319,445 A | 6/1994 | Fitts |
| 5,323,234 A | 6/1994 | Kawasaki |
| 5,323,240 A | 6/1994 | Amano et al. |

(56) References Cited

U.S. PATENT DOCUMENTS

| | | |
|---|---|---|
| 5,325,183 A | 6/1994 | Rhee et al. |
| 5,325,423 A | 6/1994 | Lewis |
| 5,335,277 A | 8/1994 | Harvey et al. |
| 5,343,239 A | 8/1994 | Lappington et al. |
| 5,347,167 A | 9/1994 | Singh |
| 5,347,632 A | 9/1994 | Filepp et al. |
| 5,351,075 A | 9/1994 | Herz et al. |
| 5,353,121 A | 10/1994 | Young et al. |
| 5,357,276 A | 10/1994 | Banker et al. |
| 5,359,367 A | 10/1994 | Stockill |
| 5,359,601 A | 10/1994 | Wasilewski et al. |
| 5,365,282 A | 11/1994 | Levine |
| 5,367,316 A | 11/1994 | Ikezaki |
| 5,367,330 A | 11/1994 | Haave et al. |
| 5,373,288 A | 12/1994 | Blahut |
| 5,374,951 A | 12/1994 | Welsh et al. |
| 5,377,317 A | 12/1994 | Bates et al. |
| 5,377,319 A | 12/1994 | Kitahara et al. |
| 5,382,983 A | 1/1995 | Kwoh et al. |
| 5,384,910 A | 1/1995 | Torres |
| 5,387,945 A | 2/1995 | Takeuchi |
| 5,396,546 A | 3/1995 | Remillard |
| 5,398,074 A | 3/1995 | Duffield et al. |
| 5,398,138 A | 3/1995 | Tomita |
| 5,404,393 A | 4/1995 | Remillard |
| 5,410,326 A | 4/1995 | Goldstein |
| 5,410,343 A | 4/1995 | Coddington et al. |
| 5,410,344 A | 4/1995 | Graves et al. |
| 5,410,367 A | 4/1995 | Zahavi et al. |
| 5,412,720 A | 5/1995 | Hoarty |
| 5,414,756 A | 5/1995 | Levine |
| 5,416,508 A | 5/1995 | Sakuma et al. |
| 5,420,858 A | 5/1995 | Marshall et al. |
| 5,424,770 A | 6/1995 | Schmelzer et al. |
| 5,425,101 A | 6/1995 | Woo et al. |
| 5,432,561 A | 7/1995 | Strubbe |
| 5,434,626 A | 7/1995 | Hayashi et al. |
| 5,436,676 A | 7/1995 | Pint et al. |
| 5,438,355 A | 8/1995 | Palmer |
| 5,438,372 A | 8/1995 | Tsumori et al. |
| 5,440,678 A | 8/1995 | Eisen et al. |
| 5,444,499 A | 8/1995 | Saitoh |
| 5,446,919 A | 8/1995 | Wilkins |
| 5,452,012 A | 9/1995 | Saitoh et al. |
| 5,455,570 A | 10/1995 | Cook et al. |
| 5,459,522 A | 10/1995 | Pint |
| 5,461,415 A | 10/1995 | Wolf et al. |
| 5,465,113 A | 11/1995 | Gilboy |
| 5,465,385 A | 11/1995 | Ohga et al. |
| 5,469,206 A * | 11/1995 | Strubbe et al. .................. 725/60 |
| 5,477,262 A | 12/1995 | Banker et al. |
| 5,479,266 A | 12/1995 | Young et al. |
| 5,479,268 A | 12/1995 | Young et al. |
| 5,479,497 A | 12/1995 | Kovarik |
| 5,481,296 A | 1/1996 | Cragun et al. |
| 5,483,278 A * | 1/1996 | Strubbe et al. .................. 725/61 |
| 5,485,219 A | 1/1996 | Woo et al. |
| 5,485,221 A | 1/1996 | Banker et al. |
| 5,488,409 A | 1/1996 | Yuen et al. |
| 5,495,295 A | 2/1996 | Long |
| 5,502,504 A | 3/1996 | Marshall et al. |
| 5,515,098 A | 5/1996 | Carles |
| 5,515,106 A | 5/1996 | Chaney et al. |
| 5,515,511 A | 5/1996 | Nguyen et al. |
| 5,517,254 A | 5/1996 | Monta et al. |
| 5,517,256 A | 5/1996 | Hashimoto |
| 5,521,589 A * | 5/1996 | Mondrosch et al. ......... 340/7.51 |
| 5,523,794 A | 6/1996 | Mankovitz et al. |
| 5,523,796 A | 6/1996 | Marshall et al. |
| 5,524,195 A | 6/1996 | Clanton, III et al. |
| 5,526,034 A | 6/1996 | Hoarty et al. |
| 5,528,304 A | 6/1996 | Cherrick et al. |
| 5,532,735 A | 7/1996 | Blahut et al. |
| 5,532,754 A | 7/1996 | Young et al. |
| 5,534,911 A | 7/1996 | Levitan |
| 5,537,141 A | 7/1996 | Harper et al. |
| 5,539,822 A | 7/1996 | Lett |
| 5,541,662 A | 7/1996 | Adams et al. |
| 5,541,738 A | 7/1996 | Mankovitz |
| 5,550,576 A | 8/1996 | Klosterman |
| 5,550,863 A | 8/1996 | Yurt et al. |
| 5,554,161 A | 9/1996 | Thibeault |
| 5,557,338 A | 9/1996 | Maze et al. |
| 5,557,721 A | 9/1996 | Fite et al. |
| 5,559,548 A | 9/1996 | Davis et al. |
| 5,559,549 A | 9/1996 | Hendricks et al. |
| 5,559,550 A | 9/1996 | Mankovitz |
| 5,559,942 A | 9/1996 | Gough et al. |
| 5,561,471 A | 10/1996 | Kim |
| 5,561,709 A | 10/1996 | Remillard |
| 5,563,665 A | 10/1996 | Chang |
| 5,570,295 A | 10/1996 | Isenberg et al. |
| 5,572,442 A | 11/1996 | Schulhof et al. |
| 5,574,962 A | 11/1996 | Fardeau et al. |
| 5,576,755 A | 11/1996 | Davis et al. |
| 5,576,951 A | 11/1996 | Lockwood |
| 5,579,055 A | 11/1996 | Hamilton et al. |
| 5,579,239 A | 11/1996 | Freeman et al. |
| 5,581,479 A | 12/1996 | McLaughlin et al. |
| 5,583,560 A | 12/1996 | Florin et al. |
| 5,583,561 A | 12/1996 | Baker et al. |
| 5,583,563 A | 12/1996 | Wanderscheid et al. |
| 5,585,838 A | 12/1996 | Lawler et al. |
| 5,585,865 A | 12/1996 | Amano et al. |
| 5,585,866 A | 12/1996 | Miller et al. |
| 5,589,892 A | 12/1996 | Knee et al. |
| 5,592,551 A | 1/1997 | Lett et al. |
| 5,594,490 A | 1/1997 | Dawson et al. |
| 5,594,509 A | 1/1997 | Florin et al. |
| 5,594,661 A | 1/1997 | Bruner et al. |
| 5,596,373 A | 1/1997 | White et al. |
| 5,600,364 A | 2/1997 | Hendricks et al. |
| 5,600,366 A | 2/1997 | Schulman |
| 5,600,573 A | 2/1997 | Hendricks et al. |
| 5,602,582 A | 2/1997 | Wanderscheid et al. |
| 5,602,596 A | 2/1997 | Claussen et al. |
| 5,602,597 A | 2/1997 | Bertram |
| 5,602,598 A | 2/1997 | Shintani |
| 5,604,544 A | 2/1997 | Bertram |
| 5,606,374 A | 2/1997 | Bertram |
| 5,610,653 A | 3/1997 | Abecassis |
| 5,617,526 A | 4/1997 | Oran et al. |
| 5,617,565 A | 4/1997 | Augenbraun et al. |
| 5,619,247 A * | 4/1997 | Russo .......................... 725/104 |
| 5,619,249 A | 4/1997 | Billock et al. |
| 5,619,274 A * | 4/1997 | Roop et al. ..................... 348/461 |
| 5,621,456 A | 4/1997 | Florin et al. |
| 5,623,316 A | 4/1997 | Naito et al. |
| 5,623,613 A | 4/1997 | Rowe et al. |
| 5,629,733 A | 5/1997 | Youman et al. |
| 5,630,119 A | 5/1997 | Aristides et al. |
| 5,631,995 A | 5/1997 | Weissensteiner et al. |
| 5,633,683 A | 5/1997 | Rosengren et al. |
| 5,634,051 A | 5/1997 | Thomson |
| 5,635,978 A | 6/1997 | Alten et al. |
| 5,635,979 A | 6/1997 | Kostreski et al. |
| 5,635,989 A | 6/1997 | Rothmuller |
| 5,636,346 A | 6/1997 | Saxe |
| 5,640,484 A | 6/1997 | Mankovitz |
| 5,640,501 A | 6/1997 | Turpin |
| 5,640,577 A | 6/1997 | Scharmer |
| 5,642,153 A | 6/1997 | Chaney et al. |
| 5,648,813 A | 7/1997 | Tanigawa et al. |
| 5,648,824 A | 7/1997 | Dunn et al. |
| 5,650,826 A | 7/1997 | Eitz |
| 5,650,831 A | 7/1997 | Farwell |
| 5,652,613 A | 7/1997 | Lazarus et al. |
| 5,652,615 A | 7/1997 | Bryant et al. |
| 5,654,748 A | 8/1997 | Matthews, III |
| 5,654,886 A | 8/1997 | Zereski, Jr. et al. |
| 5,657,072 A | 8/1997 | Aristides et al. |
| 5,657,091 A | 8/1997 | Bertram |
| 5,659,350 A | 8/1997 | Hendricks et al. |
| 5,659,366 A | 8/1997 | Kerman |

(56) References Cited

U.S. PATENT DOCUMENTS

| | | | |
|---|---|---|---|
| 5,661,516 A | 8/1997 | Carles | |
| 5,661,517 A | 8/1997 | Budow et al. | |
| 5,663,757 A | 9/1997 | Morales | |
| 5,664,111 A | 9/1997 | Nahan et al. | |
| 5,666,293 A | 9/1997 | Metz et al. | |
| 5,666,498 A | 9/1997 | Amro | |
| 5,666,645 A | 9/1997 | Thomas et al. | |
| 5,671,276 A | 9/1997 | Eyer et al. | |
| 5,671,411 A | 9/1997 | Watts et al. | |
| 5,675,390 A | 10/1997 | Schindler et al. | |
| 5,675,752 A | 10/1997 | Scott et al. | |
| 5,677,708 A | 10/1997 | Matthews, III et al. | |
| 5,677,981 A | 10/1997 | Kato et al. | |
| 5,682,195 A | 10/1997 | Hendricks et al. | |
| 5,682,206 A | 10/1997 | Wehmeyer et al. | |
| 5,682,525 A | 10/1997 | Bouve et al. | |
| 5,686,954 A | 11/1997 | Yoshinobu et al. | |
| 5,692,214 A * | 11/1997 | Levine | 710/13 |
| 5,694,163 A | 12/1997 | Harrison | |
| 5,694,176 A | 12/1997 | Bruette et al. | |
| 5,694,381 A | 12/1997 | Sako et al. | |
| 5,696,905 A | 12/1997 | Reimer et al. | |
| 5,699,052 A | 12/1997 | Miyahara | |
| 5,699,107 A | 12/1997 | Lawler et al. | |
| 5,699,125 A | 12/1997 | Rzeszewski et al. | |
| 5,708,478 A | 1/1998 | Tognazzini | |
| 5,710,601 A | 1/1998 | Marshall et al. | |
| 5,710,815 A | 1/1998 | Ming et al. | |
| 5,710,884 A | 1/1998 | Dedrick | |
| 5,715,399 A | 2/1998 | Bezos | |
| 5,717,452 A | 2/1998 | Janin et al. | |
| 5,717,923 A | 2/1998 | Dedrick | |
| 5,721,829 A | 2/1998 | Dunn et al. | |
| 5,722,041 A | 2/1998 | Freadman | |
| 5,724,103 A | 3/1998 | Batchelor | |
| 5,724,521 A | 3/1998 | Dedrick | |
| 5,724,525 A | 3/1998 | Beyers, II et al. | |
| 5,724,567 A | 3/1998 | Rose et al. | |
| 5,727,060 A | 3/1998 | Young | |
| 5,727,163 A | 3/1998 | Bezos | |
| 5,731,844 A | 3/1998 | Rauch et al. | |
| 5,734,444 A | 3/1998 | Yoshinobu | |
| 5,734,853 A | 3/1998 | Hendricks et al. | |
| 5,734,893 A | 3/1998 | Li et al. | |
| 5,737,028 A | 4/1998 | Bertram et al. | |
| 5,737,029 A | 4/1998 | Ohkura et al. | |
| 5,737,030 A | 4/1998 | Hong et al. | |
| 5,740,549 A | 4/1998 | Reilly et al. | |
| 5,748,191 A | 5/1998 | Rozak et al. | |
| 5,751,282 A | 5/1998 | Girard et al. | |
| 5,752,159 A | 5/1998 | Faust et al. | |
| 5,752,160 A | 5/1998 | Dunn | |
| 5,754,258 A | 5/1998 | Hanaya et al. | |
| 5,754,771 A | 5/1998 | Epperson et al. | |
| 5,754,939 A | 5/1998 | Herz et al. | |
| 5,757,417 A | 5/1998 | Aras et al. | |
| 5,758,257 A * | 5/1998 | Herz et al. | 725/116 |
| 5,758,259 A | 5/1998 | Lawler | |
| 5,760,821 A | 6/1998 | Ellis et al. | |
| 5,761,372 A | 6/1998 | Yoshinobu et al. | |
| 5,761,601 A | 6/1998 | Nemirofsky et al. | |
| 5,761,606 A | 6/1998 | Wolzien | |
| 5,768,528 A | 6/1998 | Stumm | |
| 5,771,354 A | 6/1998 | Crawford | |
| 5,774,170 A | 6/1998 | Hite et al. | |
| 5,774,357 A | 6/1998 | Hoffberg et al. | |
| 5,774,534 A | 6/1998 | Mayer | |
| 5,774,664 A | 6/1998 | Hidary et al. | |
| 5,774,887 A | 6/1998 | Wolff et al. | |
| 5,778,181 A | 7/1998 | Hidary et al. | |
| 5,778,182 A | 7/1998 | Cathey et al. | |
| 5,781,226 A | 7/1998 | Sheehan | |
| 5,781,245 A | 7/1998 | Van Der Weij et al. | |
| 5,781,246 A * | 7/1998 | Alten et al. | 725/40 |
| 5,781,734 A | 7/1998 | Ohno et al. | |
| 5,784,258 A | 7/1998 | Quinn | |
| 5,787,259 A | 7/1998 | Haroun et al. | |
| 5,788,507 A | 8/1998 | Redford et al. | |
| 5,790,201 A | 8/1998 | Antos | |
| 5,790,202 A | 8/1998 | Kummer et al. | |
| 5,790,426 A | 8/1998 | Robinson | |
| 5,790,753 A | 8/1998 | Krishnamoorthy et al. | |
| 5,793,438 A | 8/1998 | Bedard | |
| 5,793,964 A | 8/1998 | Rogers et al. | |
| 5,793,972 A | 8/1998 | Shane | |
| 5,798,785 A * | 8/1998 | Hendricks et al. | 725/46 |
| 5,801,747 A | 9/1998 | Bedard | |
| 5,801,785 A | 9/1998 | Crump et al. | |
| 5,801,787 A | 9/1998 | Schein et al. | |
| 5,802,284 A | 9/1998 | Karlton et al. | |
| 5,805,154 A | 9/1998 | Brown | |
| 5,805,167 A | 9/1998 | van Cruyningen | |
| 5,805,235 A | 9/1998 | Bedard | |
| 5,805,763 A | 9/1998 | Lawler et al. | |
| 5,805,804 A | 9/1998 | Laursen et al. | |
| 5,805,806 A | 9/1998 | McArthur | |
| 5,808,608 A | 9/1998 | Young et al. | |
| 5,808,694 A | 9/1998 | Usui et al. | |
| 5,809,204 A | 9/1998 | Young et al. | |
| 5,809,214 A | 9/1998 | Nureki et al. | |
| 5,812,124 A | 9/1998 | Eick et al. | |
| 5,812,205 A | 9/1998 | Milnes et al. | |
| 5,812,931 A | 9/1998 | Yuen | |
| 5,815,145 A | 9/1998 | Matthews, III | |
| 5,815,671 A | 9/1998 | Morrison | |
| 5,818,438 A | 10/1998 | Howe et al. | |
| 5,818,439 A | 10/1998 | Nagasaka et al. | |
| 5,818,441 A | 10/1998 | Throckmorton et al. | |
| 5,818,541 A | 10/1998 | Matsuura et al. | |
| 5,818,935 A | 10/1998 | Maa | |
| 5,819,019 A | 10/1998 | Nelson | |
| 5,819,156 A | 10/1998 | Belmont | |
| 5,819,284 A | 10/1998 | Farber et al. | |
| 5,822,123 A | 10/1998 | Davis et al. | |
| 5,825,407 A | 10/1998 | Cowe et al. | |
| 5,828,402 A | 10/1998 | Collings | |
| 5,828,419 A | 10/1998 | Bruette et al. | |
| 5,828,420 A | 10/1998 | Marshall et al. | |
| 5,828,839 A | 10/1998 | Moncreiff | |
| 5,828,945 A | 10/1998 | Klosterman | |
| 5,830,068 A | 11/1998 | Brenner et al. | |
| 5,832,223 A | 11/1998 | Hara et al. | |
| 5,833,468 A | 11/1998 | Guy et al. | |
| 5,835,717 A | 11/1998 | Karlton et al. | |
| 5,838,314 A | 11/1998 | Neel et al. | |
| 5,838,383 A | 11/1998 | Chimoto et al. | |
| 5,842,010 A | 11/1998 | Jain et al. | |
| 5,842,199 A | 11/1998 | Miller et al. | |
| 5,844,552 A | 12/1998 | Gaughan et al. | |
| 5,844,620 A | 12/1998 | Coleman et al. | |
| 5,848,352 A | 12/1998 | Dougherty et al. | |
| 5,848,396 A | 12/1998 | Gerace | |
| 5,848,397 A | 12/1998 | Marsh et al. | |
| 5,850,218 A | 12/1998 | LaJoie et al. | |
| 5,852,437 A | 12/1998 | Wugofski et al. | |
| 5,861,881 A | 1/1999 | Freeman et al. | |
| 5,861,906 A | 1/1999 | Dunn et al. | |
| 5,862,292 A | 1/1999 | Kubota et al. | |
| 5,867,226 A | 2/1999 | Wehmeyer et al. | |
| 5,867,227 A | 2/1999 | Yamaguchi | |
| 5,867,233 A | 2/1999 | Tanaka | |
| 5,872,588 A | 2/1999 | Aras et al. | |
| 5,873,660 A | 2/1999 | Walsh et al. | |
| 5,874,985 A | 2/1999 | Matthews, III | |
| 5,875,108 A | 2/1999 | Hoffberg et al. | |
| 5,877,906 A | 3/1999 | Nagasawa et al. | |
| 5,880,768 A | 3/1999 | Lemmons et al. | |
| 5,883,677 A | 3/1999 | Hofmann | |
| 5,886,691 A | 3/1999 | Furuya et al. | |
| 5,886,731 A | 3/1999 | Ebisawa et al. | |
| 5,886,732 A | 3/1999 | Humpleman | |
| 5,889,950 A | 3/1999 | Kuzma | |
| 5,892,498 A | 4/1999 | Marshall et al. | |
| 5,892,535 A | 4/1999 | Allen et al. | |

(56) References Cited

U.S. PATENT DOCUMENTS

| | | |
|---|---|---|
| 5,892,767 A | 4/1999 | Bell et al. |
| 5,900,905 A | 5/1999 | Shoff et al. |
| 5,903,314 A | 5/1999 | Niijima et al. |
| 5,903,545 A | 5/1999 | Sabourin et al. |
| 5,903,816 A | 5/1999 | Broadwin et al. |
| 5,905,497 A | 5/1999 | Vaughan et al. |
| 5,907,322 A | 5/1999 | Kelly et al. |
| 5,907,323 A | 5/1999 | Lawler et al. |
| 5,907,366 A | 5/1999 | Farmer et al. |
| 5,912,664 A | 6/1999 | Eick et al. |
| 5,914,712 A | 6/1999 | Sartain et al. |
| 5,914,746 A | 6/1999 | Matthews, III et al. |
| 5,917,481 A | 6/1999 | Rzeszewski et al. |
| 5,917,830 A | 6/1999 | Chen et al. |
| 5,918,014 A | 6/1999 | Robinson |
| 5,920,700 A | 7/1999 | Gordon et al. |
| 5,923,848 A | 7/1999 | Goodhand et al. |
| 5,929,849 A | 7/1999 | Kikinis |
| 5,929,850 A | 7/1999 | Broadwin et al. |
| 5,929,932 A | 7/1999 | Otsuki et al. |
| 5,931,905 A | 8/1999 | HaSshimoto et al. |
| 5,936,679 A | 8/1999 | Kasahara et al. |
| 5,937,160 A | 8/1999 | Davis et al. |
| 5,940,073 A | 8/1999 | Klosterman et al. |
| 5,940,572 A | 8/1999 | Balaban et al. |
| 5,945,988 A | 8/1999 | Williams et al. |
| 5,946,386 A | 8/1999 | Rogers et al. |
| 5,946,678 A | 8/1999 | Aalbersberg |
| 5,951,642 A | 9/1999 | Onoe et al. |
| 5,955,988 A | 9/1999 | Blonstein et al. |
| 5,959,688 A | 9/1999 | Schein et al. |
| 5,960,411 A | 9/1999 | Hartman et al. |
| 5,973,683 A | 10/1999 | Cragun et al. |
| 5,974,222 A | 10/1999 | Yuen et al. |
| 5,977,964 A | 11/1999 | Williams et al. |
| 5,986,650 A | 11/1999 | Ellis et al. |
| 5,988,078 A | 11/1999 | Levine |
| 5,990,890 A | 11/1999 | Etheredge |
| 5,990,927 A | 11/1999 | Hendricks et al. |
| 5,991,799 A | 11/1999 | Yen et al. |
| 5,999,912 A | 12/1999 | Wodarz et al. |
| 6,002,393 A | 12/1999 | Hite et al. |
| 6,002,394 A | 12/1999 | Schein et al. |
| 6,005,562 A | 12/1999 | Shiga et al. |
| 6,005,563 A | 12/1999 | White et al. |
| 6,005,565 A | 12/1999 | Legall et al. |
| 6,005,597 A | 12/1999 | Barrett et al. |
| 6,006,257 A | 12/1999 | Slezak |
| 6,008,802 A | 12/1999 | Iki et al. |
| 6,008,803 A | 12/1999 | Rowe et al. |
| 6,011,546 A | 1/2000 | Bertram |
| 6,012,086 A | 1/2000 | Lowell |
| 6,014,184 A | 1/2000 | Knee et al. |
| 6,016,141 A | 1/2000 | Knudson et al. |
| 6,018,372 A | 1/2000 | Etheredge |
| 6,018,768 A | 1/2000 | Ullman et al. |
| 6,020,883 A | 2/2000 | Herz et al. |
| 6,020,929 A | 2/2000 | Marshall et al. |
| 6,023,267 A | 2/2000 | Chapuis et al. |
| 6,025,837 A | 2/2000 | Matthews, III et al. |
| 6,025,886 A | 2/2000 | Koda |
| 6,028,599 A | 2/2000 | Yuen et al. |
| 6,029,045 A | 2/2000 | Picco et al. |
| 6,029,195 A | 2/2000 | Herz |
| 6,035,304 A | 3/2000 | Machida et al. |
| 6,047,317 A | 4/2000 | Bisdikian et al. |
| 6,049,824 A | 4/2000 | Simonin |
| 6,052,145 A | 4/2000 | Macrae et al. |
| 6,058,238 A | 5/2000 | Ng |
| 6,061,060 A | 5/2000 | Berry et al. |
| 6,061,097 A | 5/2000 | Satterfield |
| 6,064,376 A | 5/2000 | Berezowski et al. |
| 6,064,980 A | 5/2000 | Jacobi et al. |
| 6,067,561 A | 5/2000 | Dillon |
| 6,072,460 A | 6/2000 | Marshall et al. |
| 6,075,526 A | 6/2000 | Rothmuller |
| 6,075,551 A | 6/2000 | Berezowski et al. |
| 6,075,575 A | 6/2000 | Schein et al. |
| 6,078,348 A | 6/2000 | Klosterman et al. |
| 6,081,750 A | 6/2000 | Hoffberg et al. |
| 6,088,722 A | 7/2000 | Herz et al. |
| 6,091,883 A | 7/2000 | Artigalas et al. |
| 6,097,441 A | 8/2000 | Allport |
| 6,098,065 A | 8/2000 | Skillen et al. |
| 6,104,334 A | 8/2000 | Allport |
| 6,104,705 A | 8/2000 | Ismail et al. |
| 6,108,042 A | 8/2000 | Adams et al. |
| 6,111,614 A | 8/2000 | Mugura et al. |
| 6,112,186 A | 8/2000 | Bergh et al. |
| 6,115,057 A | 9/2000 | Kwoh et al. |
| 6,118,492 A | 9/2000 | Milnes et al. |
| 6,119,098 A | 9/2000 | Guyot et al. |
| 6,119,101 A | 9/2000 | Peckover |
| 6,122,011 A | 9/2000 | Dias et al. |
| 6,124,854 A | 9/2000 | Sartain et al. |
| 6,125,230 A | 9/2000 | Yaginuma |
| 6,130,726 A | 10/2000 | Darbee et al. |
| 6,133,909 A | 10/2000 | Schein et al. |
| 6,139,177 A | 10/2000 | Venkatraman et al. |
| 6,141,003 A | 10/2000 | Chor et al. |
| 6,147,714 A | 11/2000 | Terasawa et al. |
| 6,151,059 A | 11/2000 | Schein et al. |
| 6,151,643 A | 11/2000 | Cheng et al. |
| 6,154,203 A | 11/2000 | Yuen et al. |
| 6,157,411 A | 12/2000 | Williams et al. |
| 6,157,413 A | 12/2000 | Hanafee et al. |
| 6,160,545 A | 12/2000 | Eyer et al. |
| 6,160,546 A | 12/2000 | Thompson et al. |
| 6,160,570 A | 12/2000 | Sitnik |
| 6,163,316 A | 12/2000 | Killian |
| 6,163,345 A | 12/2000 | Noguchi et al. |
| 6,169,542 B1 | 1/2001 | Hooks et al. |
| 6,172,674 B1 | 1/2001 | Etheredge |
| 6,172,677 B1 | 1/2001 | Stautner et al. |
| 6,173,271 B1 | 1/2001 | Goodman et al. |
| 6,177,931 B1 | 1/2001 | Alexander et al. |
| 6,178,446 B1 | 1/2001 | Gerszberg et al. |
| 6,181,335 B1 | 1/2001 | Hendricks et al. |
| 6,184,877 B1 | 2/2001 | Dodson et al. |
| 6,191,780 B1 | 2/2001 | Martin et al. |
| 6,208,384 B1 | 3/2001 | Schultheiss |
| 6,209,129 B1 | 3/2001 | Carr et al. |
| 6,209,130 B1 | 3/2001 | Rector, Jr. et al. |
| 6,212,553 B1 | 4/2001 | Lee et al. |
| 6,216,264 B1 | 4/2001 | Maze et al. |
| 6,239,794 B1 | 5/2001 | Yuen et al. |
| 6,240,555 B1 | 5/2001 | Shoff et al. |
| 6,253,203 B1 | 6/2001 | O'Flaherty et al. |
| 6,256,071 B1 | 7/2001 | Hiroi |
| 6,256,785 B1 | 7/2001 | Klappert et al. |
| 6,262,721 B1 | 7/2001 | Tsukidate et al. |
| 6,262,772 B1 | 7/2001 | Shen et al. |
| 6,263,501 B1 | 7/2001 | Schein et al. |
| 6,263,507 B1 | 7/2001 | Ahmad et al. |
| 6,268,849 B1 | 7/2001 | Boyer et al. |
| 6,275,268 B1 | 8/2001 | Ellis et al. |
| 6,279,157 B1 | 8/2001 | Takasu et al. |
| 6,285,713 B1 | 9/2001 | Nakaya et al. |
| 6,286,140 B1 | 9/2001 | Ivanyi |
| 6,289,346 B1 | 9/2001 | Milewski et al. |
| 6,298,482 B1 | 10/2001 | Seidman et al. |
| 6,310,886 B1 | 10/2001 | Barton |
| 6,311,877 B1 | 11/2001 | Yang |
| 6,312,336 B1 | 11/2001 | Handelman et al. |
| 6,317,885 B1 | 11/2001 | Fries |
| 6,320,588 B1 | 11/2001 | Palmer et al. |
| 6,323,911 B1 | 11/2001 | Schein et al. |
| 6,327,049 B1 | 12/2001 | Ohtsuka |
| 6,331,877 B1 | 12/2001 | Bennington et al. |
| 6,331,887 B1 | 12/2001 | Shiraishi et al. |
| 6,335,963 B1 | 1/2002 | Bosco |
| 6,341,195 B1 | 1/2002 | Mankovitz et al. |
| 6,342,926 B1 | 1/2002 | Hanafee et al. |
| 6,357,042 B2 | 3/2002 | Srinivasan et al. |

(56) References Cited

U.S. PATENT DOCUMENTS

| | | |
|---|---|---|
| 6,359,636 B1 | 3/2002 | Schindler et al. |
| 6,363,525 B1 | 3/2002 | Dougherty et al. |
| 6,381,582 B1 | 4/2002 | Walker et al. |
| 6,388,714 B1 | 5/2002 | Schein |
| 6,389,593 B1 | 5/2002 | Yamagishi et al. |
| 6,392,710 B1 | 5/2002 | Gonsalves et al. |
| 6,396,546 B1 | 5/2002 | Alten et al. |
| 6,400,407 B1 | 6/2002 | Zigmond et al. |
| 6,405,371 B1 | 6/2002 | Oosterhout et al. |
| 6,408,437 B1 | 6/2002 | Hendricks et al. |
| 6,411,308 B1 | 6/2002 | Blonstein et al. |
| 6,411,696 B1 | 6/2002 | Iverson et al. |
| 6,412,110 B1 | 6/2002 | Schein et al. |
| 6,418,556 B1 | 7/2002 | Bennington et al. |
| 6,421,067 B1 | 7/2002 | Kamen et al. |
| 6,426,779 B1 | 7/2002 | Noguchi et al. |
| 6,437,836 B1 | 8/2002 | Huang et al. |
| 6,446,261 B1 | 9/2002 | Rosser |
| 6,453,471 B1 | 9/2002 | Klosterman |
| 6,463,585 B1 | 10/2002 | Hendricks et al. |
| 6,469,753 B1 | 10/2002 | Klosterman et al. |
| 6,470,497 B1 | 10/2002 | Ellis et al. |
| 6,477,579 B1 | 11/2002 | Kunkel et al. |
| 6,477,705 B1 | 11/2002 | Yuen et al. |
| 6,486,920 B2 | 11/2002 | Arai et al. |
| 6,498,895 B2 | 12/2002 | Young et al. |
| 6,499,138 B1 | 12/2002 | Swix et al. |
| 6,505,348 B1 | 1/2003 | Knowles et al. |
| 6,509,908 B1 | 1/2003 | Croy et al. |
| 6,515,680 B1 | 2/2003 | Hendricks et al. |
| 6,516,467 B1 | 2/2003 | Schindler et al. |
| 6,539,548 B1 | 3/2003 | Hendricks et al. |
| 6,545,722 B1 | 4/2003 | Schultheiss et al. |
| 6,546,556 B1 | 4/2003 | Kataoka et al. |
| 6,564,378 B1 | 5/2003 | Satterfield et al. |
| 6,564,379 B1 | 5/2003 | Knudson et al. |
| 6,567,982 B1 | 5/2003 | Howe et al. |
| 6,571,390 B1 | 5/2003 | Dunn et al. |
| 6,574,424 B1 | 6/2003 | Dimitri et al. |
| 6,588,013 B1 | 7/2003 | Lumley et al. |
| 6,600,503 B2 | 7/2003 | Stautner et al. |
| 6,606,128 B2 | 8/2003 | Hanafee et al. |
| 6,611,654 B1 | 8/2003 | Shteyn |
| 6,622,306 B1 | 9/2003 | Kamada |
| 6,631,523 B1 | 10/2003 | Matthews, III et al. |
| 6,651,251 B1 | 11/2003 | Shoff et al. |
| 6,660,503 B2 | 12/2003 | Kierulff |
| 6,661,468 B2 | 12/2003 | Alten et al. |
| 6,665,869 B1 | 12/2003 | Ellis et al. |
| 6,675,385 B1 | 1/2004 | Wang |
| 6,675,386 B1 | 1/2004 | Hendricks et al. |
| 6,687,906 B1 | 2/2004 | Yuen et al. |
| 6,698,020 B1 | 2/2004 | Zigmond et al. |
| 6,732,369 B1 | 5/2004 | Leftwich et al. |
| 6,738,978 B1 | 5/2004 | Hendricks et al. |
| 6,742,183 B1 | 5/2004 | Reynolds et al. |
| 6,751,800 B1 | 6/2004 | Fukuda et al. |
| 6,754,904 B1 | 6/2004 | Cooper et al. |
| 6,756,997 B1 | 6/2004 | Ward, III et al. |
| 6,757,906 B1 | 6/2004 | Look et al. |
| 6,760,537 B2 | 7/2004 | Mankovitz |
| 6,799,326 B2 | 9/2004 | Boylan, III et al. |
| 6,799,327 B1 | 9/2004 | Reynolds et al. |
| 6,828,993 B1 | 12/2004 | Hendricks et al. |
| 6,865,746 B1 | 3/2005 | Herrington et al. |
| 6,868,551 B1 | 3/2005 | Lawler et al. |
| 6,898,762 B2 | 5/2005 | Ellis et al. |
| 6,925,567 B1 | 8/2005 | Hirata et al. |
| 6,938,208 B2 | 8/2005 | Reichardt |
| 6,973,669 B2 | 12/2005 | Daniels |
| 6,983,478 B1 | 1/2006 | Grauch et al. |
| 7,028,326 B1 | 4/2006 | Westlake et al. |
| 7,039,935 B2 | 5/2006 | Knudson et al. |
| 7,058,635 B1 | 6/2006 | Shah-Nazaroff et al. |
| 7,062,777 B2 | 6/2006 | Alba et al. |
| 7,069,576 B1 | 6/2006 | Knudson et al. |
| 7,165,098 B1 | 1/2007 | Boyer et al. |
| 7,185,355 B1 | 2/2007 | Ellis et al. |
| 7,187,847 B2 | 3/2007 | Young et al. |
| 7,266,833 B2 | 9/2007 | Ward, III et al. |
| 7,287,267 B2 | 10/2007 | Knudson et al. |
| 7,293,276 B2 | 11/2007 | Phillips et al. |
| 7,328,450 B2 | 2/2008 | Macrae et al. |
| 7,392,532 B2 | 6/2008 | White et al. |
| 7,437,751 B2 | 10/2008 | Daniels |
| 7,480,929 B2 | 1/2009 | Klosterman et al. |
| 7,493,641 B2 | 2/2009 | Klosterman et al. |
| 7,503,055 B2 | 3/2009 | Reynolds et al. |
| 2001/0001160 A1 | 5/2001 | Shoff et al. |
| 2001/0027562 A1 | 10/2001 | Schein et al. |
| 2001/0029610 A1 | 10/2001 | Corvin et al. |
| 2001/0042246 A1 | 11/2001 | Yuen et al. |
| 2001/0047298 A1 | 11/2001 | Moore et al. |
| 2001/0049820 A1 | 12/2001 | Barton |
| 2001/0054181 A1 | 12/2001 | Corvin |
| 2002/0010926 A1 | 1/2002 | Lee |
| 2002/0026496 A1 | 2/2002 | Boyer et al. |
| 2002/0032907 A1 | 3/2002 | Daniels |
| 2002/0042913 A1 | 4/2002 | Ellis et al. |
| 2002/0042914 A1 | 4/2002 | Walker et al. |
| 2002/0042918 A1 | 4/2002 | Townsend et al. |
| 2002/0059602 A1 | 5/2002 | Macrae et al. |
| 2002/0073424 A1 | 6/2002 | Ward et al. |
| 2002/0083439 A1 | 6/2002 | Eldering |
| 2002/0092017 A1 | 7/2002 | Klosterman et al. |
| 2002/0112249 A1 | 8/2002 | Hendricks et al. |
| 2002/0124249 A1 | 9/2002 | Shintani et al. |
| 2003/0005432 A1 | 1/2003 | Ellis et al. |
| 2003/0005445 A1 | 1/2003 | Schein et al. |
| 2003/0031465 A1 | 2/2003 | Blake |
| 2003/0110499 A1 | 6/2003 | Knudson et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0196203 A1 | 10/2003 | Ellis et al. |
| 2003/0204847 A1 | 10/2003 | Ellis et al. |
| 2003/0208756 A1 | 11/2003 | Macrae et al. |
| 2003/0208758 A1 | 11/2003 | Schein et al. |
| 2004/0003407 A1 | 1/2004 | Hanafee et al. |
| 2004/0049787 A1 | 3/2004 | Maissel et al. |
| 2004/0078809 A1 | 4/2004 | Drazin |
| 2004/0111742 A1 | 6/2004 | Hendricks et al. |
| 2004/0111745 A1 | 6/2004 | Schein et al. |
| 2004/0139465 A1 | 7/2004 | Matthews et al. |
| 2004/0194131 A1 | 9/2004 | Ellis et al. |
| 2004/0194138 A1 | 9/2004 | Boylan et al. |
| 2005/0015815 A1 | 1/2005 | Shoff et al. |
| 2005/0097622 A1 | 5/2005 | Zigmond et al. |
| 2005/0155056 A1 | 7/2005 | Knee et al. |
| 2005/0157217 A1 | 7/2005 | Hendricks |
| 2005/0198668 A1 | 9/2005 | Yuen et al. |
| 2005/0204382 A1 | 9/2005 | Ellis |
| 2005/0204388 A1 | 9/2005 | Knudson et al. |
| 2005/0229214 A1 | 10/2005 | Young et al. |
| 2005/0235320 A1 | 10/2005 | Maze et al. |
| 2005/0244138 A1 | 11/2005 | O'Connor et al. |
| 2005/0278741 A1 | 12/2005 | Robarts et al. |
| 2005/0283796 A1 | 12/2005 | Flickinger |
| 2006/0037044 A1 | 2/2006 | Daniels |
| 2006/0248555 A1 | 11/2006 | Eldering |
| 2008/0178221 A1 | 7/2008 | Schein et al. |
| 2008/0184305 A1 | 7/2008 | Schein et al. |
| 2008/0184315 A1 | 7/2008 | Ellis et al. |
| 2008/0189744 A1 | 8/2008 | Schein et al. |
| 2008/0235725 A1 | 9/2008 | Hendricks |
| 2011/0209170 A1 | 8/2011 | Schein et al. |

FOREIGN PATENT DOCUMENTS

| | | |
|---|---|---|
| CA | 1187197 A1 | 5/1985 |
| CA | 1188811 A1 | 6/1985 |
| CA | 2151458 A1 | 6/1994 |

(56) References Cited

FOREIGN PATENT DOCUMENTS

| | | |
|---|---|---|
| CA | 2164608 A1 | 12/1994 |
| CA | 2312326 A1 | 6/1999 |
| CN | 1 200 221 A | 11/1998 |
| CN | 1 567 986 | 1/2005 |
| DE | 29 18 846 | 11/1980 |
| DE | 31 51 492 | 7/1983 |
| DE | 32 46 225 A1 | 6/1984 |
| DE | 33 37 204 | 4/1985 |
| DE | 36 21 263 A1 | 1/1988 |
| DE | 36 40 436 | 6/1988 |
| DE | 39 09 334 A1 | 9/1990 |
| DE | 42 01 031 C2 | 7/1993 |
| DE | 42 17 246 | 12/1993 |
| DE | 42 40 187 | 6/1994 |
| DE | 44 07 701 | 9/1995 |
| DE | 44 40 419 A1 | 5/1996 |
| DE | 195 31 121 | 2/1997 |
| DE | 197 40 079 | 3/1999 |
| DE | 19931046 A1 | 1/2001 |
| EP | 0 239 884 A1 | 10/1987 |
| EP | 0 276 425 | 8/1988 |
| EP | 0 396 062 A2 | 11/1990 |
| EP | 0 401 930 | 12/1990 |
| EP | 0 408 892 A1 | 1/1991 |
| EP | 0 420 123 A2 | 4/1991 |
| EP | 0 424 648 A2 | 5/1991 |
| EP | 0 444 496 | 9/1991 |
| EP | 0 447 968 | 9/1991 |
| EP | 0 532 322 A2 | 3/1993 |
| EP | 0 550 911 A1 | 7/1993 |
| EP | 0 560 593 | 9/1993 |
| EP | 0 572 090 | 12/1993 |
| EP | 0 617 563 | 9/1994 |
| EP | 0 624 040 | 11/1994 |
| EP | 0 682 452 | 11/1995 |
| EP | 0 705 036 | 4/1996 |
| EP | 0 721 253 | 7/1996 |
| EP | 0 723 369 | 7/1996 |
| EP | 0 725 539 | 8/1996 |
| EP | 0 742 669 | 11/1996 |
| EP | 0 752 767 A2 | 1/1997 |
| EP | 0 753 964 | 1/1997 |
| EP | 0 762 751 A2 | 3/1997 |
| EP | 0 772 360 | 5/1997 |
| EP | 0 774 866 | 5/1997 |
| EP | 0 775 417 A1 | 5/1997 |
| EP | 0 784 405 | 7/1997 |
| EP | 0 793 225 | 9/1997 |
| EP | 0 805 594 | 11/1997 |
| EP | 0 822 718 | 2/1998 |
| EP | 0 827 340 A2 | 3/1998 |
| EP | 0 834 798 | 4/1998 |
| EP | 0 837 599 | 4/1998 |
| EP | 0 848 554 A2 | 6/1998 |
| EP | 0 849 948 | 6/1998 |
| EP | 0 851 681 | 7/1998 |
| EP | 0 852 442 A1 | 7/1998 |
| EP | 0 854 645 | 7/1998 |
| EP | 0 854 654 | 7/1998 |
| EP | 0 852 361 | 8/1998 |
| EP | 0 880 856 A1 | 12/1998 |
| EP | 0 905 985 A2 | 3/1999 |
| EP | 0 924 927 A2 | 6/1999 |
| EP | 0 935 393 A2 | 8/1999 |
| EP | 0 944 253 A1 | 9/1999 |
| EP | 0 963 119 A1 | 12/1999 |
| EP | 0 988 876 A1 | 3/2000 |
| EP | 1 095 504 A2 | 5/2001 |
| FR | 2662895 A1 | 12/1991 |
| GB | 1 554 411 | 10/1979 |
| GB | 2 034 995 A | 6/1980 |
| GB | 2 126 002 A | 3/1984 |
| GB | 2 185 670 A | 7/1987 |
| GB | 2 256 546 A | 12/1992 |
| GB | 2 265 792 | 10/1993 |
| GB | 2 309 134 A | 7/1997 |
| GB | 2 325 537 A | 11/1998 |
| JP | 58-137334 A | 8/1983 |
| JP | 58-196738 A | 11/1983 |
| JP | 58-210776 A | 12/1983 |
| JP | 59-141878 A | 8/1984 |
| JP | 61-050470 A | 3/1986 |
| JP | 61-074476 A | 4/1986 |
| JP | 62-060370 | 3/1987 |
| JP | 62-060384 A | 3/1987 |
| JP | 0392177 | 4/1988 |
| JP | 63-234679 A | 9/1988 |
| JP | 01-307944 A | 12/1989 |
| JP | 02-048879 A | 2/1990 |
| JP | 03-022770 | 1/1991 |
| JP | 04-079053 | 3/1992 |
| JP | 04227380 | 8/1992 |
| JP | 05-183826 | 7/1993 |
| JP | 05-260400 | 10/1993 |
| JP | 05-284437 A | 10/1993 |
| JP | 0621907 | 1/1994 |
| JP | 06-038165 | 2/1994 |
| JP | 06-504165 | 5/1994 |
| JP | 06-243539 | 9/1994 |
| JP | 07-135621 | 5/1995 |
| JP | 07123326 | 5/1995 |
| JP | 07-154349 | 6/1995 |
| JP | 07-160732 | 6/1995 |
| JP | 07147657 | 6/1995 |
| JP | 07-184131 | 7/1995 |
| JP | 07-193762 | 7/1995 |
| JP | 07-193763 | 7/1995 |
| JP | 07-288759 | 10/1995 |
| JP | 0720254 | 11/1995 |
| JP | 07-321748 | 12/1995 |
| JP | 08-056352 | 2/1996 |
| JP | 0832538 | 2/1996 |
| JP | 08125497 | 5/1996 |
| JP | 08-506941 | 7/1996 |
| JP | 08-251122 | 9/1996 |
| JP | O8275077 | 10/1996 |
| JP | 09-037151 A | 2/1997 |
| JP | 09-037172 A | 2/1997 |
| JP | 09102827 | 4/1997 |
| JP | 09-162821 | 6/1997 |
| JP | 10-143349 | 5/1998 |
| WO | WO 86-01359 | 2/1986 |
| WO | WO 86/01962 | 3/1986 |
| WO | WO 87-03766 | 6/1987 |
| WO | WO 88/04057 A1 | 6/1988 |
| WO | WO 89/02682 A1 | 3/1989 |
| WO | WO 89-03085 | 4/1989 |
| WO | WO 89/12370 | 12/1989 |
| WO | WO 90/01243 A1 | 2/1990 |
| WO | WO 90/15507 | 12/1990 |
| WO | WO 91/00670 | 1/1991 |
| WO | WO 91/18476 A1 | 11/1991 |
| WO | WO 92/04801 | 3/1992 |
| WO | WO 93/04473 | 3/1993 |
| WO | WO 93/05452 A1 | 3/1993 |
| WO | WO 93/11638 | 6/1993 |
| WO | WO 93/11639 | 6/1993 |
| WO | WO 93/11640 | 6/1993 |
| WO | WO 93/23957 A1 | 11/1993 |
| WO | WO 94-13107 | 6/1994 |
| WO | WO 94/14281 A1 | 6/1994 |
| WO | WO 94/14282 | 6/1994 |
| WO | WO 94/14283 A1 | 6/1994 |
| WO | WO 94/14284 | 6/1994 |
| WO | WO 94/21085 A1 | 9/1994 |
| WO | WO 94/23383 A1 | 10/1994 |
| WO | WO 94/29811 A1 | 12/1994 |
| WO | WO 95/01056 | 1/1995 |
| WO | WO 95/01058 | 1/1995 |
| WO | WO 95/01059 | 1/1995 |
| WO | WO 95/06389 A1 | 3/1995 |
| WO | WO 95/07003 | 3/1995 |
| WO | WO 95-10910 | 4/1995 |
| WO | WO 95/15649 A1 | 6/1995 |

(56) References Cited

FOREIGN PATENT DOCUMENTS

| | | |
|---|---|---|
| WO | WO 95-15657 | 6/1995 |
| WO | WO 95/15658 A1 | 6/1995 |
| WO | WO 95/16568 A1 | 6/1995 |
| WO | WO 95-19092 | 7/1995 |
| WO | WO 95-26608 | 10/1995 |
| WO | WO 95-28055 | 10/1995 |
| WO | WO 95-28799 | 10/1995 |
| WO | WO-9528055 | 10/1995 |
| WO | WO 95/30961 A1 | 11/1995 |
| WO | WO 95/31069 | 11/1995 |
| WO | WO 95-32583 | 11/1995 |
| WO | WO 95-32585 | 11/1995 |
| WO | WO 96-07270 | 3/1996 |
| WO | WO 96/08109 A1 | 3/1996 |
| WO | WO 96/08113 A1 | 3/1996 |
| WO | WO 96-09721 | 3/1996 |
| WO | WO 96-13932 | 5/1996 |
| WO | WO 96/13935 | 5/1996 |
| WO | WO 96-17467 A2 | 6/1996 |
| WO | WO 96-17473 | 6/1996 |
| WO | WO 96/26605 | 8/1996 |
| WO | WO 96/27982 | 9/1996 |
| WO | WO 96/31980 A1 | 10/1996 |
| WO | WO 96/34467 A1 | 10/1996 |
| WO | WO 96/34486 A1 | 10/1996 |
| WO | WO 96/34491 | 10/1996 |
| WO | WO 96/41471 | 12/1996 |
| WO | WO 96/41477 A1 | 12/1996 |
| WO | WO 96-41478 | 12/1996 |
| WO | WO 97/02702 A2 | 1/1997 |
| WO | WO 97/04595 A1 | 2/1997 |
| WO | WO 97/07656 | 3/1997 |
| WO | WO 97/13368 | 4/1997 |
| WO | WO 97/17774 A1 | 5/1997 |
| WO | WO 97/18675 | 5/1997 |
| WO | WO 97/26612 A1 | 7/1997 |
| WO | WO 97/31480 | 8/1997 |
| WO | WO 97/41673 A2 | 11/1997 |
| WO | WO 97/42763 | 11/1997 |
| WO | WO 97-48230 | 12/1997 |
| WO | WO 97/49237 | 12/1997 |
| WO | WO 97/49241 | 12/1997 |
| WO | WO 97-49242 | 12/1997 |
| WO | WO 98/06219 | 2/1998 |
| WO | WO 98-10589 | 3/1998 |
| WO | WO 98-16062 | 4/1998 |
| WO | WO 98-17064 | 4/1998 |
| WO | WO 98/20675 A1 | 5/1998 |
| WO | WO 98/26569 A2 | 6/1998 |
| WO | WO 98-26584 | 6/1998 |
| WO | WO 98/27723 | 6/1998 |
| WO | WO 98/28906 | 7/1998 |
| WO | WO 98/31148 A1 | 7/1998 |
| WO | WO 98/41020 A1 | 9/1998 |
| WO | WO 98-43183 | 10/1998 |
| WO | WO 98/47279 | 10/1998 |
| WO | WO 98-48566 | 10/1998 |
| WO | WO 98/56172 | 12/1998 |
| WO | WO 99-01984 | 1/1999 |
| WO | WO 99/04561 | 1/1999 |
| WO | WO 99/07142 | 2/1999 |
| WO | WO 99-14947 | 3/1999 |
| WO | WO 99/18722 | 4/1999 |
| WO | WO 99/29109 | 6/1999 |
| WO | WO 99-30491 | 6/1999 |
| WO | WO 99-45700 | 9/1999 |
| WO | WO 99-45701 | 9/1999 |
| WO | WO 99-45702 | 9/1999 |
| WO | WO 99/52285 A1 | 10/1999 |
| WO | WO 99/56466 | 11/1999 |
| WO | WO 99/56473 A1 | 11/1999 |
| WO | WO 99/60783 | 11/1999 |
| WO | WO 99/60789 | 11/1999 |
| WO | WO 00/04706 | 1/2000 |
| WO | WO 00-04708 | 1/2000 |
| WO | WO 00-05889 | 2/2000 |
| WO | WO 00/11865 A1 | 3/2000 |
| WO | WO 00/13415 A2 | 3/2000 |
| WO | WO 00/16548 | 3/2000 |
| WO | WO 00/27122 A1 | 5/2000 |
| WO | WO 00-28734 | 5/2000 |
| WO | WO 00/33160 | 6/2000 |
| WO | WO 00/33224 A1 | 6/2000 |
| WO | WO 00/033560 A2 | 6/2000 |
| WO | WO 00/33573 A1 | 6/2000 |
| WO | WO 00/49801 A1 | 8/2000 |
| WO | WO 00/79798 | 12/2000 |
| WO | WO 01/01677 A1 | 1/2001 |
| WO | WO 01/06784 A2 | 1/2001 |
| WO | WO 01/15438 A1 | 3/2001 |
| WO | WO 01/35662 A1 | 5/2001 |
| WO | WO 01/89213 | 11/2001 |
| WO | WO 02/31731 A2 | 4/2002 |
| WO | WO 02/084992 A2 | 10/2002 |

OTHER PUBLICATIONS

ACM Multimedia 93 Proceedings, "A Digital OnDemand Video Service Suporting ContentBased Queries," Little et al. pp. 427436, Jul. 1993.
Instruction Manual *ing StarSight 2*, StarSight Telecast, Inc., 1994.
Schmuckler, Eric, "A marriage that's made in cyberspace (television networks pursue links with online information services)," May 16, 1994, Mediaweek, v4, n20, p. 22 (3).
"TV Guide Online Set for Fall," Entertainment Marketing Letter, Aug. 1994.
"Prodigy Launches Interactive TV Listing," Apr. 22, 1994, Public Broadcasting Report.
Leftwich, Jim, Lai, Willy & Schein, Steve, *StarSight Interactive Television Program Guide, Phase IV*, Functional-Interactional Architecture Specification Document, Orbit Interaction, Palo Alto, California, published before Apr. 19, 1995.
Wittig, H. et al.: "Intelligent Media Agents in Interactive Television Systems" Proceedings of the International Conference on Multimedia Computing and Systems, Los Alamitos, CA May 15, 1995, May 18,1995, pp. 182189, XP00603484 p. 183, left hand column, paragraph 2, p. 184, righthand column, paragraph 2 figure 4.
DiRosa, S., "BIGSURF Netguide," Jul. 1995, vol. 3.1 (Sections 18, 21, and 28 —renumbered as pp. 127).
Rogers, C., "Telcos vs. Cable TV: The Global View," Sep. 1995, Report-Alternative Carriers, Data Communications, No. 13, New York, pp. 75, 76, 78, 80.
Kai et al., "Development of a Simulation System for Integrated Services Television", Report from Information Processing Society of Japan, Japan, Sep. 13, 1996, vol. 96, No. 90 p. 1320.
Eitz, Gerhard, "Zukünftige Informations Und Datenangebote Beim Digitalen Fernsehen EPG Und "Lesezeichen"," Rundfunktechnische Mitteilungen, vol. 41, pp. 6772, Jun. 1997.
Neumann, Andreas, "WDR Online Aufbau Und Perspektiven Automatisierter OnlineDienste Im WDR," Rundfunktechnische Mitteilungen, vol. 41, pp. 5666, Jun. 1997.
"Directv PI² System", Thompson Consumer Electronics, Inc. (1999).
"TV Guide movie database" Internet web pages printed on Aug. 12, 1999 (9 pages).
"Lists< What's on Tonite TV Listing" Internet Article [Online], Jan. 28, 1995, XP002378869 Retrieved from the Internet: URL: www.scout.wisc.edu-Projects-PastProiects-NH-950131-0018.html> [retrieved on Apr. 28, 2006] *the whole document*.
Tom Schauer: Internet Article. [Online] Sep. 28, 1995, XP002378870, Retrieved from the Internet: URL: www.vision2020.moscow.com-Archives-1995-9509-0058.htlm [retrieved on Apr. 28, 2006] the whole document*.
Leftwich, Jim & Schein, Steve, *StarSight Interactive Television Program Guide, Phase III*, Functional-Interactional Architecture Specification Document, Orbit Interaction, Palo Alto, California.
U.S. Appl. No. 09/330,792, filed Jun. 11, 1999, Knudson et al.
U.S. Appl. No. 09/332,244, filed Jun. 11, 1999, Ellis et al.
U.S. Appl. No. 09/356,268, filed Jul. 16, 1999, Rudnick et al.

(56) References Cited

OTHER PUBLICATIONS

"272OR Satellite Receiver User's Guide," General Instrument, 1991, pp. 58-61.
"Addressable Converters: A New Development at CableData," Via Cable, vol. 1, No. 12, Dec. 1981.
"Bell Atlantic Buys Cable TV Company for $22bn," Financial Times (London), Oct. 14, 1993 p. 65.
"Cable Television Equipment," Jerrold Communications Publication, dated 1992 and 1993, pp. 8-2.1 to 8-6 and 8-14.1 to 8-14.3.
"Computer Network: Current Status and Outlook on Leading Science and Technology," Bureau of Science & Technology (Japan), vol. 1, Dec. 1986.
Creation/Modification of the Audio Signal Processor Setup for a PC Audio Editor, IBM Technical Disclosure Bulletin, vol. 30, No. 10, Mar. 1988, pp. 367-376.
"D2B-Home Bus Fur Audio and Video," Selektor, Apr. 1990, pp. 10, 12.
"Dial M for Movie", Funkschau Nov. 1994 Perspektiven, Video on Demand, pp. 78-79. (English language translation attached).
"Dialing the printed page," IT in Europe Profile, 11/Spring 1977.
"Digital Video Broadcasting (DVB); DVB specification for data broadcasting," European Telecommunication Standards Institute, Draft EN 301 192 V1.2.1 (Jan. 1999).
"Electronic Programme Guide (EPG); Protocol for a TV Guide using electronic data transmission," by European Telecommunication Standards Institute, May 1997, Valbonne, France, publication No. ETS 300 707.
"Enhanced Content Specification," "ATVEF," from the internet at http://www.atvef.com/library/spec.html, printed Aug. 22, 2001, the document bears a Copyright date of 1998, 1999, 2000.
"European Telecommunications Standards: Digital Broadcasting Systems for Television Sound and Data Services; Specification for Service Information (SI) in Digital Video Broadcasting (DVB) Systems," European Telecommunications Standards Institute, Dec. 1994.
"Facsimile Transmission," NHK Research Monthly Report, Dec. 1987(Unknown author).
"Getting Started" Installation Guide, "Using StarSight 1" Manual, and Remote Control "Quick Reference Guide," undated.
"Interactive Computer Conference Server," IBM Technical Bulletin, vol. 34, No. 7A, Dec. 1991, pp. 375-377.
"Interface Device for Conventional TVs to Improve Functionality," IBM Technical Disclosure Bulletin, vol. 36, No. 7, Jul. 1993, pp. 53-54.
"MSI Datacasting Systems," TV Communications Journal, Jan. 1973.
"Open TV fur interaktives Fernsehen," Trend and Technik, 9-95 RFE, p. 100. (English language translation attached).
"Open TV Launches OpenStreamer™ Technology for Broadcasters to Deliver First Ever Real-Time Digital Interactive Television," from the internet at http://www.opentv.com/news/openstreamer_press_final.htm, printed on Jun. 28, 1999, the document bears a copyright date of 1999.
"PCT—Notification of transmittal of International Preliminary Examination Report," International Application No. PCT/US97/07449, Feb. 12, 1999, pp. 1-10.
"Prevue Networks and OpenTV(R) Agree to Work Together on Deploying Interactive Program Guides Worldwide," from the internet at http://www.opentv.com/news/prevuefinal.htm, printed on Jun. 28, 1999.
"Probe XL Brochure, Auto Tote Systems Inc.," (Newark, Delaware) (undated) 57 pgs.
"Rewind, reply and unwind with new high-tech TV devices," by Lawrence J. Magid, LA Times. This document was printed from the internet on Jun. 6, 1999 and bears a date of May 19, 1999.
"Technological Examination & Basic Investigative Research Report on Image Databases," Japan Mechanical Engineering Organization Int'l Society for the Advancement of Image Software, Japan, Mar. 1988.
"Technology: Turn on, tune in and print out—An experimental interactive television service is set to alter our viewing habits," Financial Times (London), Oct. 14, 1993, p. 11.
"The New Media and Broadcast Policy: An Investigation & Research Conference Report on Broadcasting Diversification," Radio Regulatory Bureau, Japan Ministry of Posts & Telecommunications, Mar. 1982.
"TV Listings Functional Spec.," Time Video Information Services, Inc., undated.
"Windows 98 Feature Combines TV, Terminal and the Internet," New York Times, Aug. 18, 1998.
"StarSight Interactive Television Program Guide," Jim Leftwich, Willy Lai & Steve Schein Published before Apr. 19, 1995.
"Three men on a Viewdata bike", The Economist, Mar. 25, 1978.
A Financial Times Survey: Viewdata (Advertisement), Financial Times, Mar. 20, 1979.
Advertisement for "TV Decisions," Cable Vision, Aug. 4, 1986.
Alexander, Michael "Visualizing cleared-off desktops," Computerworld, May 6, 1991, p. 20.
Antonoff, M., "Stay Tuned for Smart TV," Popular Science, Nov. 1990, pp. 62-65.
Armstrong, Larry, "Channel-Surfing's next wave: Henry Yuen's interactive TV guide takes on TCI and Viacom," BusinessWeek, Jul. 31, 1995.
Arnold, William F., "Britain to get wired city—via telephone," Electronics, vol. 49, No. 5, Mar. 4, 1976, p. 76.
Bach, U. et al., "Multimedia TV Set, Part 1" Radio-Fernsehen Elektronik (RFE), Sep. 1996, pp. 28, 30, 31. (English language translation attached.).
Bach, U. et al., "Multimedia TV Set, Part 2 and Conclusion," Radio-Fernsehen Elektronik (RFE), Oct. 96, pp. 38-40. (English language translation submitted in parent case.).
Baer, R.H, "Innovative Add-On TV Products," IEEE Transactions on Consumer Electronics, vol. CE-25, Nov. 1979, pp. 765-771.
Bensch, U., "VPV Videotext Programs Videorecorder," IEEE Paper, Jun. 1988, pp. 788-792.
Berniker, "TV Guide Going Online," Broadcasting & Cable, vol. 124, No. 24, Jun. 13, 1994.
Bestler, Caitlin "Flexible Data Structures and Interface Rituals for Rapid Development of OSD Applications," Proceedings from the Eleven Technical Sessions, 42nd Annual Convention and Exposition and Exploration of the NCTA, San Francisco, CA Jun. 6-9, 1993, pp. 223-236. Jun. 6, 1993.
Blahut et al., "Interactive Television," Proceedings of the IEEE, vol. 83, No. 7, Jul. 1995, pp. 1071-1085.
Boyd-Merritt, Rick, "Television wires two-way video," Electronic Engineering Times, Apr. 25, 1994.
Brochure, "A New Approach to Addressability," CableData, undated.
Brochure, "Westar and Videotoken Network Present the CableComputer," Revised Aug 15, 1985 (Plaintiff's 334).
Brochure, Time Inc., "Now, Through the Advances of the Computer Age, You Can Get the Information You Want, When You Want It. Instantly and Conveniently, on Your Home TV Screen," Time Teletext, Time Video Information Services, Inc., undated (V 79167-79175).
Brochure, VTN "Videotoken Network, New Dimension Television," Dec. 1985 (Plaintiff's Exhibit 313).
Cable Computer User's Guide, Rev. 1, Dec. 1985 (Plaintiff's Exhibit 289).
CableData, Roseville Consumer Presentation, Mar. 1985.
Carne, E.B., "The Wired Household," IEEE Spectrum, vol. 16 No. 10, Oct. 1979, pp. 61-66.
Chan, Patrick P., "Learning Considerations in User Interface Design: The Room Model," Publication of the Software Portability Laboratory, University of Waterloo, Ontario, Canada, Jul. 1984.
Chang, Yee-Hsiang et al., "An Open-Systems Approach to Video on Demand," IEEE Communications Magazine, May 1994, pp. 68-80.
Christodoulakis, Steven and Graham, Stephen "Browsing Within Time-Driven Multimedia Documents," publication of the Institute for Computer Research, University of Waterloo, Waterloo, Ontario, Canada Jul. 1988 pp. 219-227.
Office Actions and Replies from U.S. Appl. No. 10/453,388.

(56) References Cited

OTHER PUBLICATIONS

Cox, J. et al, "Extended Services in a Digital Compression System," Proceedings from Eleven Technical Sessions: 42nd Annual Convention and Exposition of the National Cable Television Association, Jun. 1993, pp. 185-191.

Daily, Mack, "Addressable Decoder with Downloadable Operation," Proceedings from the Eleven Technical Sessions, 42nd Annual Convention and Exposition of the NCTA, Jun. 6-9, 1993, pp. 82-89.

Damouny, N.G., "Teletext Decoders-Keeping Up With the Latest Advances," IEEE Transactions on Consumer Electronics, vol. CE-30, No. 3, Aug. 1984, pp. 429-435.

Day, Rebecca, "The Great PC/TV Debate," OEM Magazine, Jul. 1, 1996.

Declaration Under 37 C.F.R. § 1.132 of Richard E. Glassberg, signed Oct. 20, 2006, filed Oct. 24, 2006, from U.S. Appl. No. 10/346,266.

Edwardson, S.M., & Gee, A., "CEEFAX: A Proposed New Broadcasting Service," Journal of the SMPTE, Jan. 1974, vol. 83 No. 1, pp. 14-19.

Electronic Program Guide via Internet, Research Disclosure, Kenneth Mason Publications, Hampshire, GB Nr. 385 (May 1996) p. 276, ISSN:0374-4353.

European Search Report dated Nov. 19, 2002 from European Application No. 989446111.7.

European Telecommunication Standard, "Electronic Programme Guide (EPG); Protocol for a TV Guide using electronic data transmission," pp. 1-45, sections 1-11.12.7 and annex A-P, bearing a date of May 1997.

Growing US interest in the impact of viewdata, Computing Weekly, Jul. 20, 1978.

Hartwig, Rautenberg, Bollmann, "Broadcasting and Processing of Program Guides for Digital TV," SMPTE Journal, pp. 727-732, Oct. 1997.

Hedger, J., "Telesoftware: Home Computing Via Broadcast Teletext," IEEE Transactions on Consumer Electronics, vol. CE-25, No. 3, Jul. 1979, pp. 279-287.

Hoarty, W. Leo, "Multimedia on Cable Television Systems," Symposium Record Table TV Sessions, 18th International Television Symposium and Technical Exhibition, Montreux, Switzerland, Jun. 10, 1993, pp. 555-567.

Hobbes' Internet Timeline, RFC 2235, received at the EPO on Mar. 22, 2007.

Hofmann, Neumann, Oberlies & Schadwinkel, "Videotext Programmiert Videorecorder," Rundfunktechnischen Mitteilungen, (Broadcast Engineering Reports), vol. 26 No. 6, pp. 254-257, Nov.-Dec. 1982.

Holland, Gary L. "NAPLPS standard defines graphics and text communications," EDN, Jan. 10, 1985,pp. 179-192.

Honey, is there anything good on the remote tonight?, advertisement from Multichannel News, Broadband Week Section, p. 168, Nov. 30, 1998.

How Evolve Works, from the Internet at http://www.evolveproducts.com/network.html, printed on Dec. 28, 1998.

Iizuka et al., "Overview of Internet TV Guide Japan," 1 and 2, The 53rd National Conference Proceedings (the second half of 1996), Japan, Information Processing Society of Japan, Sep. 6, 1996, p. 3-227 to 230. (English language translation attached.).

Installation Guide, "Getting Started 1" Manual, and Remote Control "Quick Reference Guide."

Instructional Manual, "Sonic the Hedgehog," Sega of America, 1992.

Ishii, Hiroshi et al., "Clearface: Translucent Multiuser Interface for TeamWorkStation," ECSCW, Sep. 1991, pp. 6-10.

Ishii, Hiroshi et al., "Toward an Open Shared Workspace: Computer and Video Fusion Approach of Team Workstation," Communications of the ACM, Dec. 1991, vol. 34 No. 12, pp. 37-50.

James, A., "Oracle—Broadcasting the Written Word," Wireless World, Jul. 1973, vol. 79 No. 1453, pp. 314-316.

Judice, C.N., "Move Over Cable, Here Comes Video Via Voice Lines," Network World, Sep. 1986, p. 26.

Karstad, K., "Microprocessor Control for Color-TV Receivers," IEEE Transactions on Consumer Electronics, vol. CE-26, May 1980, pp. 149-155.

Keith Lynch's timeline of net related terms and concepts, received at the EPO on Mar. 22, 2007.

Kornhaas, W., "Von der Textprogrammierung uber TOP zum Archivsystem," Radio Fernsehen Elektronik, vol. 40, No. 8, Aug. 30, 1991, pp. 465-468, XP 000240875 Veb Verlag Technik. Berlin, DE ISSN: 1436-1574.

Large, "Throw away the books—Viewdata's coming," Guardian, Jan. 10, 1978.

Large, "Viewdata, The invention that brings boundless advice and information to the home, also sets a test for the Post Office," Financial Guardian, Jun. 29, 1978.

Listing of computer code for operating system within the Cable Computer in 1985 (Plaintiff's Exhibit 298).

Listing of computer code for Video HTU Program (Plaintiff's Exhibit 299), 1995.

Lloyd, "Impact of technology," Financial Times, Jul. 1978.

Lowenstein, R.L. and Aller, H.E., "The Inevitable March of Videotex," Technology Review, vol. 88, Oct. 1985, p. 22.

M/A-COM, Inc., "Videocipher II Satellite Descrambler Owner's Manual," dated Prior Feb. 1986, pp. 1-17.

Mannes, G., "Smart Screens: Development of Personal Navigation Systems for TV Viewers," Video Magazine, Dec. 1993.

Mar. 19, 1985 letter from G. Knapp of CableData to R. Hansen of Weststar Communications, Inc. (Plaintiff's Exhibit 325).

Markowitz, A. "Companies Jump on Interactive Bandwagon," Discount Store News, Dec. 6, 1993, pp. 4 and 131.

McKenzie, G.A., "Oracle—An Information Broadcasting Service Using Data Transmission in the Vertical Interval," Journal of the SMPTE, Jan. 1974, vol. 83 No. 1, pp. 6-10.

Merrell, R.G., "Tac Timer," 1986 NCTA Technical Papers, pp. 203-206.

Miller, Matthew D., "A Scenario for the Deployment of Interactive Multimedia Cable Television Systems in the United States in the 1990s," IEEE, vol. 82, No. 4, Apr. 1994.

Money, Steve A., "Teletext and Viewdata," Butterworth & Co. Ltd., London, 1979.

Mosley, J.D., "NAPLPS chip sets, though scarce, satisfy limited US videotex demand," EDN, Mar. 21, 1985, at 57.

Owen, Kenneth "How dial-a-fact is coming closer to home," The Times, Sep. 30, 1977.

Owen, Kenneth, "Why the Post Office is so excited by its plans for a TV screen information service," The Times, Sep. 26, 1975.

Pfister, Larry T., "Teletext: Its Time Has Come," Prepared for the IGC Videotext / Teletext Conference, Andover, Massachusetts, Dec. 14, 1982, pp. 1-11.

Poole, James, "Demand for Viewdata grows," Sunday Times, Oct. 2, 1977.

Prevue Guide Brochure, Spring 1984.

Prevue Guide Brochure, Spring 1994.

Printout from Google News Archives, received at the EPO on Mar. 22, 2007.

Qayyum, Hamid , "Using IVDS and VBI for Interactive Television," IEEE, Jun. 10, 1996.

Rajapakshe et al., "Video on demand," (last modified Jun. 1995) http://www.doc.ic.ac.uk/~nd/surprise_95 /journal/vol4/shr/report.html.

Rath et al., "Set-Top Box Control Software: A Key Component in Digital Video," Philips Journal of Research, vol. 50, No. 1/2 1996, pp. 185-199.

Rayers, D.J., "Telesoftware by Teletext," 1984 IEEE Conference Papers, vol. 240, p. 323.

Reaching your subscribers is a complex and costly process-until now, from the Internet at http://www.evolveproducts.com/info.html, printed on Dec. 28, 1998.

Roizen, Joseph "Teletext in the USA," Society of Motion Picture and Television Engineers Journal, Jul. 1981, pp. 602-610.

Rosch, Gary D., "New data and information system set for commercial market trial," Telephony, Mar. 20, 1978, at 98.

Roseville City Council Presentation, Mar. 13, 1985 (Defendant's Exhibit 226).

(56) References Cited

OTHER PUBLICATIONS

Ross Peddicord, "New on TV: You Bet Your Horse," The Sun, Baltimore Maryland Dec. 15, 1994, 1 pg.
Ruffler et al., "InfoRadio on Demand, WebTV and digiTaz—Telecommerce Case Studies," 3rd International Workshop on Community Networking, 1996, May 23-24, 1996, pp. 71-76.
Ryan, Margaret, "Interactive TV Takes a Corporate Twist," Electronic Engineering Times, Jul. 10, 1995.
Sandringham, St. John, "Dress rehearsal for the Prestel show," New Scientist, Jun. 1, 1978, pp. 586-588.
Schlender, B.R., "Couch Potatoes! Now Its Smart TV," Fortune, Nov. 20, 1989, pp. 111-116.
Sealfon, Peggy, "High Tech TV," Photographic, Dec. 1984.
Selected pages from the "BBC Online—Schedules" web page. This web page is located at http://www.bbc.co.uk/schedules/1997/05/24/bbc.1.html (as printed from the Internet on Oct. 19, 1999 and being dated as early as May 24, 1997).
Sharpless et al., "An advanced home terminal for interactive data communication," IEEE,1977 International Conference on Communications, ICC '77, vol. 2, Jun. 12-15, 1977, at 19.6-47.
Sorce, James et al., "Designing a Broadband Residential Entertainment Service: A Case Study," GTE Laboratories Incorporated, undated, pp. 141-148, undated.
Statement in an Examination Report dated Aug. 2, 1999 for a counterpart foreign application filed in New Zealand in which the foreign Examiner alleges that he has used "the Internet to access television listings for BBC World television as far back as mid 1996 . . . "
Stickland, D. C., "Its a common noun," The Economist, Jun. 5, 1978.
Stokes, Adrian, "The viewdata age: Power to the People," Computing Weekly, Jan. 1979.
Sunada, K. et al, "Teletext Color Television Receiver Model C-29M950, C26M940," NEC Home Electronics , NEC Giho, 1987.
Sun's Next Steps in Digital Set-Tops, article in Cablevision, p. 56, Nov. 16, 1998.
Supplementary European Search Report for Application No. EP 98 93 5889, completed on Sep. 28, 2001.
Sussman, A. "GTE Tunes in to Home TV Shopping," PC Week, Jun. 28, 1988, p. C15.
Tech Notes: Product Updates from M/A-COM Cable Home Group, "Videocipher Owner's Manual Update," Issue No. 6, Feb. 1986.
Technical White Paper, "Open TV™ Operating Environment," ( © 1998 OpenTV Inc.), pp. 1-12.
Teletext presents the alternative view, Financial Times, Oct. 24, 1977.
The clickTV television program guide website of TVData of Queensbury, New York. This website is located at www.clicktv.com (as printed from the Internet on Aug. 13, 1997).
The Evolve EZ Guide. The Remote Control, from the Internet at http://www.evolveproducts.com/display2.html, printed on Dec. 28, 1998.
The InfoBeat television program guide website of InfoBeat, Inc. This website is located at www.infobeat.com (as printed from the Internet on Dec. 8, 1997).
The television program guide website of Gist Communications, Inc. of New York, New York. This website is located at www.gist.com (as printed from the Internet on Aug. 14, 1997).
The television program guide website of TV Guide Entertainment Network. This website is located at www.tvguide.com (as printed from the Internet on Aug. 14-22, 1997).
Transcript of the Deposition of John Roop, Oct. 1996, pp. 186-187.
Trial testimony of Michael Axford, Prevue Interactive, Inc. and United Video Satellite Group, Inc. v. Starsight Telecast, Inc., May 9, 1998, pp. 186-187, 295-315, and 352-357.
Ueda, Hirotada et al, "Impact: An Interactive Natural-Motion-Picture Dedicated Multi-Media Authoring System," Communications of the ACM, Mar. 1991, pp. 343-350.
UVSG Offers System-Specific Web Site Development for OPS, press release of United Video Satellite Group, Apr. 12, 1996.
UVSG Teams With Microsoft on Internet Information Server, press release of United Video Satellite Group, Feb. 22, 1996.
Various publications of Insight Telecast, 1992 and 1993.
Veith, R.H., "Television's Teletext," Elsevier Science Publishing Co., Inc, 1983, pp. 13-20, 41-51.
Videocipher Stipulation, May 1996.
VideoGuide, "Videoguide User's Manual," pp. 1-27.
Viewdata and its potential impact in the USA: Final Report/vol. One, The UK Experience, Link and Butler Cox & Partners Limited, Oct. 1978.VideoGuide, "VideoGuide User's Manual," pp. 1-27 (p. 11 is the most relevant).
Viewdata moves in US but GEC may lose out, Computing Weekly, Jan. 25, 1978.
Viewdata Service Terminal Specification, British Post Office, Issue 5, Aug. 1978.
Web TV and Its Consumer Electronics Licensees debut First Internet Television Network and Set Top Box XP 002113265 Retrieved from the Internet: <URL http://www.ohlfs.com/keith/self/webtv/home/HTML/home.license.html>dated Jul. 10, 1996.
What is Jini?, from the Internet at http://java.sun.com/products/jini/whitepapers/whatsjini.pdf, printed on Jan. 25, 1999.
Whitehorn, Katharine, "Viewdata and you," Observer, Jul. 30, 1978.
Why Jini Now?, from the internet at http://java.sun.com/products/jini/whitepapers/whyjininow.pdf, printed on Jan. 25, 1999. The document bears a copyright date of 1998.
Wikipedia article on CompuServe, received at the EPO on Mar. 22, 2007.
Yoshida, Junko, "Interactive TV a Blur," Electronic Engineering Times, Jan. 30, 1995.

* cited by examiner

FIG. 6
SHOW LIST

| Offset | 7 | 6 | 5 | 4 | 3 | 2 | 1 | 0 |
|---|---|---|---|---|---|---|---|---|
| 0x00 | | | | TYPE=0x02 | | | | |
| 0x01 | | | | NBR BLOCKS | | | | |
| 0x02 | | | | VERSION | | | | |
| 0x03 | MSB | | | START TIME GMT | | | | |
| | | | | | | | | LSB |
| 0x07 | | | START DELIMITER=0xEE | | | | | |
| 0x08 | RESV | PPV | GRPF | DIDF | DMYF | | | |
| 0x09 | | | | DURATION | | | | |
| 0x0A | MSB | | SHOW TITLE HANDLE | | | | | LSB |
| 0x0C | MSB | | SHOW DESCRIPTION HANDLE | | | | | LSB |
| 0x0E | MSB | | GROUP ID | | | | | LSB |

| | |
|---|---|
| 0x00 | |
| 0x01 | |
| 0x02 | |
| 0x04 | |
| 0x06 | |

END DELIMITER=0xFF

FIG. 5
CHANNEL DATA TABLE

| Offset | 7 | 6 | 5 | 4 | 3 | 2 | 1 | 0 |
|---|---|---|---|---|---|---|---|---|
| 0x00 | | | | TYPE=0x01 | | | | |
| 0x01 | | | | NBR BLOCKS | | | | |
| 0x02 | | | | 0x00 | | | | |
| 0x03 | | | | NBR CHANNELS | | | | |
| 0x04 | MSB | | CHANNEL ID | | | | | LSB |
| 0x06 | DPF | ICF | NDF | | | NF | TMSB | |
| 0x07 | | | TUNE CHANNEL NBR | | | | | |
| 0x08 | | | TRANSPONDER NBR | | | | | |
| 0x09 | | | SATELLITE NBR | | | | | |
| 0x0A | | SOURCE | CHANNEL TYPE | | | | NMSB | |
| 0x0B | | | NATIVE CHANNEL NBR | | | | | |
| 0x0C | | | NAME MASK BITS | | | | | |
| 0x0D | | | FAVORITES LINK | | | | | |
| 0x0E | MSB | | SHOWLIST HANDLE TABLE HANDLE | | | | | LSB |
| 0x10 | MSB | | NAME AFFILIATION STRING | | | | | |
| 0x18 | MSB | | DUPLICATE CHANNELS HANDLE | | | | | LSB |

| | |
|---|---|
| 0x00 | |
| 0x02 | |
| 0x03 | |
| 0x04 | |
| 0x05 | |
| 0x06 | |
| 0x07 | |
| 0x08 | |
| 0x09 | |
| 0x0A | |
| 0x0C | |
| 0x14 | |

FIG. 7B

SHOW DESCRIPTION ENTRY

| | 7 | 6 | 5 | 4 | 3 | 2 | 1 | 0 |
|---|---|---|---|---|---|---|---|---|
| 0x00 | \multicolumn{8}{c|}{TYPE=0x60 / NBR BLOCKS} |
| 0x01 | CMPF | CCF | SF | BW/C | RF | REF CNT MSB'S |
| 0x02 | \multicolumn{8}{c|}{REFERENCE COUNT} |
| 0x03 | MSB | | | THEME INDEX ID | | | | LSB |
| 0x05 | \multicolumn{4}{c|}{CRITICS RATING} | \multicolumn{4}{c|}{MPAA} |
| 0x06 | \multicolumn{8}{c|}{TRAITS MASK BITS} |
| 0x07 | \multicolumn{8}{c|}{YEAR PRODUCED} |
| 0x08 | \multicolumn{8}{c|}{SHOW DESCRIPTION TEXT} |

FIG. 7A

SHOW TITLE ENTRY

| | 7 | 6 | 5 | 4 | 3 | 2 | 1 | 0 |
|---|---|---|---|---|---|---|---|---|
| 0x00 | \multicolumn{8}{c|}{TYPE=0x50 / NBR BLOCKS} |
| 0x01 | CMPF | CCF | SF | BW/C | RF | REF CNT MSB'S |
| 0x02 | \multicolumn{8}{c|}{REFERENCE COUNT} |
| 0x03 | MSB | | | THEME INDEX ID | | | | LSB |
| 0x05 | \multicolumn{8}{c|}{SHOW TITLE TEST} |

FIG. 8

THEME CATEGORY TABLE

| | 7 | 6 | 5 | 4 | 3 | 2 | 1 | 0 |
|---|---|---|---|---|---|---|---|---|
| 0x00 | colspan TYPE=0x05 ||||||||
| 0x01 | NBR BLOCKS ||||||||
| 0x02 | VERSION ||||||||
| 0x03 | NBR THEME CATEGORIES ||||||||
| 0x04 | THEME CATEGORY ID ||||||||
| 0x05 | ATTRIBUTES FLAG ||||||||
| 0x06 | MSB THEME SUBCATEGORY |||||||LSB|
| 0x07 | HANDLE TABLE ||||||||
| 0x08 | CATEGORY NAME LENGTH ||||||||
| 0x09 | MSB |||||||  |
| ... | ... ||||||||
| 0x0M | THEME CATEGORY NAME ||||||||
| ... | ... ||||||||

FIG. 9

THEME SUBCATEGORY TABLE

| | 7 | 6 | 5 | 4 | 3 | 2 | 1 | 0 |
|---|---|---|---|---|---|---|---|---|
| 0x00 | TYPE=0x06 ||||||||
| 0x01 | NBR BLOCKS ||||||||
| 0x02 | THEME CATEGORY ID ||||||||
| 0x03 | NBR THEME SUBCATEGORIES ||||||||
| 0x04 | THEME SUBCATEGORY ENTRY LENGTH(m) ||||||||
| 0x05 | ATTRIBUTES FLAG ||||||||
| 0x06 | NBR THEME INDECIES(k) ||||||||
| 0x07 | MSB THEME ID 1 |||||||LSB|
| ... | ||||||||
| 0x09 | MSB THEME ID 2 |||||||LSB|
| ... | ... ||||||||
| 6+2k | MSB THEME ID k |||||||LSB|
| ... | ||||||||
| 8+2k | MSB ||||||||
| ... | ... ||||||||
| 0xm | THEME SUBCATEGORY NAME ||||||||
| ... | ... ||||||||

FIG. 18C

```
ENTERING PASSWORD
BY ENTERING YOUR PASSWORD YOU ARE CONFIRMING
A PURCHASE OR VALIDATION OF YOUR ID.
PLEASE ENTER YOUR PASSWORD TO ORDER THIS
MOVIE FOR THE LISTED PURCHASE PRICE.
```

```
HELP: PASSWORD
(1) INFO ON (LEGENDS OF THE FALL)         $3.95
```

```
ENTER PASSWORD FOR DELIVERY IN 7 MINUTES
@ 7:55PM    LEGENDS OF THE FALL-$3.95

• • • • • • • • • • •

(2) ACCEPT PASSWORD...
(<) BACK TO PREVIOUS MENU
```

```
(0) GO BACK TO PROGRAM GUIDE
```

FIG. 18D

```
CONFIRMING YOUR PURCHASE
YOU HAVE SUCCESSFULLY ENTERED YOUR
PASSWORD.
CLICKING ON "YES" ITEM WILL FINALIZE YOUR PURCHASE.
```

```
HELP: CONFIRMING YOUR PURCHASE
(1) INFO ON (LEGENDS OF THE FALL)         $3.95
```

```
YOU HAVE SUCCESSFULLY ENTERED YOUR
PASSWORD. ARE YOU SURE YOU WANT TO
PROCEED TO FINALIZE YOUR ORDER ?

(2) YES
(<) NO (BACK TO PREVIOUS MENU)
```

```
(0) GO BACK TO PROGRAM GUIDE
```

FIG.21D

ENTERING PASSWORD
BY ENTERING YOUR PASSWORD YOU ARE CONFIRMING A PURCHASE OR VALIDATION OF YOUR ID. PLEASE ENTER YOUR PASSWORD TO ORDER THIS ITEM FOR THE LISTED PURCHASE PRICE.

HELP: PASSWORD (1) INFO ON (OFFICIAL NFL CAP)  $9.95

ENTER PASSWORD FOR DELIVERY VIA U.P.S.
OFFICIAL NFL CAP-WA REDSKINS-$9.95

| . . . . . . . . . . .

(2) ACCEPT PASSWORD...

(<) BACK TO PREVIOUS MENU (0) GO BACK TO PROGRAM GUIDE

FIG.21F

```
OFFICIAL NFL CAP
A GOOD-LOOKING ACCESSORY FOR ANY FAN. YOUR
FAVORITE NFL TEAM LOGO EMBROIDERED ON A
TOP-QUALITY ALL-COTTON CAP. COMES IN TEAM COLORS.
                          SPECIAL OFFER-$9.95
SPORTS: FOOTBALL
(1) MORE INFORMATION

YOUR ORDER CONFIRMED !
  12.15.95    OR.#950384271    IT.#3452NP
  ACCOUNT  234.95430      PURCHASE: $9.95
  (2) OK (BACK TO PREVIOUS MENU)
  (3) GO TO YOUR LIST OF PURCHASES (0) GO BACK TO PROGRAM GUIDE
```

SYSTEMS AND METHODS FOR CONTEXTUALLY LINKING TELEVISION PROGRAM INFORMATION

CROSS-REFERENCE TO RELATED APPLICATION

This application is a continuation of U.S. patent application Ser. No. 11/894,782, filed on Aug. 20, 2007, now abandoned, which is a continuation of U.S. patent application Ser. No. 10/725,170, filed on Dec. 1, 2003, now abandoned, which is a continuation of U.S. patent application Ser. No. 08/837,298, filed on Apr. 11, 1997, now U.S. Pat. No. 6,732,369, which claims the benefit of Provisional Patent Application Nos. 60/022,826, filed on Jul. 26, 1996, and 60/015,648, filed on Apr. 19, 1996, the complete disclosures of which are hereby incorporated herein by reference in their entireties. This application is also related to U.S. patent application Ser. No. 08/837,025, filed Apr. 11, 1997, and its Appendices A, B, and C, the complete disclosure of which is also incorporated herein by reference.

BACKGROUND OF THE INVENTION

The present invention generally relates to systems and methods for providing information to television viewers, and more particularly to systems and methods for allowing the viewer to retrieve, search, select and interact with television schedule information located in a remote database, computer network or on-line service, e.g., a network server on the Internet or World Wide Web.

As the number of television stations in a metropolitan area or on a cable network has increased, the number of programs of potential interest that are presented to a viewer has risen dramatically. With the use of dish antennas capable of receiving direct satellite signals, the multitude of programs available to the viewer has further increased. Consequently, television schedule systems that are provided directly on the viewer's television screen have been developed to assist the viewer in sorting through these various programs and determining which programs to watch or record. One such television schedule system is disclosed in commonly assigned U.S. Pat. No. 5,353,121 (Young et al.), the complete disclosure of which is hereby incorporated by reference. In one embodiment of Young, the television schedule includes a series of menu screens having an array of cells corresponding to different television programs. The viewer may scroll through the cells to view which television programs are being presented on various channels at various times. In addition, the viewer may select certain cells to obtain more information on the associated program or to pull up other submenus with additional options.

The recent development of television schedule systems, such as the above described patent to Young, have created many new challenges and opportunities. One such challenge and opportunity is to provide viewers with additional information associated with a particular program in the television guide. As a television viewer is browsing through the television programs, he or she may wish to obtain more information relating to specific areas of interest or concerns associated with the show, such as the actors, actresses, other movies released during the same time period, or travel packages or promotions that may be available through primary, secondary or third party vendors. Offering this type of information to the television viewer can be difficult, however, because their are hundreds of different programs broadcast every day. In addition, the available information changes at a rapid pace, which makes it even more difficult to provide this information in present television schedule guides.

In television broadcasting, it may also be desirable to interact with the viewer. There are many commercials and programs which request viewer action such as purchasing an advertised product, making a monetary contribution, responding to a survey, answering a question, or participating in contests with other viewers, for example. One problem with this existing system is that it is often difficult to motivate a viewer to request information or send in a contribution after the broadcast of the commercial or program. Viewers will often forget the advertisement or simply lose motivation to spend money or request information after the commercial or program is over. Another problem is that companies sponsoring these commercials or programs would often like to provide their viewers with further information, if the viewers could be identified or if the viewer requests the additional information. Thus, it would be desirable to provide a ready and efficient method to facilitate an exchange of information between television viewers and producers, promoters and advertisers during the broadcast of the commercial or program.

SUMMARY OF THE INVENTION

The present invention provides systems and methods for providing television schedule information on a visual interface, and for allowing the viewer to retrieve, search, select and interact with information located in a remote database, computer network or on-line service, such as a network server on the Internet or World Wide Web. The television schedule information can be displayed on a variety of visual interfaces, such as televisions screens, computer monitors, PCTV screens and the like. The television schedule information may be stored on the viewer's computer, television, PCTV, or a remote server (e.g., a website), or the television schedule information may be downloaded from a remote database or computer network to the viewer's computer, television or PCTV. The present invention also provides systems and methods for allowing the viewer to navigate and interact with a program guide that is displayed, for example, on the viewer's television screen. The program guide will usually include a schedule information area that depicts the programs that are being presented on each channel at each time during the day, week or month. With an input device, such as a remote control device, pointing device, mouse, keyboard, microphone or the like, the viewer can browse through the schedule information area and/or obtain more information about programs of particular interest.

In one embodiment, the invention provides an interactive television schedule and/or listing information system which can access television schedule and/or listing information from remote databases or network servers, such as the Internet or World Wide Web, and provide user access to these databases and servers. Access to computer networks may be provided without tying up any phone lines, and without the need for a personal computer (e.g., an "NC" or Network Computer). In a preferred configuration, a cable modem located within a cable system provides access to the Internet. A memory within the cable system stores a computer program and any data received from the cable modem, such as the television schedule information. The cable system further include a processor, which uses the computer program to organize the television schedule information into a desired format. The television schedule information is then displayed on a television screen, computer monitor, PCTV and other interactive display devices in the desired format.

In yet another embodiment, the present invention provides a system and method for allowing the user to contextually link with a remote database, network server or on-line service, and search, select, and/or initiate a subscription to more information relating to specific areas of interest or concerns associated with a program in the television schedule information system. In this embodiment, the system includes a viewer interface having a display for displaying television schedule and/or listing information to a viewer, a data line coupled to the display for communicating with an external computer network, and a memory having software for retrieving linking data from the computer network. Preferably, the linking data is contextually related to information in the television schedule guide, such as a program's title or content. The external computer network will preferably include the Internet, the World Wide Web and other existing network servers. In this way, the user of the television schedule system may conduct a comprehensive search for information and/or related products, offers, and services about a particular program/television show or for information and/or related products, offers, and services relating to the show, the actors, the actresses, and show's theme and the like.

In another embodiment of the invention, a system and method is provided for contextually recording television programs that are listed as a user's "favorite" or in some other category. In this embodiment, a user identifies to the system (or the system automatically identifies) favorite subject matters, actors, actresses, etc. For example, the user may input into the system that he/she likes Jerry Seinfeld. Thereafter, the system tags any program it finds where Jerry Seinfeld is involved (i.e., he is a guest on the Tonight Show). In addition to tagging the show, according to this embodiment of the invention, the system will automatically program the VCR to record any or all of the shows with that tag. The user may then view the contextually recorded programs at any time he or she desires. Thus, the system will constantly search for any show that includes Jerry Seinfeld and record that show, episode, or only the portion of the show that involves Jerry Seinfeld. The user will then have a list of all the shows or some of the shows that feature Jerry Seinfeld and can view these shows at his or her leisure.

In another embodiment of the invention, a system and method is provided for accessing television schedule and/or listing information from one or more file servers on a computer network, such as the Internet or the World Wide Web. The television information guide may be accessed and viewed through a computer system, a television system, a PCTV, or a simple display coupled to a communication link, such as a telephone line or the like. The television schedule guide will preferably be stored as one or more files (e.g., websites or Internet broadcast transmitters) on one or more file servers that are connected to each other on a network, which can be accessed by any viewer having access to the network. The television schedule guide or websites or Internet broadcast transmitters may be configured for viewing and interacting with television information directly on-line, or it may be configured for downloading the information and/or information-processing/facilitating applet or application into a local processor coupled to the viewer interface. The guide or website will provide listing information for all channels and/or sources in the viewer's local cable line-up or available sources. The websites or Internet broadcast transmitters may also be capable of creating personalized TV listings with search and sort features that allow the viewer to call up or be presented with favorite programming choices based on categories, such as channel, day actor, movie genre or other desired categories.

BRIEF DESCRIPTION OF THE DRAWINGS

FIG. 5 schematically illustrates a channel data table for the data structure of FIG. 4.

FIG. 6 illustrates a show list data table for the data structure of FIG. 4.

FIGS. 7A and 7B illustrate show title entries and show description entries, respectively, for the data structure of FIG. 4.

FIGS. 8 and 9 illustrate theme category entries and them subcategory entries, respectively, for the data structure of FIG. 4.

FIGS. 18A-18E illustrate a Video On Demand menu and an associated submode menu.

FIGS. 21A-21F illustrate a system and method for contextually linking a program to a database on a computer network.

DESCRIPTION OF THE SPECIFIC EMBODIMENTS

The present invention provides systems and methods for providing television schedule and/or listing information to a viewer, and for allowing the viewer to link, search, select, retrieve, initiate a subscription to and interact with information in a remote database, computer network or on-line server, e.g., a network server on the Internet or World Wide Web. The television schedule and/or listing information can be displayed on a variety of viewer interfaces, such as televisions screens, computer monitors, PCTV screens and other interactive display devices. The television schedule and/or listing information may be stored on the viewer's computer, television, PCTV, or a remote server (e.g., a website), or the television schedule and/or listing information may be downloaded from a remote database or computer network and/or internet broadcast to the viewer's computer, television or PCTV. Suitable television schedule and/or listing information systems or video guides that can be used with the present invention are described in commonly assigned U.S. Pat. Nos. 5,353,121, 5,479,266, the complete disclosures of which are hereby incorporated by reference. The systems and methods of the present invention may also be useful with video guides available under the name of SuperGuide™ from The SuperGuide Corporation of Shelby, N.C.

Figure 1:
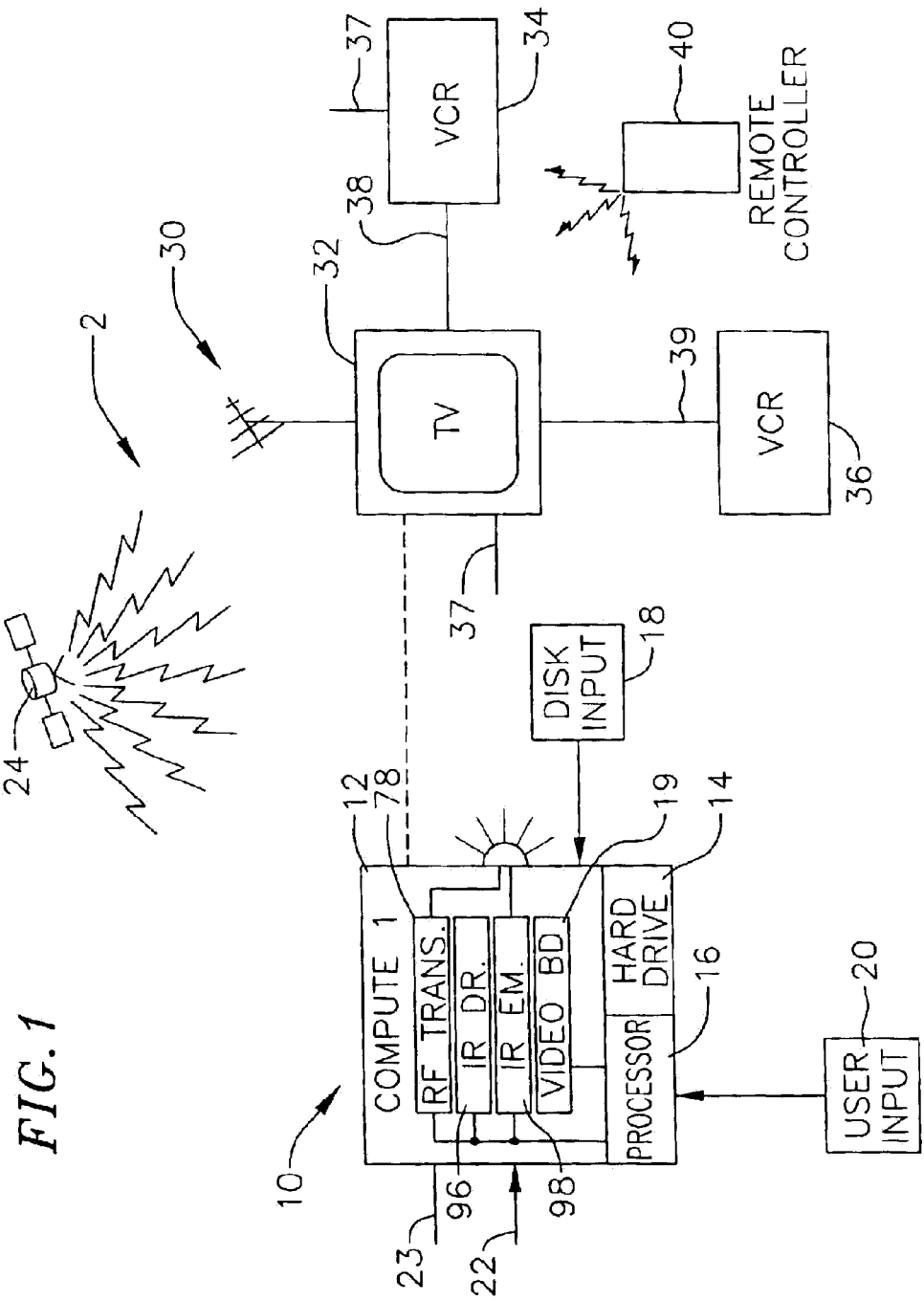
FIG. 1 is a schematic view of a representative interactive computer system coupled to a television system.

In one embodiment, the invention incorporates an interactive computer system which assists the viewer in utilizing television schedule and/or listing information and linking with a database to search and retrieve, initiate a subscription to, information. Preferably, the information is contextually related to television programs within the television schedule and/or listing information. Referring to the drawings in detail, wherein like elements are indicated by like numerals, a representative television schedule and/or listing information system 2 for use with the contextual linking system and method of the present invention is illustrated in FIGS. 1-7. As shown in FIG. 1, schedule system includes a computer system 10 coupled to a television system 30. Computer system 10 includes a standard computer 12 which is, for example, any available to personal computer (e.g., IBM compatible, Macintosh, and the like). Computer 12 can also be located within a set-top box (e.g., a DSS box). Computer 12 contains a hard drive 14, a processor 16 and a disk input 18 for providing computer 12 with various, additional software. An input device 20 allows a viewer to interact with computer 12 and/or a television schedule guide (described below and illustrated in FIGS. 12-17). Line 23 is connected to an available serial, parallel or other data port 23 on computer 12. This line 23 is used to connect other devices/components to computer 12.

In another embodiment, computer system 10 may be combined with television system 30 to form a PCTV. In this embodiment, the computer will usually include a processor that may be used solely to run the program guide and associated software, or the processor may be configured to run other applications, such as word processing, graphics, or the like. The computer will usually be incorporated into the television set so that the television display can be used as both a television screen and a computer monitor. Alternatively, the television may be incorporated into the computer so that the computer monitor performs this dual function. Usually, the PCTV will include a number of input devices, such as a keyboard, a mouse and a remote control device, similar to the one described above. However, these input devices may be combined into a single device that inputs commands with keys, a trackball, pointing device, scrolling mechanism, voice activation or a combination thereof.

Television system 30 includes a television 32, which may be any commercially available television, and a user input device 20. Television system 30 may or may not include a video tape recorder (VCR). In this embodiment, VCRs 34 and 36 are coupled to television 32. These VCRs 34 and 36 can be, for example, any commercially available VCRs or any other type of recording and/or storage device (analog or digital). Input device 20 allows the viewer to interact with television 32, VCR 34, and/or VCR 36. Input device 20 may be a remote control, keyboard, mouse, a voice activated interface or the like. A suitable input device for use with the present invention is described in U.S. Provisional Application Ser. Nos. 60/022,826, filed on Jul. 26, 1996, and 60/015,648, filed on Apr. 19, 1996, the complete disclosures of which are incorporated herein by reference. A line 37 is used to connect other devices to VCR 34. Other devices can also be connected in series between VCR 34 and television 32 via line 38. With this configuration, computer 12 (or computer system 10) and television 32 (or television system 30) can be located in different rooms within a private residence or a commercial building.

In one embodiment, a computer program provided on diskettes, a CD ROM or other medium contains the software needed for receiving, organizing and displaying data for the television schedule guide. These diskettes are inserted in disk input 18 and the software for these diskettes is stored within computer 12 on hard drive 14 or on another mass storage location. This action can be performed by, for example, the user or a service person. The computer program can also be provided access, download, and/or automatically upgrade, for example, via downloading from a satellite 24, transmission through the internet or other on-line service, or transmission through another type of land line 22 (e.g., coax cable, telephone line, optical fiber, or wireless technology (e.g., Richochet™).

In addition to the computer program, data for the basic schedule information and other related data (e.g., data relating to a particular show) are needed for the generation and maintenance of the television schedule and/or listing information guide. These data are received, in the preferred embodiment, via line 22; they can also be provided via a satellite broadcast from satellite 24 or wireless technology (e.g., Richochet™). Additionally, the television schedule and/or listing information and related data can be sent directly to television 32 via satellite 24 or wireless technology (e.g., Richochet™). In this arrangement, the television schedule information and related data does not have to be transmitted from computer system 10 to television system 30.

In one embodiment, line 22 is a telephone line which provides access to the internet or other on-line service via, for example, a regular modem or direct modem access to a schedule provider. The schedule data are then provided to the viewer from a remote database via the internet or other online service, or directly from the service provider. As stated above, line 22 can also be, for example, coax cable, optical fiber or any other land line which can provide data to computer 12. The software program saved on hard drive 14 then utilizes the data received on line 22 to generate a television schedule guide. The user can retrieve this generated television schedule guide when desired.

1. Overview of a Preferred EPG System

Figure 2:
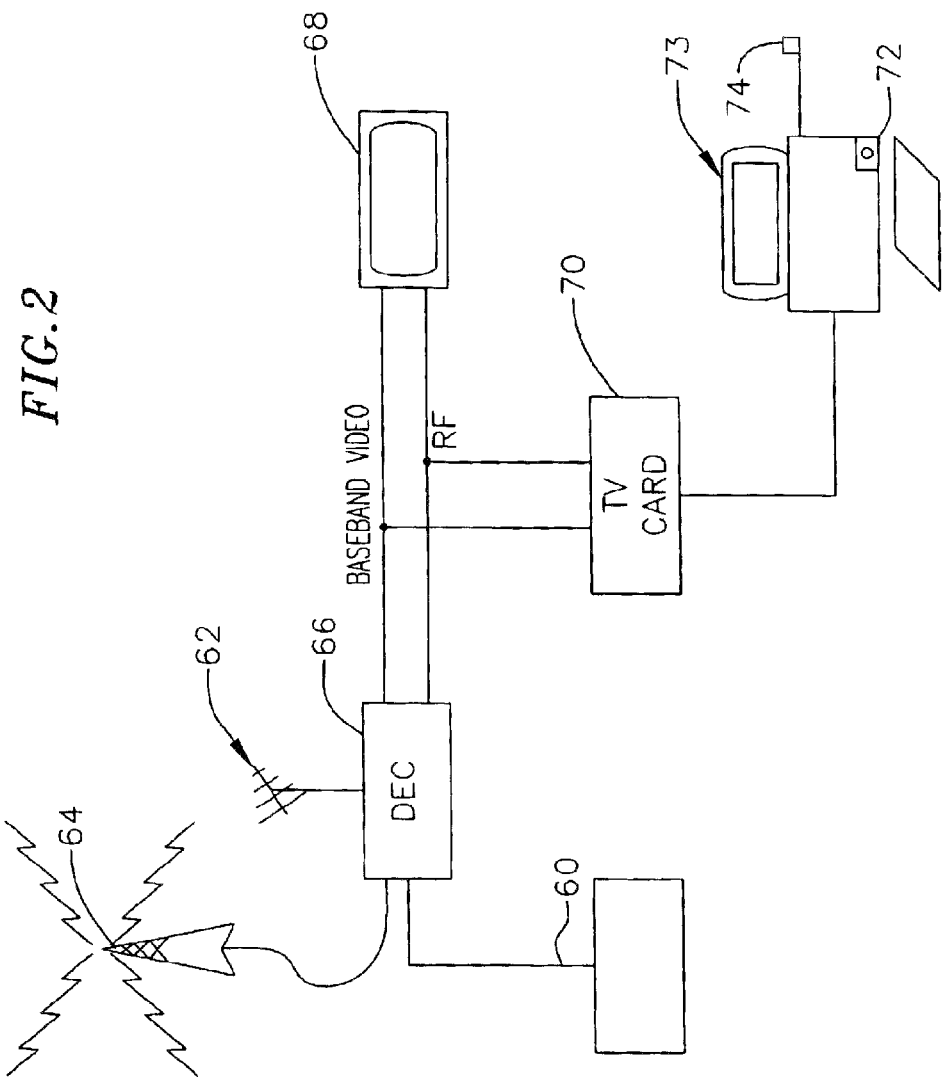
FIG. 2 illustrates another exemplary television system for use with an electronic program guide according to the present invention.

In a preferred embodiment, the electronic program guide of the present invention may be implemented either on a personal computer, a PCTV, a television connected to a set-top box, or a television including a custom board. However, the invention is not limited to any particular hardware configuration and will have increased utility as new combinations of computers and television systems are developed. In the following any of the above will sometimes be referred to as a "TV system". Block diagrams of representative TV systems are depicted in FIG. 2. Details of implementation are not depicted because the invention is not limited to any particular TV system.

As is well known, the picture to be displayed may be transmitted as an analog signal, for is example according to the NTSC standard utilized in the United States, or as a digital signal modulated onto an analog carrier. The signals may be received over a cable, or via an antenna or satellite dish. Typically, television sets are designed to receive analog signals and computers display devices are designed to display pictures encoded in a digital format. However, decoder system converts the digital data to an analog signal for display on a television set and TV modems can format analog TV signals for display on a monitor.

In FIG. 2, analog or digital TV signals, received via cable 60, antenna 62, or satellite dish 64, are provided to a television system. If the signal is from a digital broadcast service, then a decoder 66 converts the signal to baseband video and audio or channel 3/4 RF. If the signal is an analog signal, it is passed through as a live video output. The television system 68, depending on its configuration, receives selected ones of the outputs and displays the received program.

A PCTV includes a TV card 70, connected to either live video, baseband video, or channel 3/4 output, digitizes the video image and displays the video image in a resizeable window on the computer monitor. The PCTV is also coupled to land telephone lines by a modem 72.

If the received signal is an analog TV signal the TV card of the PCTV digitizes the analog signal and extracts included information from the vertical blanking intervals. On the other hand, if the signal is a digital signal, separate audio, video, VBI (vertical blanking information such as closed caption, teletext, and program related information), program guide, and conditional access information are provided as separate bitstreams. The video and audio bitstreams for programs are converted to a format for display and the program guide information is processed to form program guide database. The processor, executing software stored in memory, generates interactive electronic program guide images and images of received programs. The guide can be used to interact with and control programs displayed in the window.

A television system configured to display an electronic program guide such as a guide provided by StarSight telecast includes an on-screen display controller and other hardware described below. If a standard analog broadcast signal is received program guide data is extracted from the VBI by a VBI data slicer and processed to form a program database. If a DBS digital signal is received, either from a satellite or cable, VBI and program data are provided in separate bit streams. The program guide images are either generated locally or remotely and provided to an on screen display controller. Interactivity is provided via a remote control.

Alternatively, the program guide can be displayed on a computer monitor 83 that interactively controls the television set through, for example, an IR interface including an IR blaster 84 to generate IR codes to control the television and/or a VCR.

If the electronic guide database is generated locally, the system for creating the electronic programming guide must receive television schedule information and process the received information to create a database. Thus, the system usually requires, a data reception unit, a processor, memory to store program code and a database, an on-screen display generator (OSD), and a control interface for tuning to selected channels.

In one preferred embodiment, the schedule information is transmitted as a set of short commands of specified formats. Different commands communicate information such as a show schedule for a given channel, the title of each show in the schedule, descriptions and information attributes about each show in the channel. Thus, information for a show to be broadcast at a particular time is transmitted in several commands. ID numbers in the commands facilitate organizing the information into a relational database utilizing database engine (DBE) software stored in memory and executed by the processor.

Figure 3:
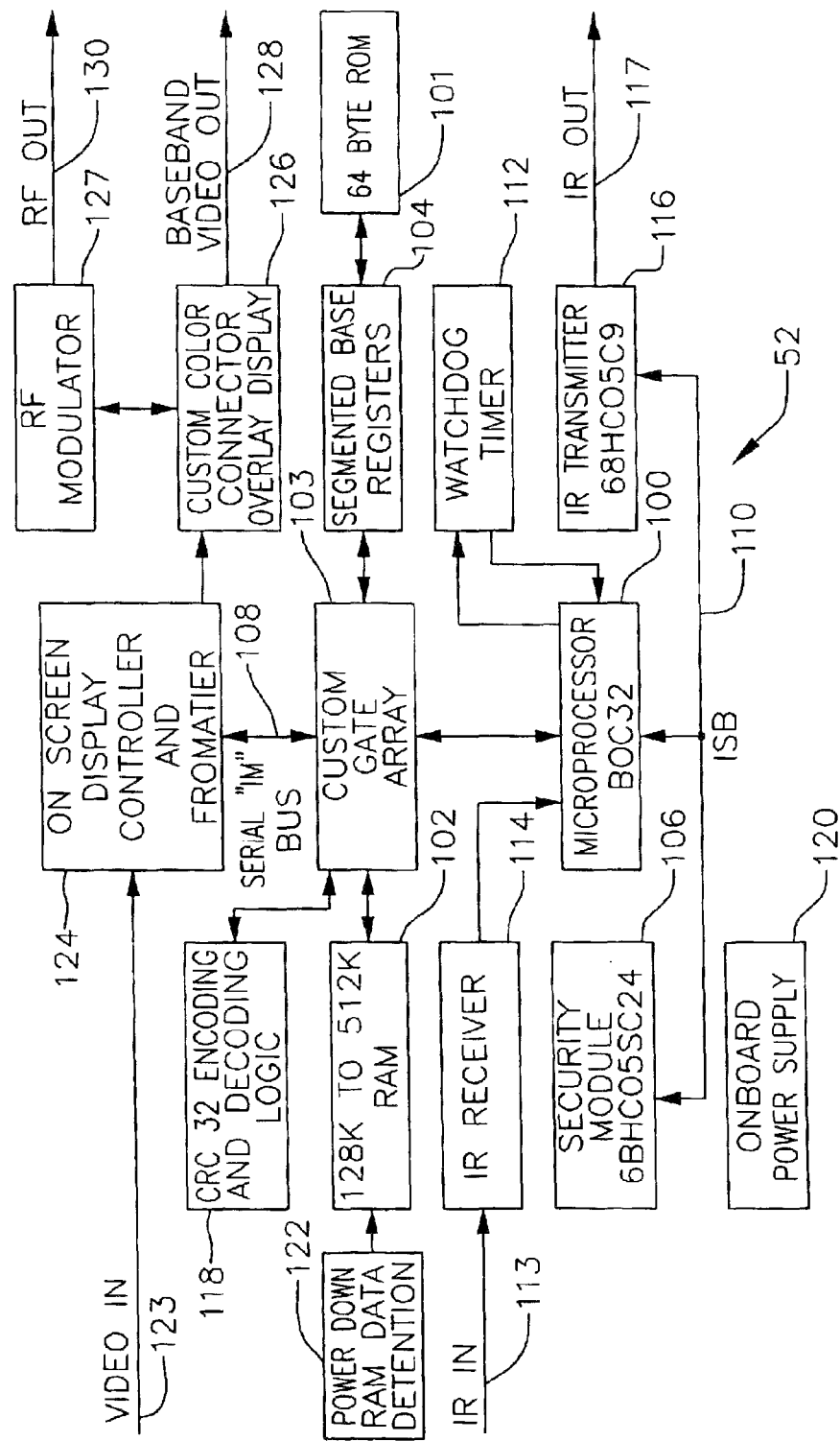
FIG. 3 is a block diagram of an exemplary electronic hardware unit utilized to perform the electronic on-screen schedule display and other functions for the electronic program guide of the present invention.

In a preferred embodiment, a board is included at a viewer's television set and the database is stored locally and commands are transmitted in the VBIs of programming on a designated channel, for example PBS. An example of a board for receiving program guide information, generating program guide database, displaying the program guide, and interactively controlling the program guide is depicted in FIG. 3. The commands are transmitted to the board in the vertical blanking intervals of programming broadcast on a designated channel.

Alternatively, the commands could be transmitted to the local unit over land telephone lines. Additionally, as described below, the database may be built remotely and the guide itself transmitted to the local unit.

Figure 4:
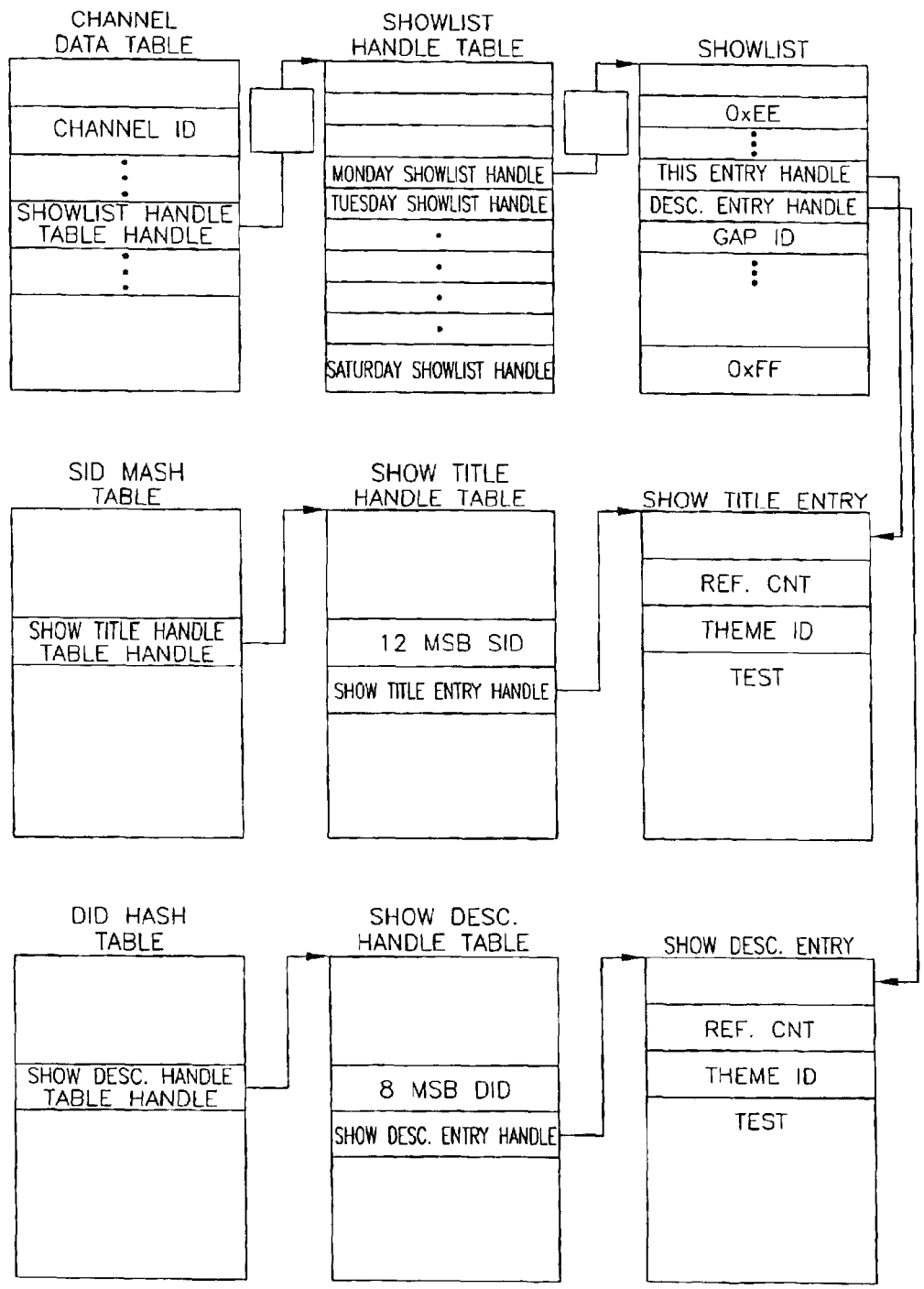
FIG. 4 illustrates a hierarchical structure of a database for the electronic hardware unit of FIG. 3.

The database engine builds a hierarchical database in the RAM. The hierarchical structure of the database is depicted in FIG. 4. The database is structured internally as schedule data structures and theme data structures linked by handles and handle tables. Each handle is an index to a handle table which contains pointers to blocks of memory where items of the database are stored.

In another embodiment, for example a DSS system, program guide data is transmitted as a bit stream that is processed by the database engine.

Additionally, a N.E.W.S. (new, entertainment, weather, and sports) database has been developed. Commands including story text and story IDs are transmitted. Links from the program guide to stories related to a program can be created and the related stories can be accessed from the guide.

An advertisement database is also created from commands including advertising text and logos including IDs for linking the advertisements to shows displayed in the EPG. The user may access the advertising information directly from the guide.

An internet database is also created from commands including URLs to internet sites related to programs displayed on the EPG. If the viewer is viewing the EPG on a platform that is Web enabled, e.g., WebTV, a PC, or PCTV, then a linked site can be accessed directly from the EPG.

Additionally, a graphics program module builds various displays utilizing schedule, show title, and other information from the database. If the OSD controller operates in the character mode the display is a grid of character codes which are transferred to the OSD controller which generates the on-screen display.

An input-response user interface program module responds to user input to generate new displays responsive to the particular input. In one preferred embodiment, the user utilizes an input device, e.g., a remote control, mouse, voice activated interface or keyboard, to place a pointer over a part of the current display and clicks. A suitable input device for use with the present invention is described in U.S. provisional application Ser. Nos. 60/022,826, filed on Jul. 26, 1996, and 60/015,648, filed on Apr. 19, 1996, the complete disclosures of which are incorporated herein by reference. The input-response module responds to the position of the pointer and the particular display currently displayed to generate a responsive display or take a particular action. In another preferred embodiment the user interface responds to function buttons on a remote control. Specific examples will be described below.

2. Detailed Description of the EPG System

FIG. 3 is a block diagram of an embodiment of the electronic hardware unit 52 utilized to perform the electronic on-screen schedule display and other functions. The particular hardware unit 52 depicted is for TVRO (TV Receive Only) customers having home satellite dishes for television viewing. This unit is coupled in series with existing customer TVRO equipment.

In FIG. 3, the unit receives Baseband Video in 123 from the customer TVRO system. The unit optionally outputs Baseband Video out 128 or channel 3/4 RF out 130. The unit includes an 8-bit microprocessor 100, 64 bytes of code ROM 101, 512K of RAM 102 for program data storage, a custom gate array 103, segmented base registers 104 for fast memory data manipulation, security logic 106 for decoding incoming encrypted data, a serial bus 108 for display controller interface, serial bus 110 for inter-processor communication, watchdog timer 112 for error recovery, IR input 113, IR transmitter circuits 116 for TV, VCR control, IR output 117, CRC-32 encoding and decoding logic 118, on-board power supply 120, video input 123, On-Screen Display Controller and Formatter 124, custom color converter 126, RF modulator 127, choice of Baseband Video or RF outputs 128 or 130.

The on-screen display controller and formatter (OSDCF) 124 functions as an I/O controller, an on-screen display controller (OSD), and also as a closed-caption data (CCD) VBI data slicer. The VBI (vertical blanking interval) is a dead space in a TV signal that allows a television signal to reposition the scanning electron beam from the bottom to the top of the screen. Digital data, for example close-captioned data, is modulated onto the carrier signal during the VBI.

The OSDCF 124 includes an analog to digital converter (ADC) which digitizes the incoming baseband video and extracts digital information transmitted in the VBIs. As explained more fully below, messages for transmission to the database are transmitted in the VBIs. These messages are transferred to the processor 100 which executes a data base engine process to build or update the database.

The OSD part of the OSDCF 124 includes cache memory, character memory, timing functions, and an external RAM. The OSD reads high level graphic commands sent from the processor 100 and stores graphic information in the RAM. The OSD outputs red (R), green (G), blue (B), graphic data which is used to generate a local video signal. Depending on the state of the user input interface, described below, the OSD local video output or the incoming live video will be displayed.

Accordingly, screen display graphic data generated by the database engine is transferred to the RAM of the OSD which the generates a local video signal that causes the display screen to be displayed on the television screen.

3. Scheduling Data Structures

The DBE builds a hierarchical database in the RAM. The hierarchical structure of the database is depicted in FIG. 4. The database is structured internally as schedule data structures and theme data structures linked by handles and handle tables. Each handle is an index to a handle table which contains pointers to blocks of memory where structures of the database are stored.

The hierarchy for the schedule data structures, in descending order, is:

Channel Data Table: contains subscriber unit's list of channels;
Show List: contains time slots for each show scheduled to be broadcast for a channel;
Show Title: contains the title text and show title attributes;
Show Description: contains show's ratings, attributes, and description text.

A channel data table, depicted in FIG. 5, is the highest data structure in the hierarchy. This table includes an entry for each channel received by the subscriber unit.

The entries in the channel data table are changed infrequently and are determined by the location of the subscriber unit and type of services received. Each channel data table entry includes information concerning the channel and a handle to a show list handle table for the channel.

The next data structure in the hierarchy is the show list depicted in FIG. 6. The show list includes a start time typically being midnight GMT and 24 hours of scheduling. The channel's schedule is given by an ordered sequence of show slots, with a show slot for each show to be broadcast by a particular channel for a particular day. Each slot includes a duration, show title handle, and show description handle. Finding an entry corresponding to a given start time requires the entries to be scanned, in order, from the beginning of show list and adding duration values.

The database, when fully constructed, holds a weeks worth of show lists for each channel. The days of the week are accessed by incrementing the show list handle by two bytes. The show lists are updated each day at midnight GMT with the show list for the day just completed being deleted and the show list for same day next week being added to the database.

The next data structures in the schedule hierarchy are the show title entries, depicted in FIG. 7A and show description entries, depicted in FIG. 7B. For a given show slot the show title entry and show description entry are accessed utilizing the handles included in the slot. The show title and show description entries are stored in a memory pool divided into blocks. Each show title is identified by a unique 20-bit show identification number (SID) and each show description is identified by a unique 20-bit number assigned at the head end. The show title handles are based on the SID and the show title handles are offsets into a show title handle table. The entry in the show title table accessed by a particular show title handle includes the address of the first block in the memory pool where the show title entry is stored. Similarly, the show description handle table entry accessed by a show, description handle stores the address of the first block in the memory pool where the show description entry is stored.

Each show title entry includes theme index ID and the text of the show title. Typically, a single show title entry will be referenced by many show lists for different channels, days, and times. Thus, by utilizing handles in the show lists all show lists reference a single show title entry in memory so that memory is efficiently used. Many show title entries have a long life because the show titles may be for series that are broadcast over long periods of time and may be referenced by many showlists since many shows are broadcast by multiple channels.

Each show description entry includes a theme index ID, critics rating, MPAA rating for the show, traits mask bits, year produced, and show description text. Show description entries tend to have a shorter life than show title entries because a description is only valid for a particular episode of a series.

4. Schedule Search

To obtain schedule information for a particular time and to display the schedule information in the programming grid requires the following steps. For each channel in the channel list, the show list for the day is accessed and scanned. Horizontal blocks for the channel are sized according to the duration of the show slots including and following the selected time. The show title entry referenced by each show slot is accessed and the show title is displayed in the horizontal block corresponding to the show slot.

5. Favorite Channel Lists

Referring back to FIG. 5, every entry in the channel data table includes a FAVORITE LINK field. This field includes a link to a next favorite channel and is utilized to form an ordered, linked list of channels in an order determined by the user.

The user interface and database engine provide screens to facilitate the ordering and selection of channels to be displayed in the guide. A link to the first channel in an ordered channel list is stored in memory. This link is utilized to access the channel table entry for the most favorite channel. The FAVORITE LINK in that channel is accessed and utilized to access the channel table entry for the next favorite channel and so on until a designated delimiter value, e.g., 0x00, indicates the end of the favorite channel list.

The capability of having more than one favorites list can be supported by having multiple FAVORITE LINK fields stored in each channel table entry.

6. Theme Data Structures

A powerful feature of the database is the ability to group shows by theme. The theme IDs stored in the show title and show description entries are utilized to match particular shows to particular themes. For example, a viewer may want to see a listing of all comedy movies.

Each primary category, movies in the example above, has a theme category entry included in a theme category table, depicted in FIG. 8. A theme category entry includes a theme category ID, a handle for the subcategory handle table, and the theme category name. The theme category ID is used identify theme sub-categories, comedy in the example above, for this primary category.

Figure 10:
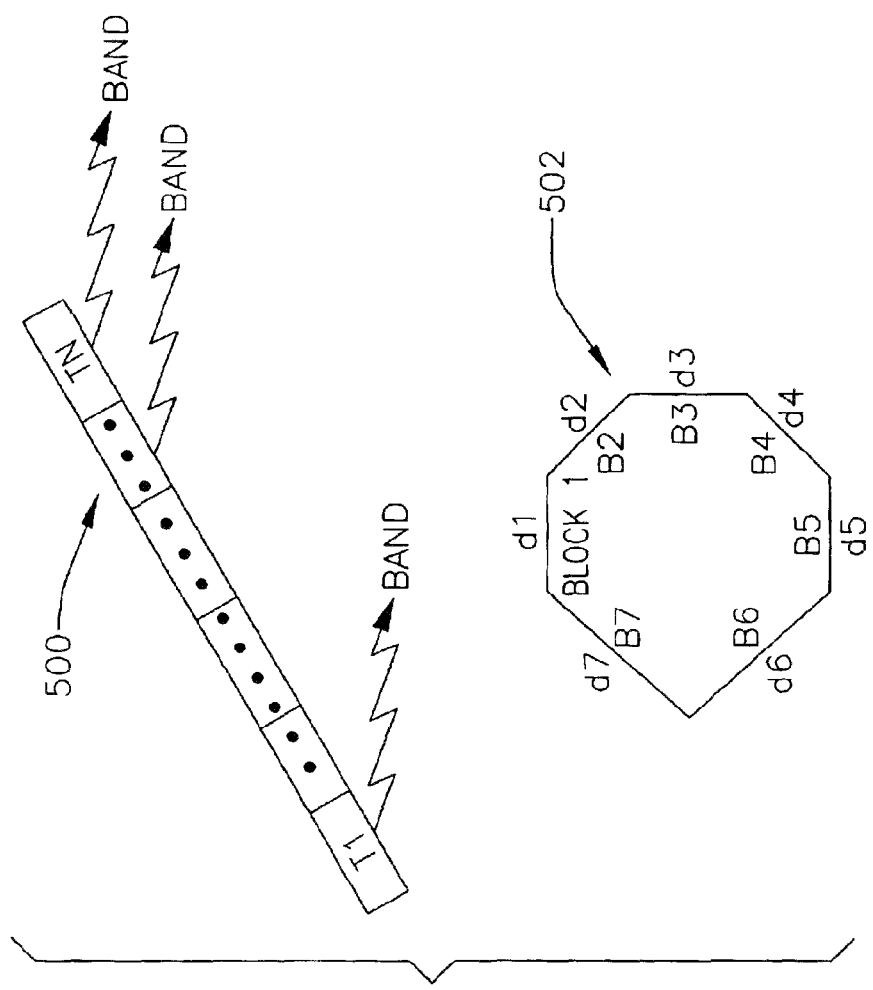
FIG. 10 illustrates an exemplary satellite for transmitting program information to the television system of FIG. 2.

There is a theme sub category table, depicted in FIG. 10, for each primary category. The table contains entries for each theme sub-category contained in a primary theme category. Each table entry includes the theme IDs corresponding to the sub-category entry and the name of the sub-category.

7. Theme Search

When the viewer initiates a search for a particular type of show, for example a comedy movie, each channel is inspected and theme IDs of each show listed are compared to theme IDs stored in the comedy entry of the theme sub-category table corresponding to the movie primary category entry.

Information about shows with matching theme IDs is stored in a theme search data structure in a user interface local buffer.

The theme search function requires two calls to the database. The first of these calls initializes the theme search data structure to the first show that matches the theme category for a specific channel entry, including the shows time offset from the search time. The second call will then find the next matching show after a particular offset time, updating the theme search data structure and returning the offset to the next show.

The basic algorithm for theme user interface access is:
1. for a given starting time, for each channel entry, find the first show that matches the theme criteria on or during this time and create a list. Keep track of the channels that had matches;
2. sort the list of shows in time order;
3. find the channel with the earliest show in the sorted list;
4. place this earliest show into the user interface search list;
5. for the channel with the earliest show, request the next show that matches the theme criteria and updated offset time;
6. repeat steps 2-4 until all shows have been located or other specified limit is reached (i.e. search may be for a limited number of matches).

The shows for the selected category are then displayed in time order.

8. Ad Data Structures

An ad list data structure is similar to the show list. It includes a start time and 24 hours of ad scheduling. The ad list is regionalized and includes an ad slot for each ad to be broadcast for a given day. The ad slot includes a duration and an Ad ID utilized to access an ad entry.

Each add entry includes an ad banner text field, an ad text field, and a pointer to an ad logo, if appropriate. The ad logo includes a graphics file to be displayed with the ad.

9. Building the Database

The data base is built by a data base engine software module operating on the processor. Messages comprising discrete commands are received by the database engine. Examples of commands include a Region Command which specifies channels available for a particular subscriber unit to be included in the Channel Data Table; a Channel Data command including information utilized to form the entries in the Channel Data Table; and Showlist, Show Title, and Show Description commands including SIDs and DIDs referencing areas in memory. The database engine selects only Showlist Commands relevant to channels included in the Channel Table for further processing.

The data base engine creates storage locations in memory for all SIDs and DIDs included in any Showlist. Information included in commands having matching SIDs or Ms is written to the referenced memory area. In practice the SIDs and DIDs are processed by a hashing system for more efficient searching.

The messages may be transmitted to a subscriber unit in various ways. A system for receiving messages in the VBIs of broadcast programming has been described above. In a DBS system the messages may be transmitted in a dedicated bit stream.

In a DBS system video baseband signals are digitized, compressed, and modulated onto an analog carrier signals. Because of advances in the art of compression, a carrier once used to transmit a single program can now transmit four programs. Typically, in addition to video signals other bitstreams encoding information such as audio, VBI (vertical blanking information data such as closed caption and teletext), program guide information, and conditional access information are provided as separate bitstreams, multiplexed into a composite bit stream, and modulated onto a carrier signal.

Alternatively, the database itself may be transmitted in a digital data stream. For example, in DSS the program guide information is transmitted in block of 3 hours of programming for 36 channels. Programming is digitally modulated onto different bands. As depicted in FIG. 10, a satellite has several transponders 500 simultaneously transmitting on different bands. Several channels can be modulated onto a single band utilizing digital compression techniques. A bit stream including the current programming is carried by all bands. However, future programming for different blocks of channels is transmitted on different bands. The blocks are transmitted in as a carousel or endless loop so that there may be a delay before a particular time band is received.

A decoder at the viewers location receives 16 carriers and controls a tuner/demodulator to select one carrier. The carrier is sampled, decoded, error-corrected, and demultiplexed to separate the various bit streams. The decoder includes video decoder chips decompress compressed video to reconstruct pictures of virtually any size.

When the viewer accesses the guide the block for that time period is loaded into memory so that the user can interact with the guide. For a future time and different channel there may be a time delay. For example, if the current programming block were B1 and the block currently received is B4 the user must wait for blocks B5, B6, and B7, to be transmitted before the current programming can be received and displayed. The viewer would wait for a time delay equal to the sum of time durations for transmitting each block, i.e., d5+d6+d7. If the program guide block is modulated onto a different band the cable box must tune to the band and wait until the desired block is transmitted on the carousel. So if the guide is accessed for future programming there could be a delay.

For cable the database is built at the SST head end and sent over land-lines to the cable head end. Cable company sends data anyway it wants, VBIs, satellite, digital, etc.

10. User Interface

The user interface takes remote control commands as its primary input. In one embodiment a user requests various functions by pressing function buttons on a remote control. In another embodiment, the GUI is utilized with different interactive regions on a displayed screen corresponding to different functions. The user moves the cursor over the interactive region corresponding to a desired function and selects the function to generate command. The particular form of entering a command is not critical and technology for utilizing voice commands may soon be available.

The user interface receives commands and responds with a requested display screen and by performing the function requested by the command. The function performed may be to perform an action such as recording a program, tuning to a channel, accessing a related internet site, purchasing a pay-per-view program, or purchasing merchandise. The data and format of each screen is dependent on the previous screen, time of day, the contents of the data base, the command received, and other parameters. A state table is used to define the screen flow.

For every defined screen, there is an entrance function, an exit function, an update function, and an array of request-handling functions. The entrance function is called when a state is first entered to collect all necessary data and format the screen. The exit function is called to release memory and data for the screen. The update function is called once per minute to update the screen time and to redraw the screen if any information displayed on the screen needs to be updated.

Once in a particular state, the table contains a reference to another software function corresponding to each key on the remote control or to each interactive region on the screen. These referenced functions will be executed whenever an associated remote control button is pressed or interactive region is selected.

For example, if the user wishes to record a program, in the GUI embodiment, the viewer moves the cursor over the record interactive region which is then selected to request that the recording function be performed. A confirmation screen will then be generated. Once the user confirms the recording request, an entry is made in a recording queue. A record daemon is then called from the real-time executive to examine the queue and manage recording functions.

The screens are displayed by the on-screen display (OSD) controller based on graphic display commands issued by the database engine. Among the primitive commands need to draw system display screens are the Erase Screen Command; Draw Rectangle Command; Save Rectangle Command; Restore Rectangle Command; Move Rectangle Commands; Write ASCII String Command; and Draw Channel Icon Command.

Each screen includes areas that are constant and based on code and data stored in non-volatile memory and variable areas such as show titles and descriptions which utilize data stored in the database. As described above in the description of the database engine, the database is structured to facilitate efficient searching for information, generally in the form of ASCII text strings, stored in the database. Additionally, graphics files are also being stored in the database to be displayed in windows of the display screen.

Figure 11:
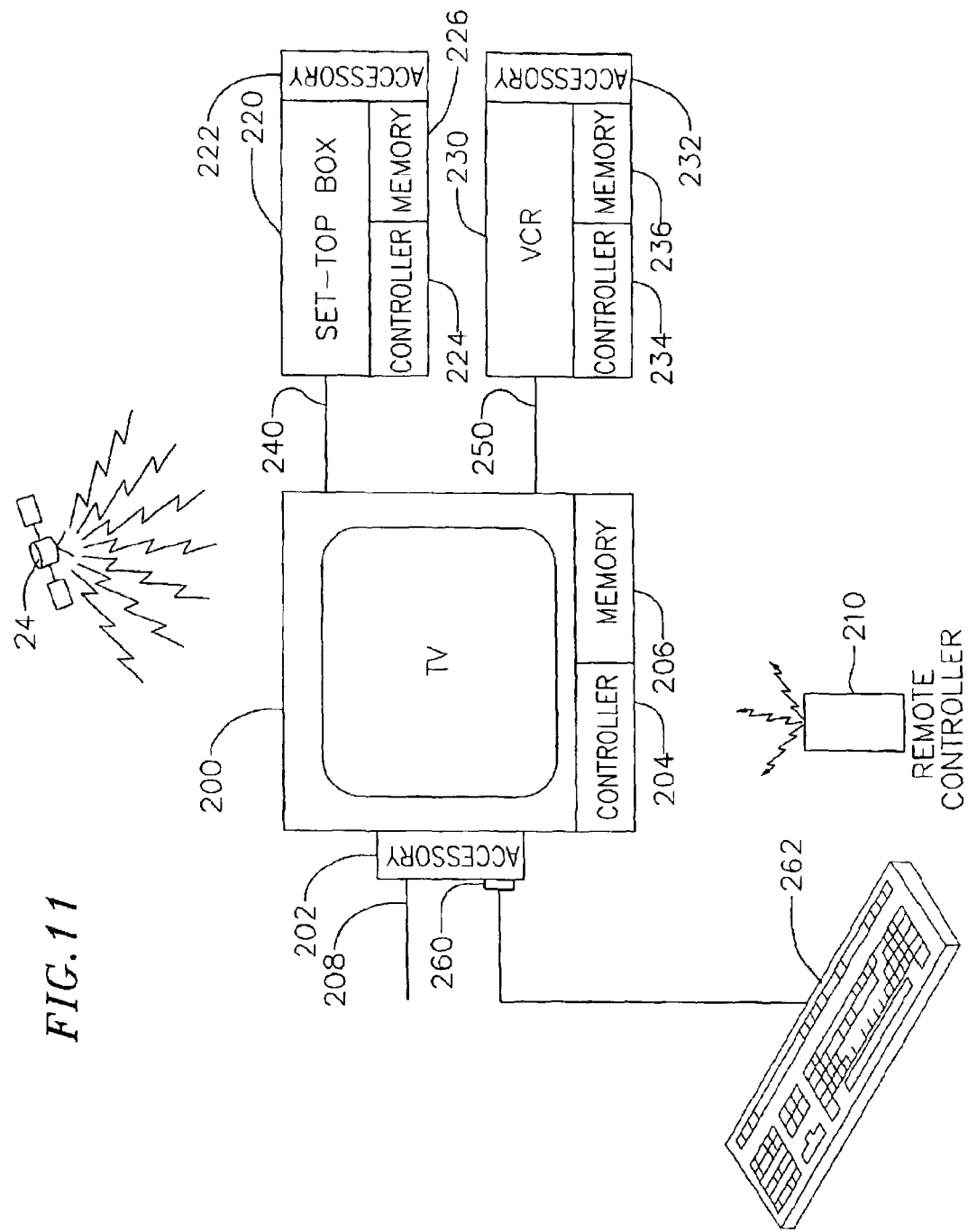
FIG. 11 illustrates several arrangements for providing television schedule information from a database to a television for display.

FIG. 11 illustrates several arrangements according to the present invention for providing television schedule information from an external database to a television for display. In one embodiment, on-line information providers (Prodigy, America On Line, Compuserve, MSN, AT&T, etc.) provide access to a database which contains the television schedule information. These on-line information providers' can transmit data to television 200. In this embodiment, a modem within accessory 202 is utilized to provide the data. Accessory 202 is attached to television 200 and directly connected to telephone line 208 via the modem. The modem for access to the on-line service can also be located within television 200. Software, located either within accessory 202 or television 200, is used to search for and provide the data, along with providing several other features described below.

The available data, displayed on television 200, can emulate what a computer on-line user normally sees when accessing the internet through a personal computer. This television schedule data can also be further enhanced to "tie into" the televisions show that the user is viewing. Alternatively, accessory 202 may be replaced by accessory 222 which is attached to set-top box 220 (e.g., a cable box). The data provided via the on-line information provider is then transmitted to television 200 over line 240. Similarly, accessory 232, attached to VCR 230, can be used to obtain the television schedule data. The data would then be transmitted from VCR 230 to television 200 over line 250.

In another embodiment, the database with the television schedule information is located in memory 206 within television 200. Controller 204 is used to obtain the data from memory 206 so that it can be displayed on television 200. Alternatively, the database with the television schedule information could be located in memory 226 (within set-top box 220) or in memory 236 (within VCR 230). Controller 224 or controller 231 would be used to obtain the data which would then be sent to television 200 for display via line 210 or line 250. Therefore, the technology that enables the television schedule information to be provided from a database to a television for display is not specific to any given data system. In summary, this technology can be resident in the user's set-top box 220, television 200, VCR 230, personal computer or the like.

The television schedule information provided from a database can be used to provide information which is independent of the viewer's program choice. For example, from a television schedule guide, the user can utilize remote control 210 to press a Services button. This Services button can be located on remote control 210 or within the television schedule guide display. When the Services button is pressed, the user is given choices such as News, Weather, Sports, Scores, Financial Data, Local Traffic, etc. Using remote control 210, the user can then select the area or title of interest, and the associated information from the database is provided. If accessory 202 is used, a modem accesses the online service which provides the information from the database. Once this connection is made, the user has two-way communication with the on-line service provider. The user can then go deeper into the given selections or, if requested and keyboard 262 is available, can access the Internet and enter-chat rooms or other interactive services. In the preferred embodiment, keyboard 262 is either an IR keyboard or connected to port 260 on accessory 202.

In yet another embodiment, a television program title and/or a program's content is contextually linked to an on-line service or to an available database. In this arrangement, a user, in conjunction with the data made available through an electronic program guide (or navigational system), can link, search, select, and/or initiate a subscription to more information relating to specific areas of interest or concerns associated with a program or a program's title. In the preferred embodiment, a user of an electronic program guide (e.g., as described above) can conduct a search for information about a particular program/television show or for information relating to the show, the actors, the actresses, the show's theme, other broadcast times or sources, and other related information through selection via a user interface. This linking of program title and/or program content to additional related information could be operable whenever a program title is accessible in a electronic program guide. Additionally, this linking could be available whenever a user requests it via the currently tuned program.

For example, a user previewing the program such as a movie (e.g., "Casablanca") can receive information regarding (1) the actors and actresses in that movie, (2) other movies released during the same time period, (3) associated available products, (4) related travel packages, and (5) advertisements and promotions available through primary, secondary or third party vendors, other broadcast times or sources. Utilizing a user interface such as remote control 210 or keyboard 262, the user can indicate to the electronic program guide what information they would like to view on television 200. The electronic program guide then lists a selection of choices for the user. In the preferred embodiment, the choices are associated with the context of the selected program and can be changed via the electronic program guide supplier. In the "Casablanca" example, the choices might be (1) Other Humphrey Bogart Movies, (2) Other Lauren Bacall Movies, (3) Other Movies Released in the Same Era, or (4) Associated Products, other broadcast times or sources. The user selects from the presented choices, and the electronic program guide contacts and communicates with the database of available information for more detailed information relating to the user's choice. Once contact and communication is established between the user and the database of available television information, the electronic program guide acts as an agent to assure that the information flow and appropriate data is exchanged. At this point, the user can delve deeper into the available information by selecting from a series of further choices or related topics. For example, if the user chooses (1) Other Humphrey Bogart Movies option, the electronic program guide contacts and communicates with the selected database of available information. The database of available information is then used to collect the requested data of other Humphrey Bogart movies. The selected choice is transmitted and used by the electronic program guide as its contextual reference for the search. A list with the search results is then displayed on television 200.

Once the user sees the list of broadcast times or sources for "Casablanca," or other is Humphrey Bogart movies, the user can select any of the available titles for recording or watching, or digital storage when digital program directories, libraries, or archival sources are available. In the preferred embodiment, each time the available database is contacted and searched, previously selected movies can be identified. In addition, a user can select certain types of programs to be recorded, watched, or retrieved for digital storage before any particular program is available to the electronic program guide. Moreover, each time a connection is made to an on-line service, the software can search the database and set the selected types of programs to be recorded and/or retrieved for digital storage. These features enable a consumer to never miss a favorite program.

The system and method of the present invention may be configured to automatically or manually customize the television schedule guide to an individual viewer or a group of viewers, e.g., a family. In this embodiment, the remote control device may be used to select certain programs, and a memory stores the television programs that have been selected by the viewer. The programs can be selected for a variety of reasons, such as a designation of the program as a favorite, placing a reminder to watch the program or, when the television schedule system includes a recording device, placing an automatic reminder to the program guide to record the program or, when the television schedule system includes a means of digital storage, automatically downloading or providing an easy confirmation process for downloading the program. The user may also customize specific preferences based on a program title. Through a series of repetitive operations, the electronic program guide can select programs, titles or services that the user would likely be interested in. This can be accomplished through a user interface wherein the user answers preference or choice questions, or through heuristic learning accomplished through the electronic program guide. The electronic program guide would include software for performing this customization.

In an exemplary embodiment, the system includes a database containing each program within the television schedule and/or listing information. The database may be included within a computer integrally combined with the television (e.g., PCTV), a computer that is coupled to the television through suitable lines, or the database may be accessed from a remote computer, e.g., via the Internet or other communication medium. Within the database, each program is associated with a variety of criteria or features, such as particular actors, actresses, directors, the type of movie (e.g., action, comedy) and the like. When the viewer selects a program as a favorite, for example, he or she will have the option of designating the criteria or reason(s) that the program is a favorite (i.e., actor, director, etc.). The computer will include a processor and suitable software for automatically searching the database for other programs having the same criteria. The processor will automatically place the programs that include the designated criteria into the selection window and provide visual indication of each program in the matrix of cells in the program guide. In this way, the program guide will automatically customize itself to the individual viewer to facilitate use of the television schedule. A more detailed description of this method can be found in commonly assigned co-pending U.S. Provisional Application Ser. No. 60/015,648, filed on Apr. 19, 1996, the complete disclosure of which has previously been incorporated by reference.

In another embodiment of the invention, the system will automatically record television programs that are listed as a user's "favorite" or in some other category (i.e., contextual recording). In this embodiment, a user identifies to the system (or the system automatically identifies) favorite subject matters, actors, actresses, etc, as described in detail above. For example, the user may input into the system that he/she would like to add Jerry Seinfeld to the "favorites" list. Thereafter, the system tags any program it finds where Jerry Seinfeld is involved (i.e., he is a guest on the Tonight Show). In addition to tagging the show according to this embodiment of the invention, the system will automatically program the VCR or similar recording device to record any or all of the shows with that tag. The user may then view the contextually recorded programs at any time he or she desires. Thus, the system will constantly search for any show that includes Jerry Seinfeld and record that show, episode, or only the portion of the show that involves Jerry Seinfeld. The user will then have a list of all the shows or some of the shows that feature Jerry Seinfeld, and can view these shows at his or her leisure.

Figure 12:
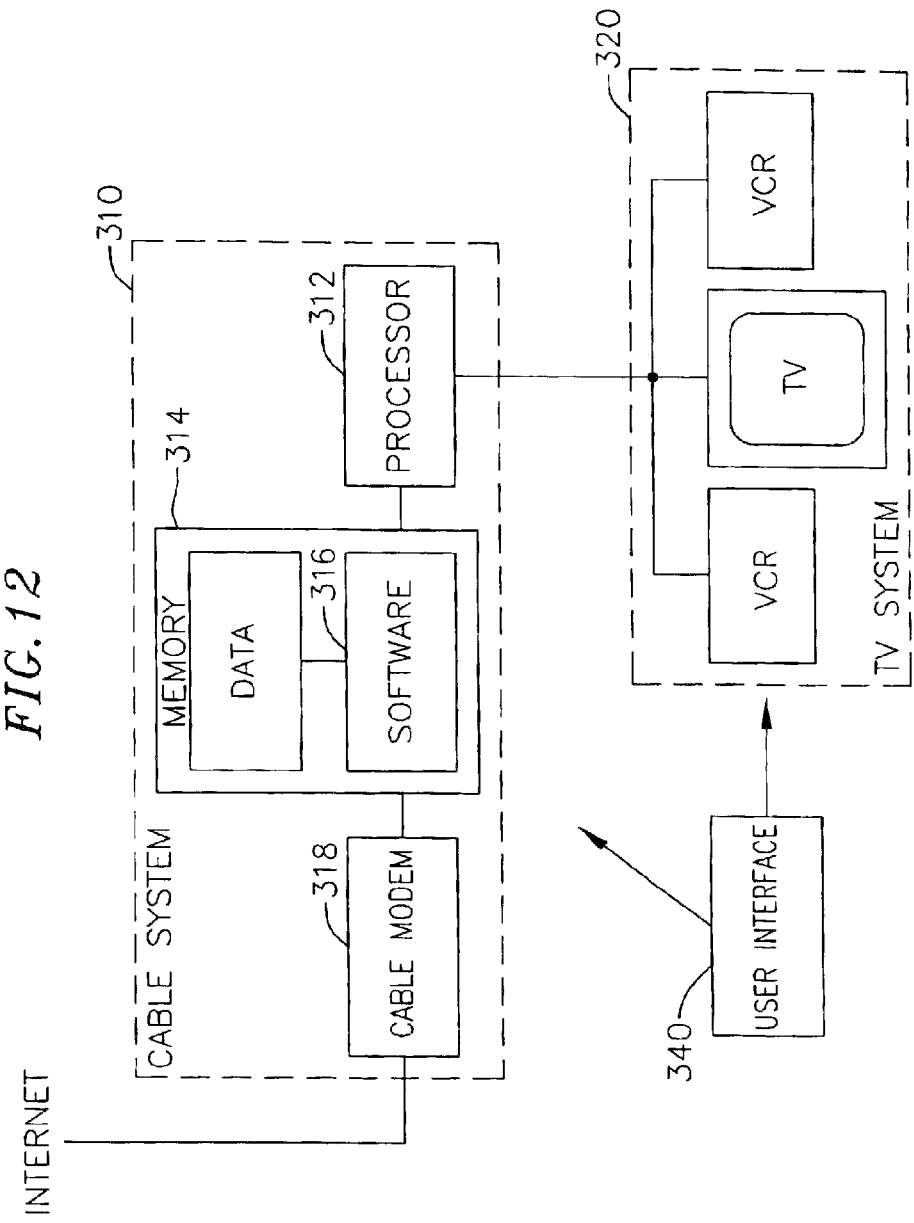
FIG. 12 illustrates an interactive television schedule system according to the invention incorporating a cable system coupled to a television system.
Figure 13:
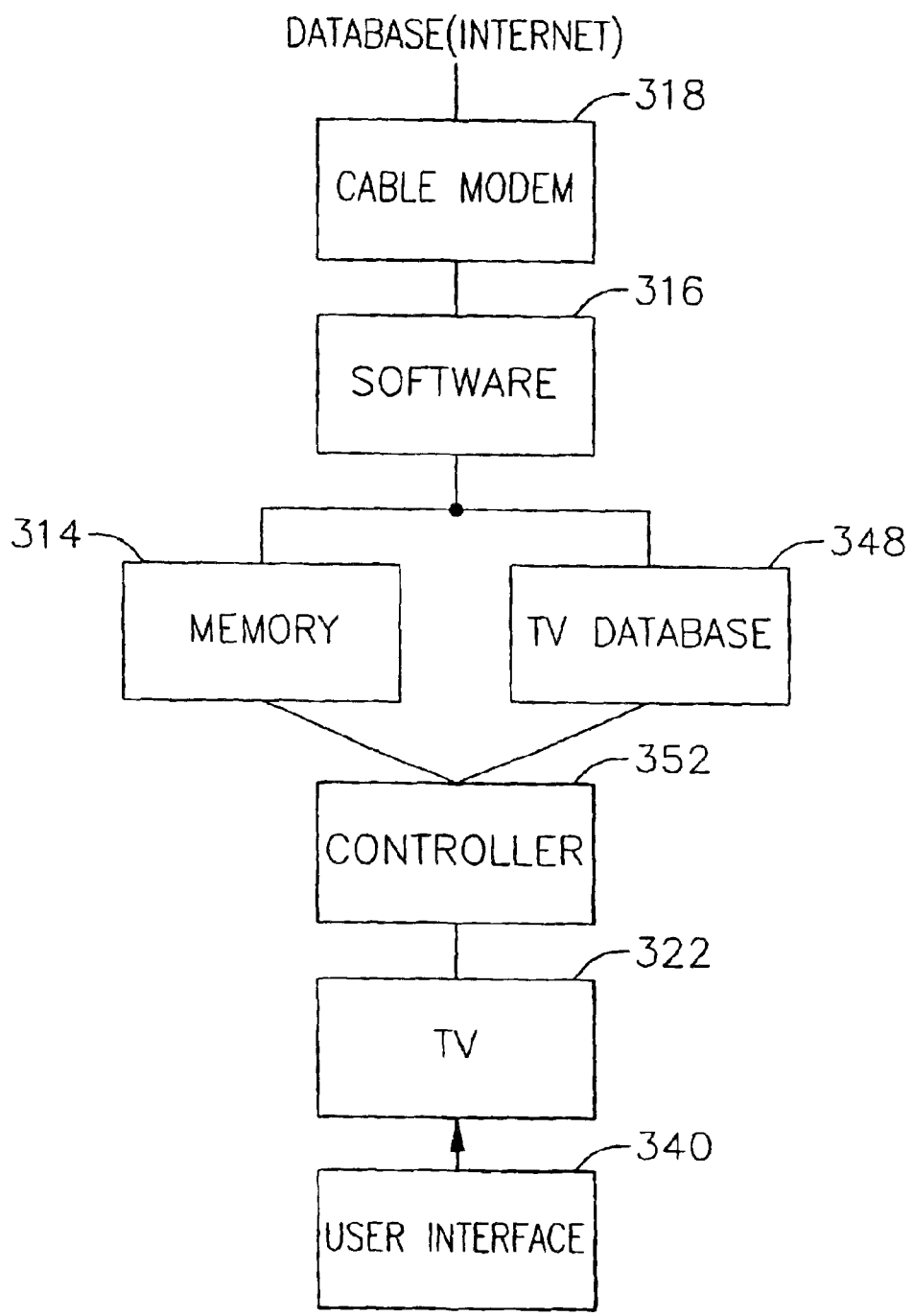
FIG. 13 illustrates a preferred arrangement for providing television schedule information from the cable system of FIG. 12 to a television for display to the viewer.

FIGS. 12 and 13 illustrate an interactive television schedule system 300 according to the present invention which can access television schedule information from the internet, and provide user access to the internet. Access to the internet may be provided in this embodiment to without tying up any phone lines, and without the need for a personal computer (e.g., an "NC" or Network Computer). As shown in FIG. 12, interactive television schedule system 200 includes a cable system 310 coupled to a television system 320. Cable system 310 generally includes a processor 312, and a memory 314. Television system 320 includes a television 322 and a user interface device 340. Similar to the above embodiment, television system 320 may include VCRs 324 and 326 coupled to television 322. In a specific embodiment, memory 314 of cable system 310 stores software 316 for receiving, organizing, and displaying any received data into a television schedule guide. In addition to software 316, data for the basic schedule information and other related data (e.g., data relating to a particular show) are also stored in memory 314 as they are needed for the generation and maintenance of the television schedule guide. This data is received, in the preferred embodiment, via a cable modem 318, which may access the data from the internet. The software 316 then utilizes the data received from cable modem 318 to generate a television schedule guide. The user can access this generated television schedule guide when desired.

In the embodiment of the present invention shown in FIG. 12, two programs provided at the same time can be automatically recorded because two VCRs 324 and 326 are present. The user need only select two programs for recording and the present invention will automatically cause the programs to be recorded when they are aired in an unattended fashion. The user can also directly select which device or devices will be recording or tuning for each selected program. For additional information, see commonly assigned U.S. Pat. No. 5,151,789 to Young, the complete disclosure of which has previously been incorporated by reference.

FIG. 13 illustrates an arrangement for providing television schedule information from cable system 310 to a television for display. In one embodiment, cable modem 318 provides access to a database, which may be on-line; the database contains the television schedule information, and the information is transmitted to the television. Software 316 stored in memory 314 is used to search for and provide the information, along with providing several other features described below. The available data, displayed on the television, may be stored in memory 314 within cable system 310, or within a database 348 within television 322. A controller 352 is used to obtain the data from memory 314 or from database 348 to display it on television 322. From the television schedule guide, the user can further utilize user interface 340 to press a "Services" to button. This Services button can be located on the user interface or within the television schedule guide display. When the Services button is pressed, the user is given choices such as News, Weather, Sports, Scores, Financial Data, Local Traffic, Network, etc. Using the user interface, the user can then select the area or title of interest, and the associated information from the database is provided.

The user can further access the internet by choosing Network from the guide using the user interface. Cable modern 318 accesses the internet, and once connection is made, the user has two-way communication with on-line service providers. The user can then access the different on-line services. For example, a user viewing a sporting event may press the Services button, and a different menu will appear with the following choices: (1) Sports Scores, (2) Current Game Statistics, (3) Current Player Statistics, and (4) Associated Products. If the user selects (4) Associated Products, the software, will notify the cable modem and instruct the cable modem to establish connection with an on-line service provider. The on-line service provider then lists a series of selections associated with the game (e.g., 49er's hats, Giant's Baseball Bats from Louisville Slugger, Nike Spiked Football shoes for Pop Warner, etc.), and the user can interact with the service provider accordingly.

Figure 14:
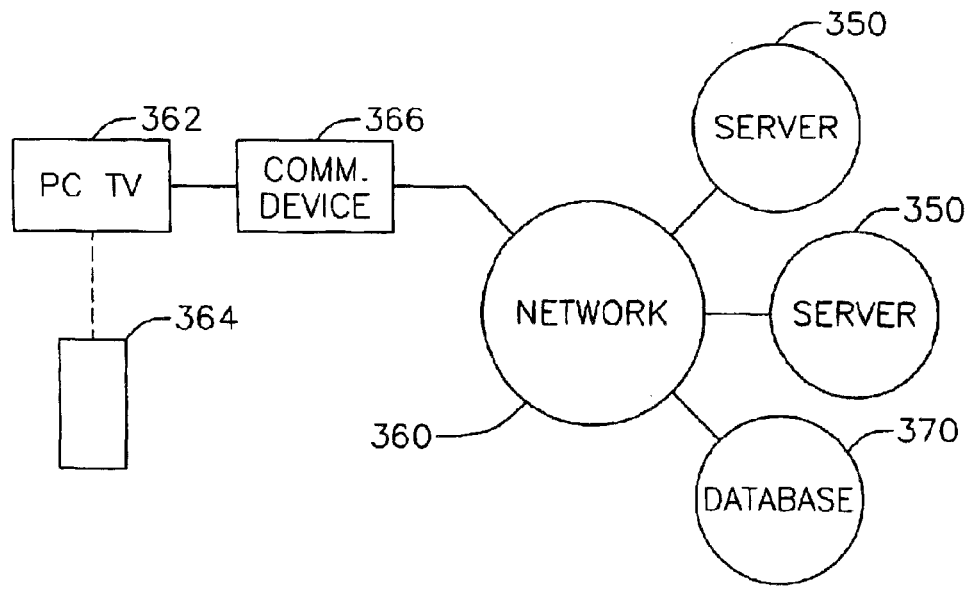
FIG. 14 illustrates a system and method for accessing television schedule information at a network file server on the internet.

FIG. 14 illustrates a system and method for accessing television schedule information from one or more servers 350 on a computer network 360, such as the Internet or the World Wide Web. The television information guide may be accessed and viewed through a computer system, a television system, a PCTV, or a simple display coupled to a communication link, such as a telephone line or the like. In the representative embodiment, a PCTV 362 is illustrated with a user input device 364, such as a remote control, keyboard, mouse or the like, and a communication device 366 for accessing computer network 360. As discussed above, communication device 366 may include a wide variety of data lines, such as telephone lines, cable modems, etc.

In one embodiment, the computer network 360 includes a plurality of servers 350 and a database 370. The database 370 includes television schedule information, which may be retrieved and viewed on PCTV 362. Servers 350 represent file servers having files, databases or the like. In a representative embodiment, the computer network is the World Wide Web and each server 350 is set up as a network file server addressable by a unique address. For example, the servers 350 may be configured to follow a common network protocol such as the Transmission Control Protocol (TCP), and the Internet Protocol (IP) (commonly referred to collectively as TCP/IP), and may be assigned a unique IP address or internet domain name. For example, the servers may be assigned the domain name "invoice.com". The servers 350 may also have some form of server software installed to permit the system to function as an internet graphics server. For example, the servers 350 may be configured with HyperText Transport Protocol (HTTP) is server software to permit the system to function as an internet "world wide web" (WWW) server. In this embodiment, PCTV 362 may access servers 350 via the WWW using WWW compatible software by indicating the system's uniform resource locator address: "HTTP://www.invoice.com".

In another embodiment, the television schedule guide (not shown) is stored as one or more files (e.g., a websites or internet broadcast transmitters) on one of the servers 350, which can be accessed by any viewer having access to the World Wide Web. The television schedule guide or website may be configured for viewing and interacting with television information directly on-line, or it may be configured for downloading the information into a computer hard drive or other suitable processor. The guide will provide listings information for all channels in the viewer's local cable lineup. Preferably, the guide will be capable of creating personalized TV listings with search and sort features (discussed below) that allow the viewer to call up favorite programming choices based on categories, such as channel, day, actor, movie genre or other desired categories. The guide may also include other information about programs, such as ratings, stars, type of movie (e.g., suspense, comedy, drama, western, musical, children, biography, horror, etc.). This information may be provided on the actual website and/or internet broadcast transmitter, or the website and/or internet broadcast transmitter may provide means for linking the viewer with other websites and/or internet broadcast transmitter to provide more information on certain topics and categories.

Since the television guide website and/or Internet broadcast transmitter may be accessed from virtually any location in the world, it will preferably include a mechanism for selecting a region from which the television guide is applicable. For example, the television guide may include television schedule and/or listing information from a variety of countries throughout the world, or the information guide may be limited to the United States. To obtain television schedule information for a particular region, the user can select an appropriate state, city, or other region, such as a region covered by a particular cable company. Alternatively, the television to schedule guide may provide information for certain networks and stations (instead of particular channels or stations), such as CBS, FOX, HBO and the like, that are global to all regions of the country. With this configuration, the television guide may include a time zone selection so that the guide can automatically be configured for the particular time zone in which the user will watch television.

In one embodiment of the present invention, the system will include a search engine that allows the viewer to search for particular types of programs that will be broadcast within a certain period of time. The search engine may include categories such as title, description, category, dates, day parts, channels, actor/actresses, directors, etc. In addition, the viewer may obtain more information on the programs within each category. For example, the guide could provide information on movies in many categories, including theatrical, made-for-TV movies, Spanish, French, etc. The guide can tell you what Clint Eastwood movies are on this week, how many Star Trek episodes this weekend, or whether your favorite basketball team is on TV this Saturday. The on-line viewer may customize their own listings by title, year, actors, director, run themes, critical star rating, MPAA, warning lines, video laser disc, full descriptions, genre, and holidays with themes. In another example, the guide could provide information on shows and series, including network shows, first run, British, PBS, cult favorites, syndicated shows, talk shows, local productions and obscure programs. The user may sort by, for example, title, episode run times, genre, original air date, etc.

In another aspect of the invention, the web site television guide will include a highlight section that highlights particular programs that will be broadcast during the day, week or month. For example, the guide may have a web page that picks a "hot pick" for each day of the week, and provides a picture or video together with descriptive information, such as an editorial comment, on the video hot pick. In addition, the user may be able to move to other areas where more information can be provided on particular movies such as articles, interviews with actors/actresses, editor's choice reviews, commentaries, etc.

In another aspect of the invention, the system will include a variety of files on the same or different network servers that allow the user to interact with other users, program sponsors, advertisers, etc. For example, the system may have a web site that allows viewers to chat about certain programs (each program itself may have its own web site). In addition, the system may include a "virtual agent" that searches existing websites and/or internet broadcast transmitter on to the internet and points to websites and/or internet broadcast transmitters that may interest the viewer. The virtual agent will learn from previous user choices to customize the television guide for each particular viewer.

Figure 15:
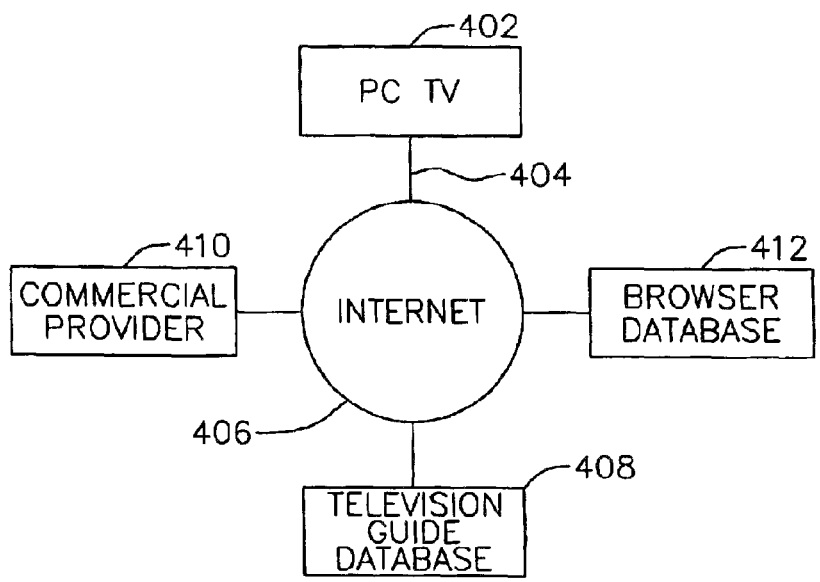
FIG. 15 schematically illustrates a system and method for viewer interaction with commercial advertisers and program sponsors within the television schedule information system of the present invention.

FIG. 15 schematically illustrates a system and method according to the present invention for linking television viewers with broadcasters and advertisers during the broadcast of a commercial or program. As shown, system 400 includes a viewer interface 402, such as a television, computer, PCTV or a television coupled to a computer system. For convenience, the system will be described as utilizing a PCTV 402. A data line 404, such as a cable modem, telephone line or other communication link, couples the PCTV 402 with a remote database, network server or on-line-service, such as the Internet 406. A television guide database 408 is also coupled to the Internet 406 for providing the television schedule information to PCTV 402. This information may be downloaded to PCTV 402, or it may be configured for viewing only while the viewer is actually connected to database 408. Alternatively, the television guide may be drawn locally from a processor within PCTV. As shown, a commercial provider 410 (e.g., Budweiser) and/or a television station broadcaster 412 (e.g., ABC) also have databases directly coupled to PCTV 402 or through Internet 406.

PCTV 402 may include a memory and a processor with appropriate software (not shown) for searching and retrieving information from databases on the Internet 406 based on user selections. Alternatively, this function may be provided through Internet 406, television guide database 408 or through the commercial provider 410 or broadcaster 412. In this embodiment, PCTV may access, download, and/or automatically upgrade an application or applet (e.g., a Java™ applet) having the appropriate software to run the television schedule guide on a display, e.g., a computer monitor, television display or other user interface.

In one example, the viewer is watching a sports event, such as a football game. One or more icons or other visual indicators are located on the television screen in a convenient location, such as the top, right corner. One of these icons may be an icon that represents the television schedule guide. The viewer can move a cursor or other visual indicator to the television guide icon and click thereon to open up the television guide as discussed in detail below. Another icon may be provided, for example, by a commercial sponsor. Moving into and activating this icon allows the viewer to link with a database provided by the commercial sponsor, or to a portion of the television schedule guide database that allows the viewer to purchase an advertised product, make a monetary contribution, respond to a survey, answer a question, or participating in contests with other viewers, for example.

By way of example, Budweiser may provide a database 410 that allows the viewer to purchase a coupon for a free six-pack or other items, such as Budweiser T-shirts, hats, etc. The viewer may purchase the coupon, hats, or T-shirts directly through the commercial sponsor, or through a delivery system provided by the television schedule guide (discussed in detail below). This type of advertising allows the advertiser to directly target a particular program, and it allows the viewer to directly purchase the products during the advertisement. In addition, viewers will not forget the advertisement or simply lose motivation to spend money or request information after the commercial or program is over.

In another example, the television network that is broadcasting the program may provide an icon that allows the viewer to access a database 412 providing more information about the football game, previews of upcoming programs related to the program, such as another football game later on in the week, or other products and services related to the football game.

FIGS. 16-21 illustrate a sample television schedule system 500 with a grid guide, and methods for utilizing the television schedule system with the contextual linking system and method of the present invention. Of course, it should be recognized that the invention is not limited to the specific television schedule system shown in FIGS. 16-21. For example, other, suitable television schedule systems are described in the user manuals "Using Starsight 2", "Starsight Interactive Television Program Guide, Phase III", and "Starsight Interactive Television Program Guide, Phase IV", which are attached to U.S. patent application Ser. No. unassigned, filed Apr. 11, 1997, as Appendices A, B, and C, and of which are incorporated herein by reference, or commonly assigned U.S. Pat. Nos. 5,353,121, 5,479,266, the complete disclosures of which are also incorporated herein by reference. The television schedule system 500 shown in FIGS. 16-21, however, is particularly advantageous with the contextual linking system of the present invention as it enables the viewer to quickly and efficiently browse through the television schedule, and to interact with a wide range of services that are related to the programs in the television schedule.

Figure 16A:
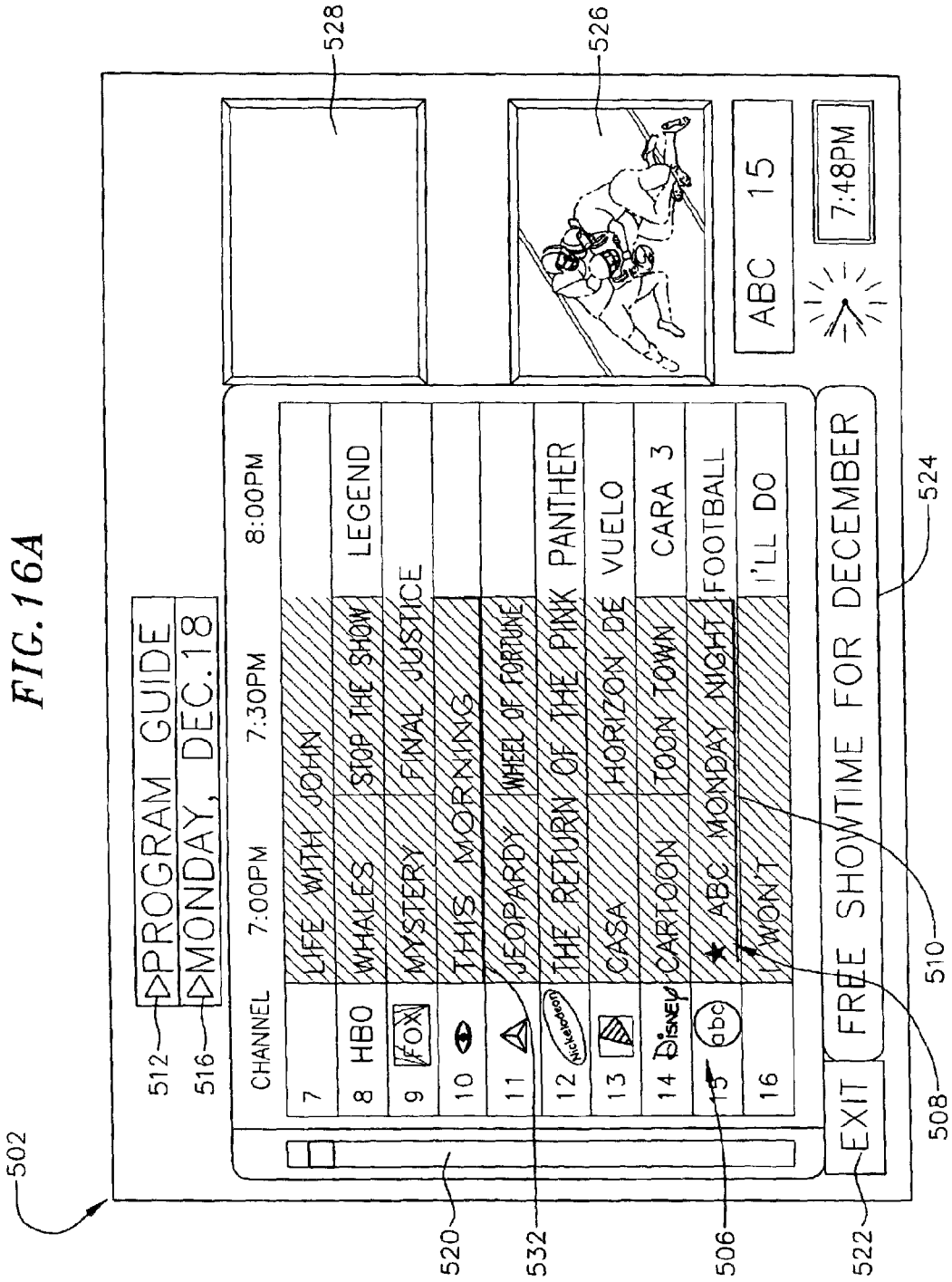
FIGS. 16A and 16B are schematic views of a representative program guide and a channel guide, respectively, for use with the television system of FIG. 1.
Figure 16B:
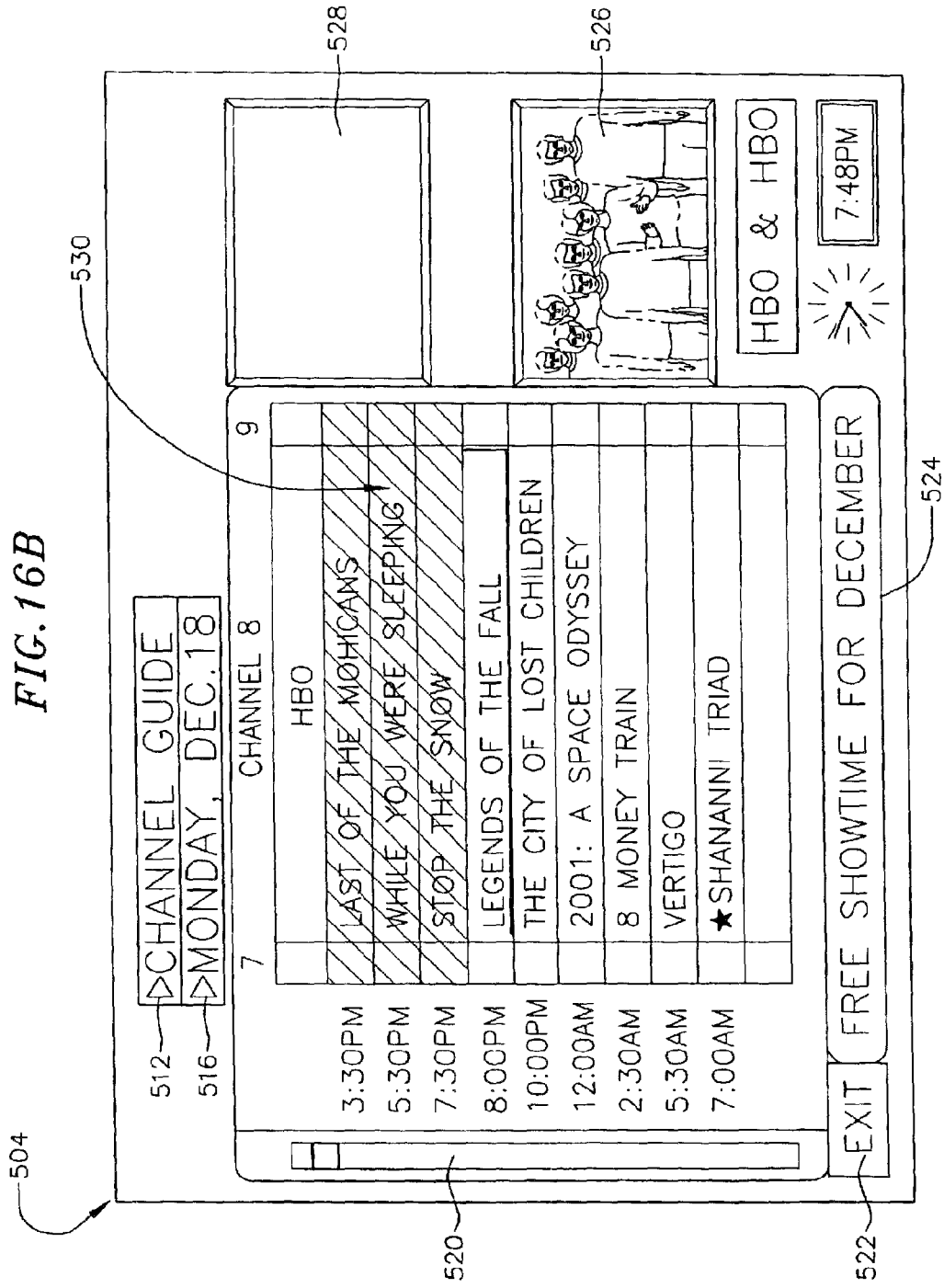

FIGS. 16A and 16B illustrate a program guide 502 and a channel guide 504, respectively, for the television schedule system of the present invention. The program guide 502, to which is the primary mode in the television schedule system, includes a number of screen information areas or windows in a particular screen where the viewer operates a input device, such as a remote control, to move around vertically and horizontally and to interact with that screen area's function. Within each screen area are one or more items, typically arranged in a matrix or grid so that the viewer can scroll through the grid to select or activate items within the grid. Activation of an item will invoke a Submenu, a Dialog, a Panel, invoke an action or the like.

As shown in FIG. 16A, program guide 502 preferably includes a schedule information area 506 having a program matrix 508 of cells or items that depict the shows that are being presented on each channel at each time during the day. Program guide 502 conveniently lists the channels in a vertical column to the left of the program matrix 508 and the times in a horizontal row above matrix 508. As shown, the viewer may vertically scroll through a particular time or horizontally scroll through a channel with the remote control device. As the viewer scrolls through matrix 508, a cursor 510 will indicate the user's location within the matrix 508. Alternatively, the item may be automatically highlighted with a brighter color to indicate the viewer's location.

Preferably, program matrix 508 will also be shaded to indicate the portion of each show that has already been presented. For example, as shown in FIG. 16A, the shading extends to 7:48 (the current time as indicated at the bottom right of program guide 502) to indicate which portion of the show the viewer has already missed.

As shown in FIG. 16A, program guide 502 includes a number of other information areas. For example, program guide 502 includes a mode menu area 512 that indicates the currently active mode (i.e., program guide 502) and allows the viewer to pull down a mode menu 514 (see FIG. 17A). Program guide 502 also includes a date area 516 that indicates the date reflected in program matrix 506 and allows the viewer to pull down a date submenu 518 to change the date. In other submodes, the submode menu will display options for ordering or displaying lists that are appropriately related to the submode. A proportional scroll bar 520 located to the left of program matrix 506 is visually proportional to the total information in program matrix 506 to provide visual feedback as the user vertically scrolls through matrix 506. In addition, scroll bar 520 may be used for large-scale movement through hundreds of channels/sources by navigating to bar 520 and then vertically moving bar 520. An exit area 522 allows the viewer to immediately exit back to the television by navigating to exit area 522 and clicking on the remote control device. A program area 526 depicts the currently tuned program and a preview window area 528 can be used for all types of promotional, descriptional, or contextual video or graphics, such as a short preview of the show that is currently being highlighted in show matrix 506. Preview window area 528 may also be interactional similar to the other areas of guide 502.

The program guide may also include a variety of additional areas to facilitate use of the television schedule system, present information to the viewer or advertise programs or other products. For example, a scrolling commercial message 524 may be located underneath program matrix 506 that advertises programs or products from program sponsors, etc. The viewer may navigate to message 524 to receive more information or to purchase the product or program.

This function of ordering items is not limited to videos. For example, the program may access other contextual linked services such as a commercial store, etc., to allow the purchaser to buy a wide variety of different services or goods directly or indirectly linked to a particular program. For example, an Info Menu for Monday Night Football may allow the viewer to scroll through submenus that allow the viewer to purchase Washington Redskins' caps, Minnesota Vikings' caps or any NFL cap. The viewer has a choice to follow a program's link back to the commercial area where a larger selection of items and services are available. A product like the cap above may lead the viewer directly to an NFL proshop, whereas a link to a movie on demand may lead back to a commercial film library.

FIG. 16B illustrates the television schedule system of the present invention in the channel guide mode. As shown, channel guide 504 is similar to program guide 502 except that it includes an information screen area 530 that is reversed from the information screen area 506 in the program guide. Thus, the viewer can scroll vertically to move forward and backward in time along one channel and horizontally to move from channel to channel.

Figure 17A:
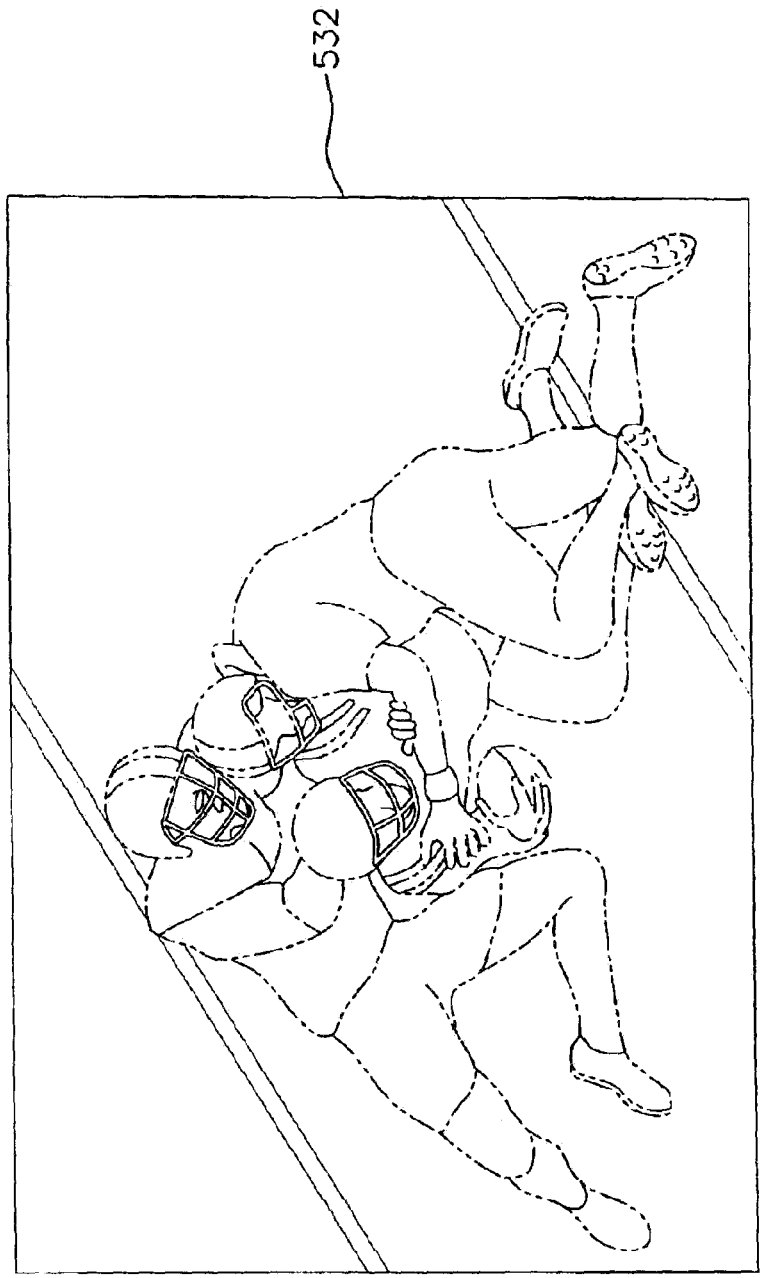
FIGS. 17A-17C are schematic views illustrating a method for selecting a program information menu, moving to the program guide of FIG. 16A and browsing through information menus from other programs.
Figure 17B:
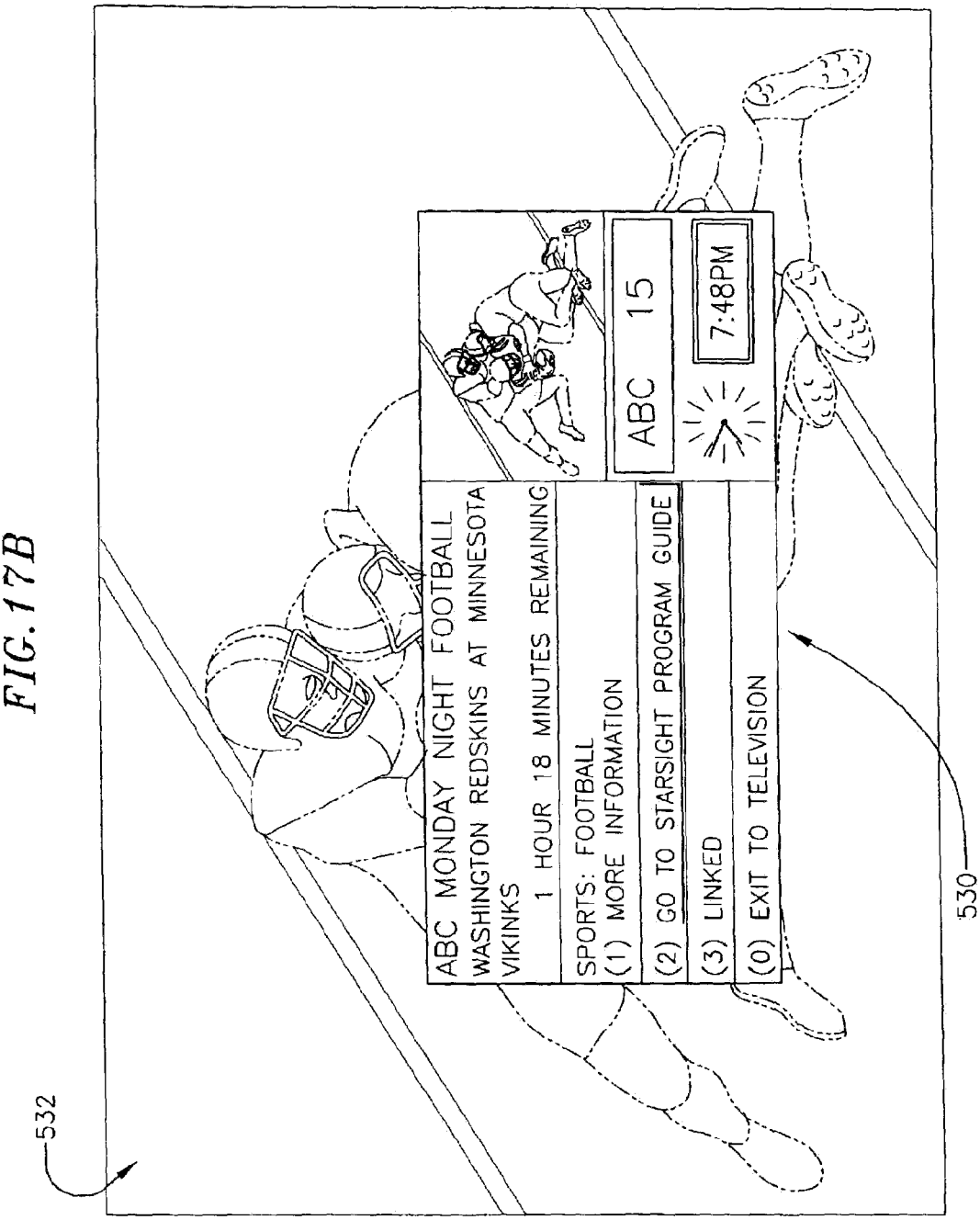
Figure 17C:
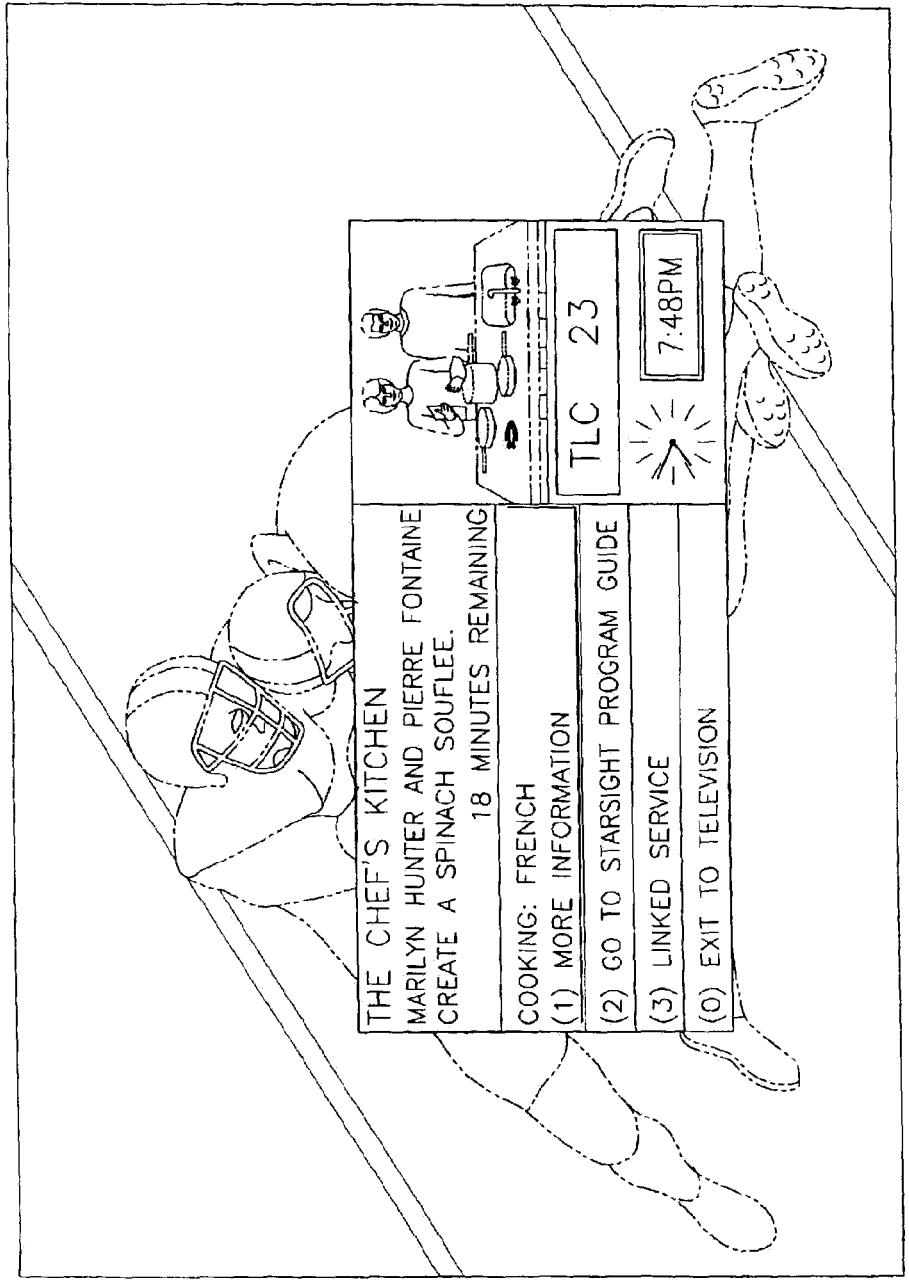

FIGS. 17A-17C illustrate a method of accessing program guide 502 from a currently tuned program and browsing through other currently tuned programs with remote control device 2. As shown in FIG. 17A the viewer is watching a television show on a display screen 532, such as a Monday Night Football game featuring the Washington Redskins versus the Minnesota Vikings. Clicking on the remote control device automatically causes a Program InfoMenu 530 to pop up on a portion of the television screen 532 (see FIG. 17B). Program InfoMenu 530 may allow the viewer to obtain more information about the currently tuned program, move to program guide 502, move to contextual linked services discussed below), or exit InfoMenu 530 back to the television show. The viewer may vertically scroll through these options upwards or downwards, and select one of the options. For example, clicking on the "Go to program guide" section immediately transfers the viewer to the program guide, as shown in FIG. 16A. To browse other currently tuned programs, the viewer employs suitable channel controls or other is input commands on the remote control device (not shown). As shown in FIG. 17C, the viewer may browse through other information menus while viewing the currently tuned program.

Figure 18A:
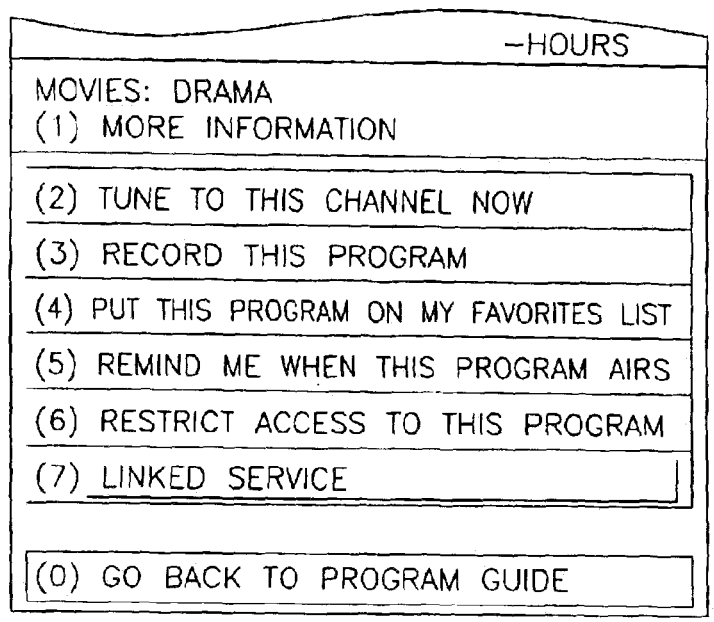
Figure 18B:
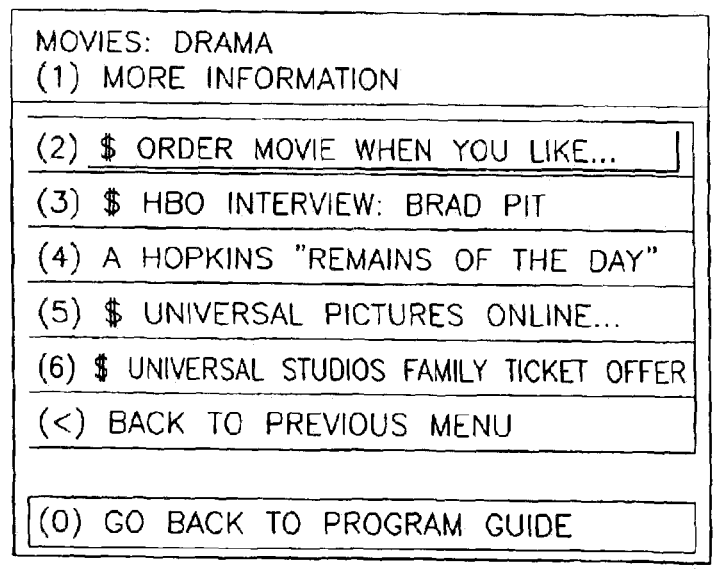
Figure 18E:
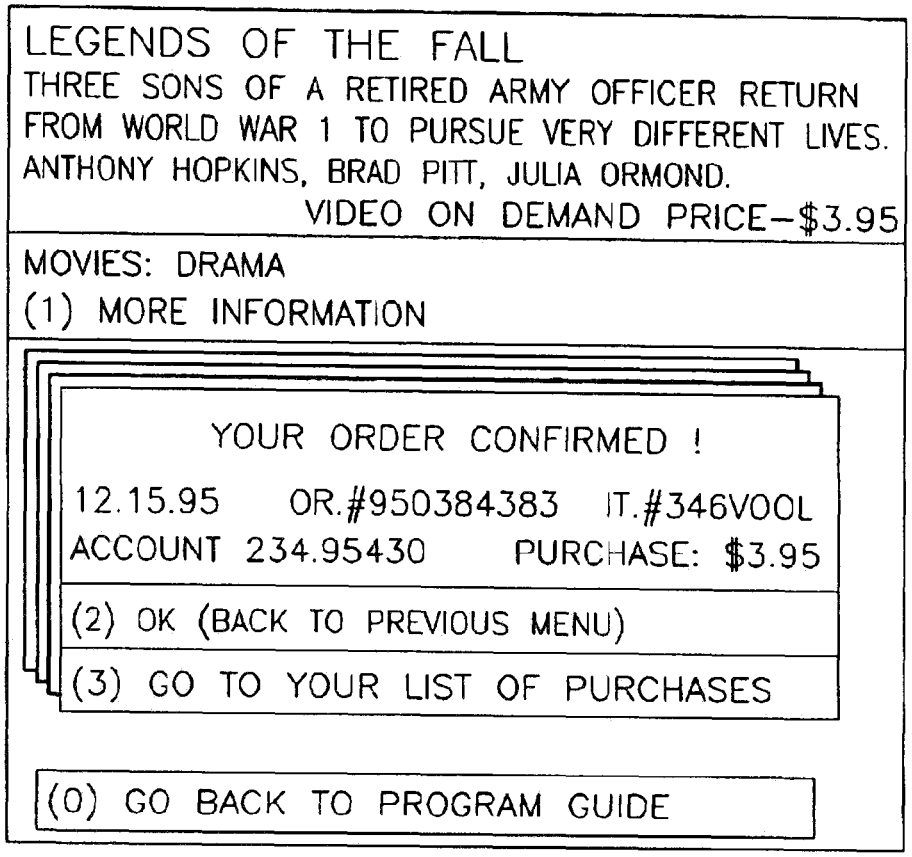

FIGS. 18A-18E illustrate a method of ordering video on demand with the system of the present invention. As shown in 18A, the viewer opens up the program's InfoMenu 530 and scrolls down to the "linked services" item. The viewer is then presented with an easily scrollable menu 562 of items and services associated with this program, as shown in FIG. 18B. Some, denoted with a dollar sign, are purchasable. Free items would be instantly accessible to the viewer. Here, the viewer may be prompted to a simple procedure to specify when the movie is to be delivered. When the viewer selects a particular service or item requiring a financial transaction, a purchasing sequence unfolds. As shown in FIG. 18C, the viewer is prompted to enter the master password/access code via the remote keypad or other means. For example, the viewer could swipe his or her credit card through a slot on the remote control device. If the password/access code is accepted, the viewer is given a final opportunity to review the purchase and/or either confirm or return to the previous item menu (see FIG. 18D): When the viewer confirms his or her purchase and/or order, a receipt 570 is shown (FIG. 18E). The viewer is given the choice of returning to the previous item menu or, as always, at the very bottom item "0", to return to the program guide.

Figure 19A:
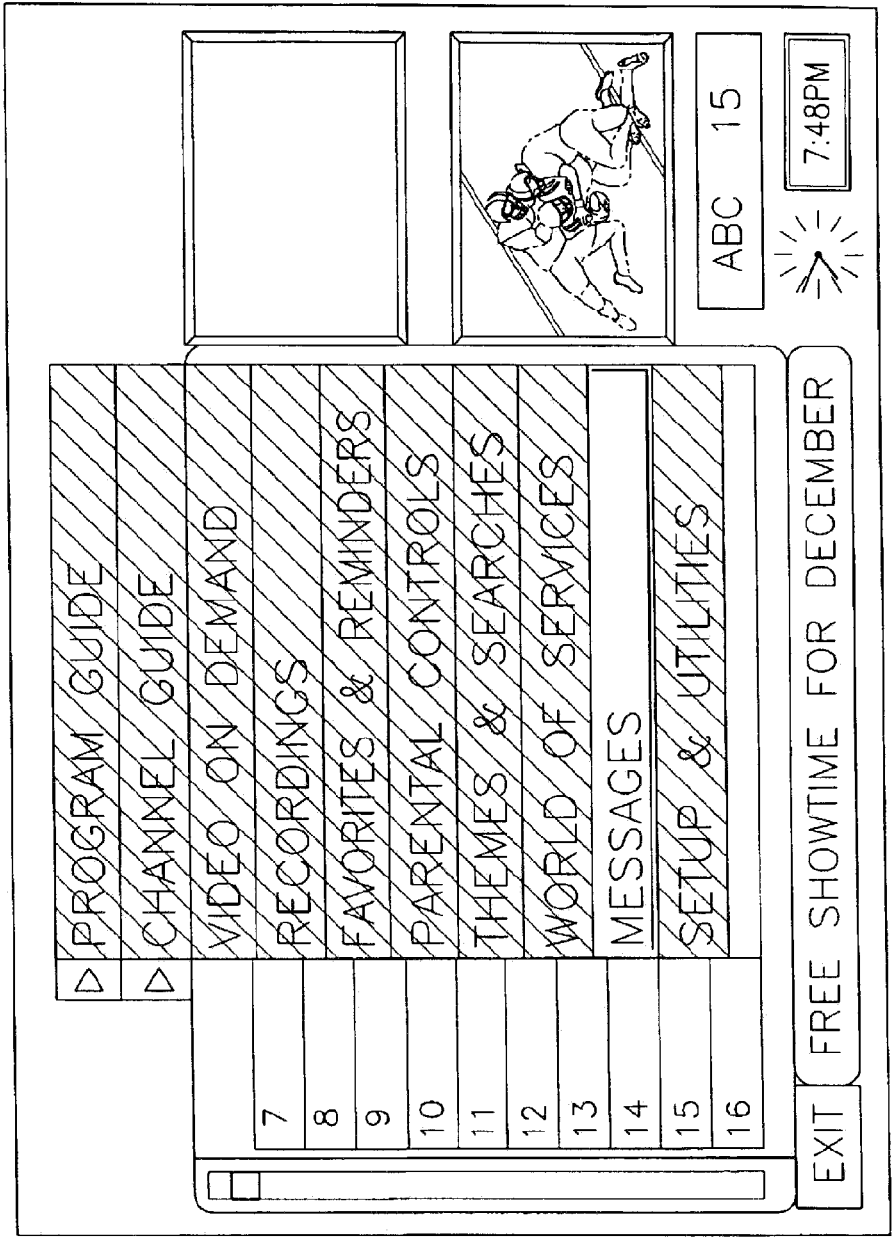
FIGS. 19A-19C illustrate a method for accessing and sending mail messages.
Figure 19B:
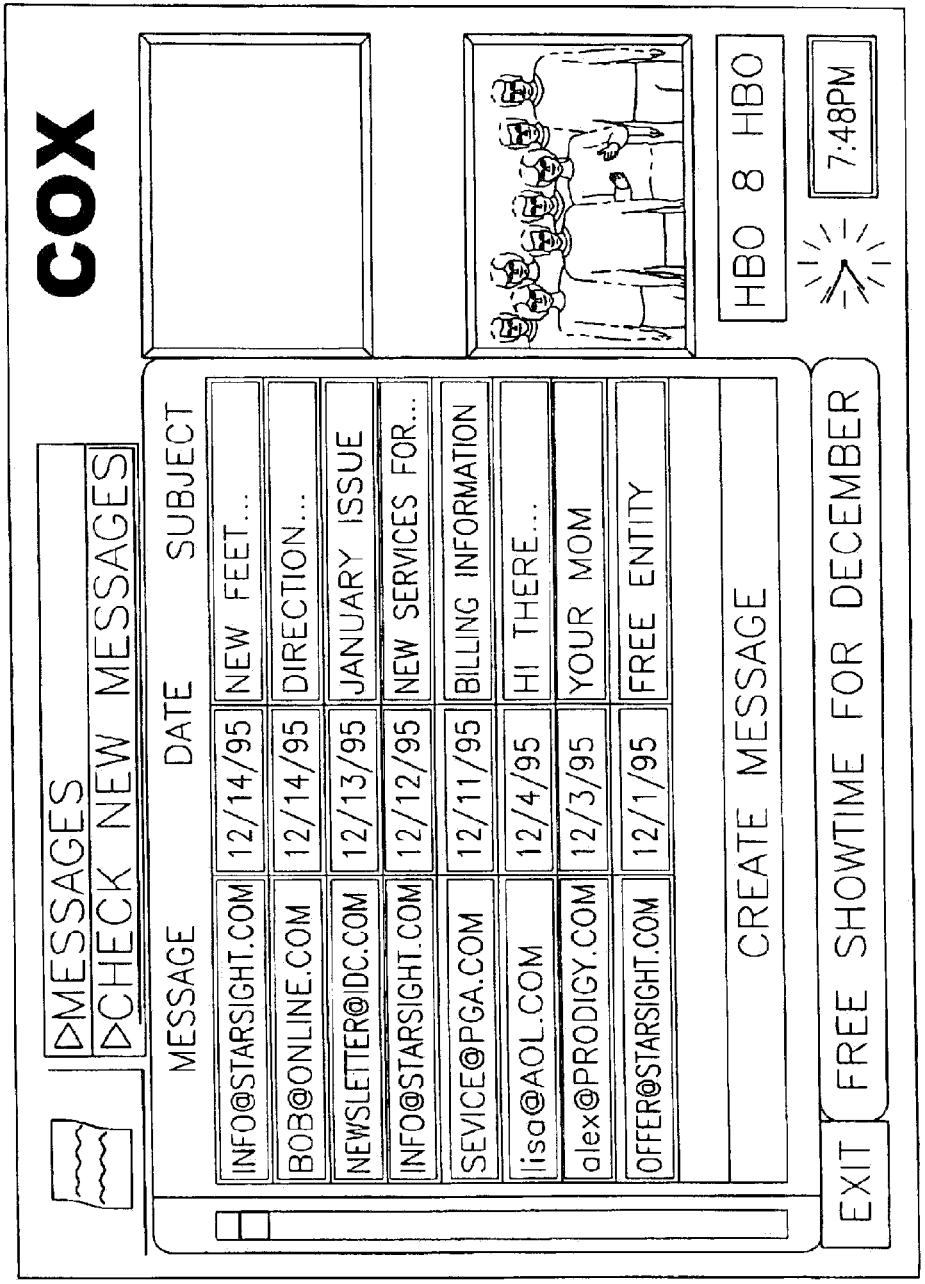
Figure 19C:
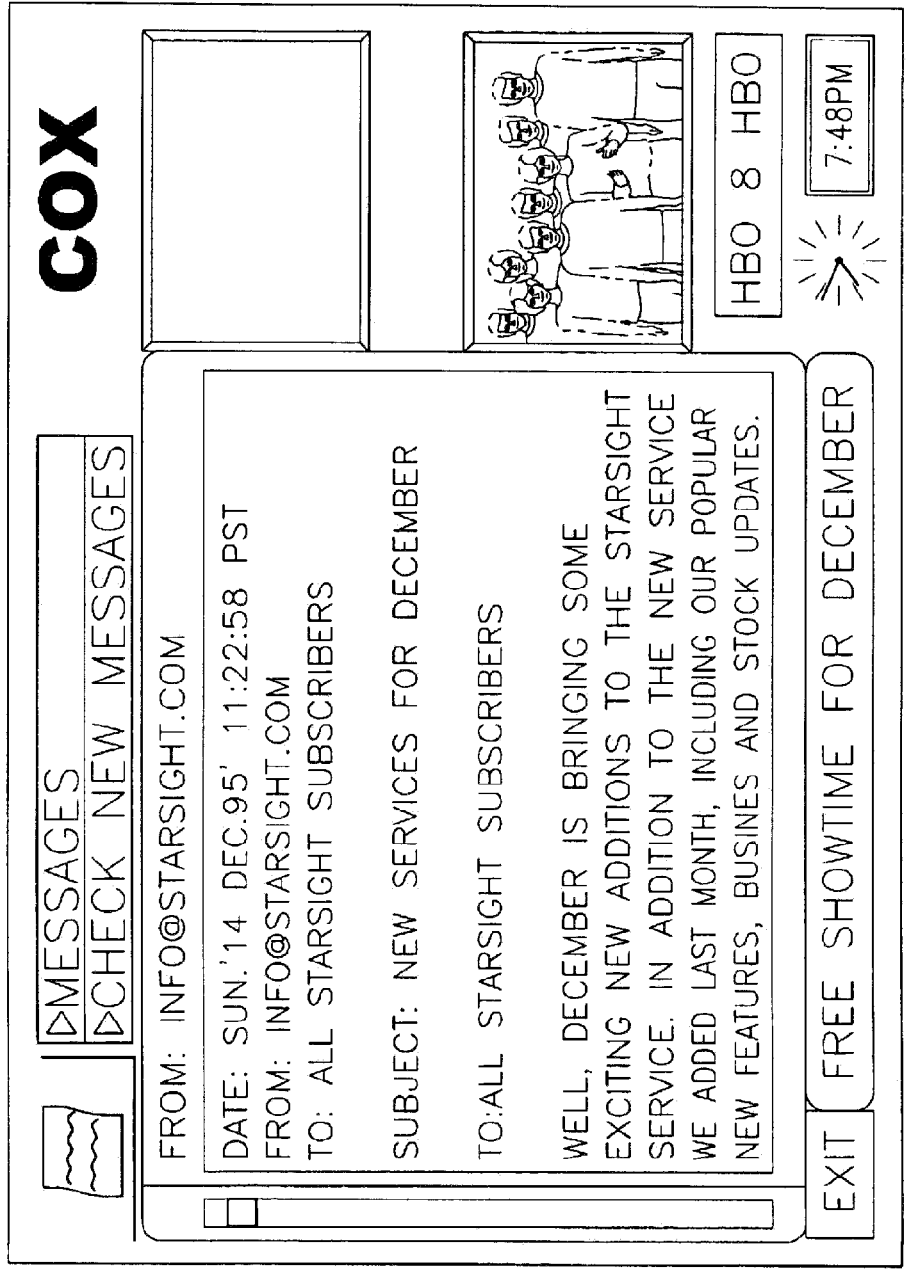

FIGS. 19A-19C illustrate another embodiment of the present invention in which the television viewer may accept incoming e-mail messages or send outgoing messages to other television viewers or users connected to the television schedule system, e.g., users on the Internet. As shown in FIG. 19A, the viewer scrolls down to the Messages window in the Mode menu and activates this window to enter a submode menu. To read incoming messages, the viewer scrolls down to the "Check new messages" cell and activates this cell to display messages that have been received. The Messages mode organizes incoming messages in order of date received and displays them in lists (see FIG. 19B). The viewer may then scroll to a particular message, as shown in FIG. 19C. To send outgoing messages, the viewer scrolls down to the to "Create message" cell and activates this cell to open up a blank window. A message may be created by inputting text on the input device, through voice activation via a microphone on the input device.

Figure 20A:
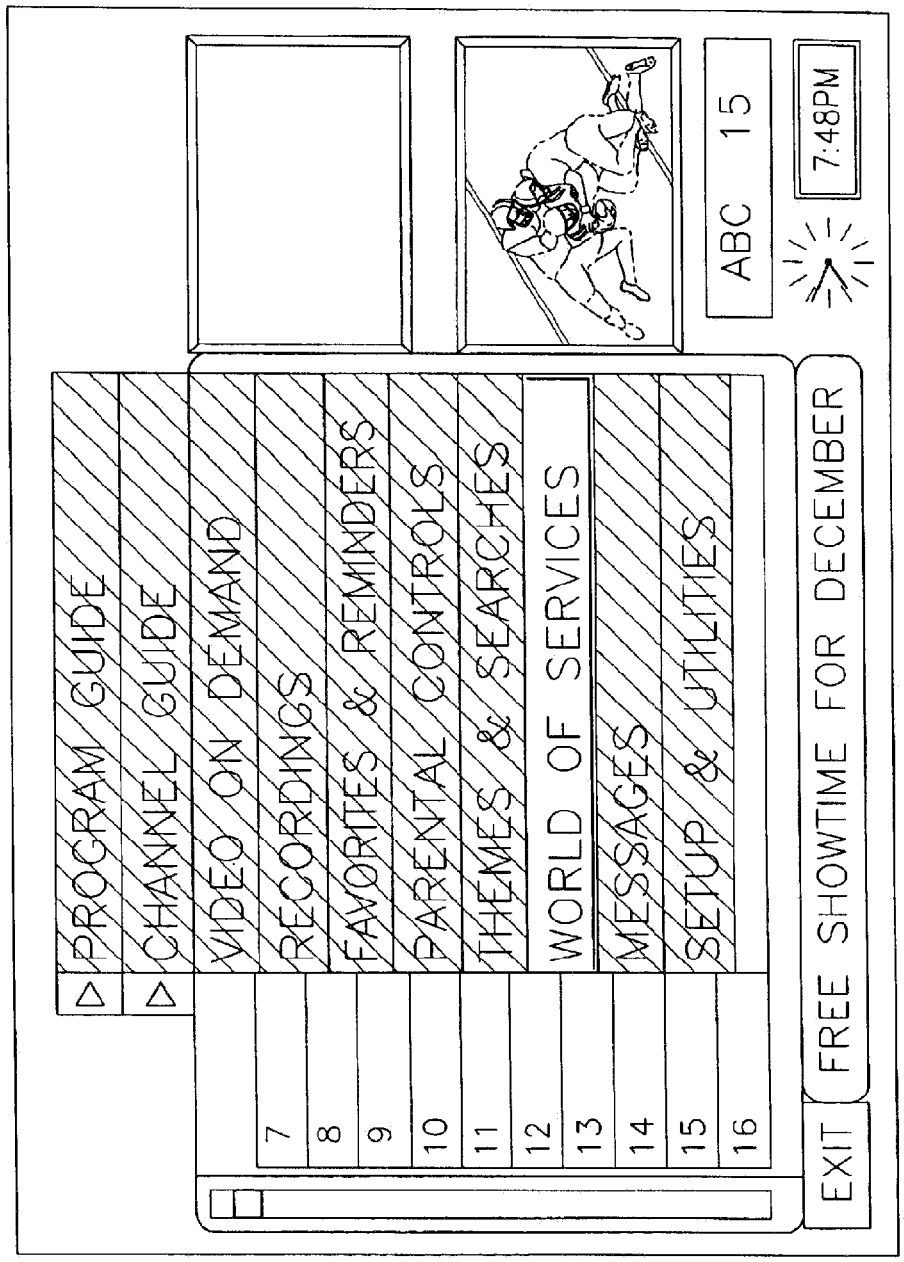
FIGS. 20A-20C illustrate a Services Menu and a method for accessing special services and for purchasing items.
Figure 20B:
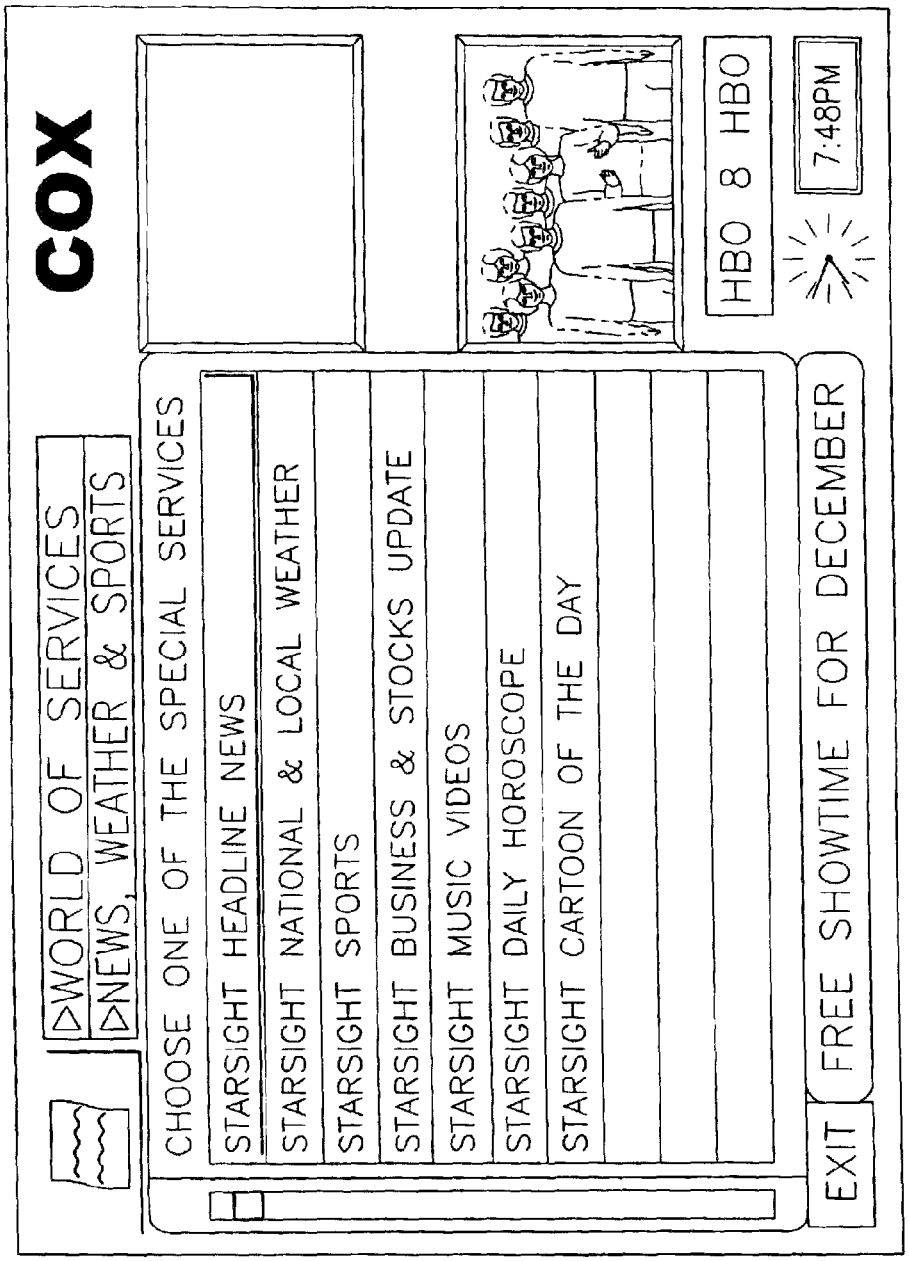
Figure 20C:
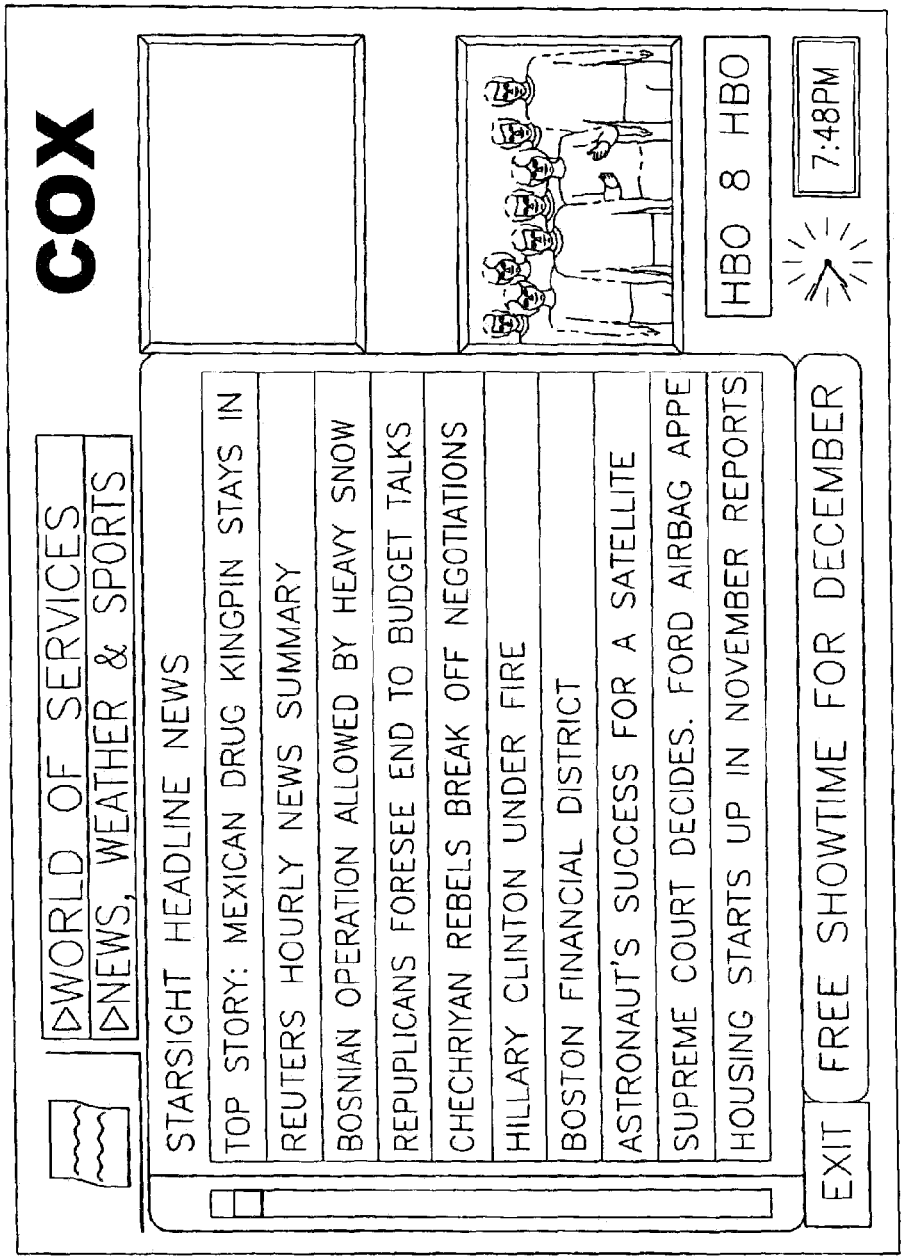

FIGS. 20A-20C illustrate a method of accessing a whole variety of other services to the Internet with the interactive television schedule system of the present invention. As discussed above, databases on the Internet may be accessed through a telephone line, cable modem or other means of communication. As shown in FIG. 20A, the user scrolls down to the world of services mode and clicks on this mode to obtain a submode that includes a variety of different services, such as news, weather and sports, previews and reviews of programs on the television schedule guide, a super mall for purchasing products and services related to the programs in the television schedule guide, or other products and services on the Internet or World Wide Web. As shown in FIG. 16C, the user has selected news, weather and sports, which opens up another menu involving a variety of special services, such as headline news, national and local weather, sports central, business and stock updates, music videos, daily horoscope, cartoon of the day and/or other services related to news, weather and sports. These services may be provided by a special database that is linked to the television system, to an on-line information provider, such as America On Line, Prodigy and the like, or with a search engine that searches network servers or databases on the Internet and World Wide Web. As shown, the user selects headline news which opens up another menu providing the user with a variety of news reports that may be accessed. The news reports may be viewed, printed out, or downloaded to the computer system that is attached to or an intricate part of the television system, (e.g., PCTV).

Figure 21A:
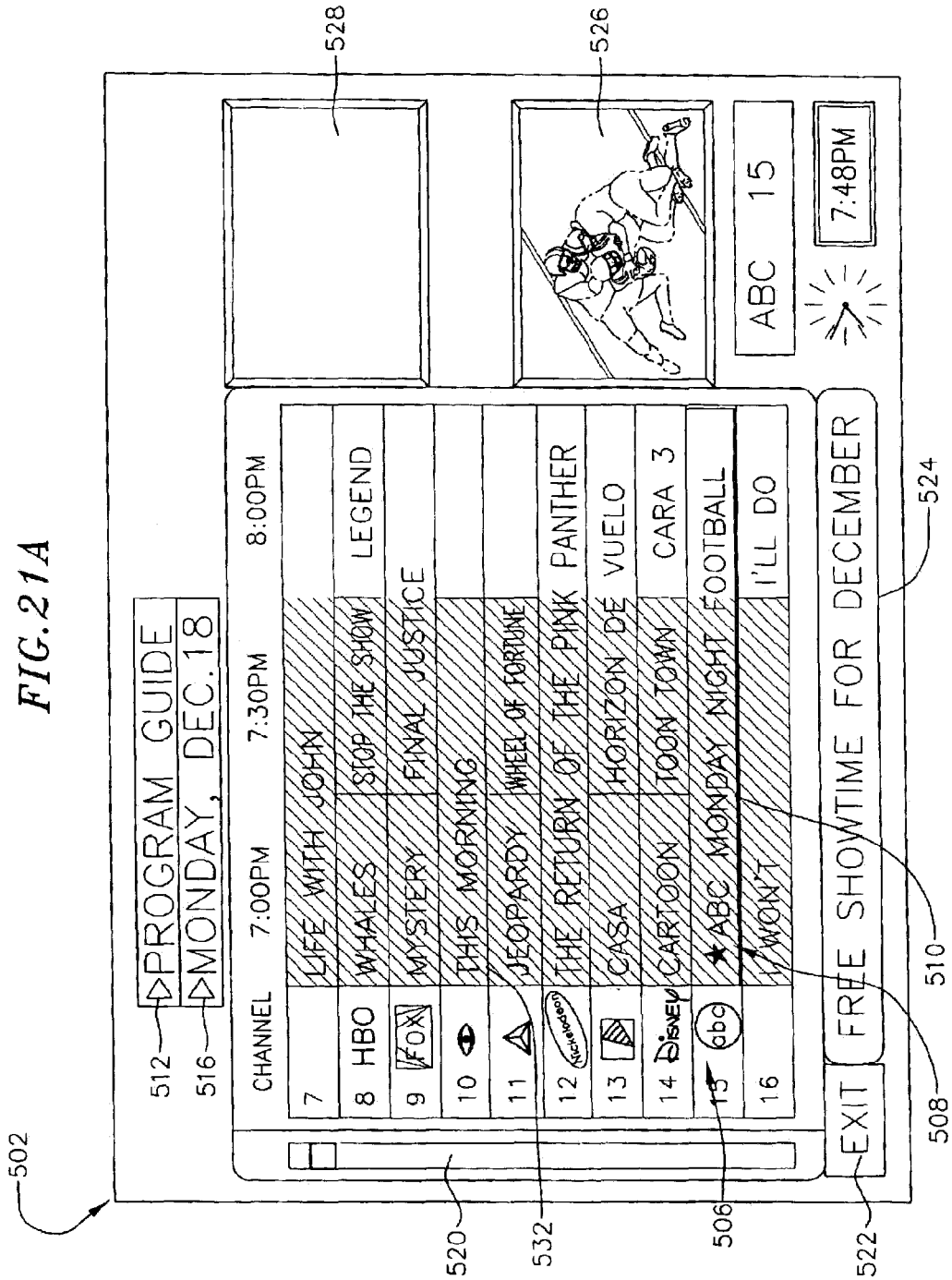
Figure 21B:
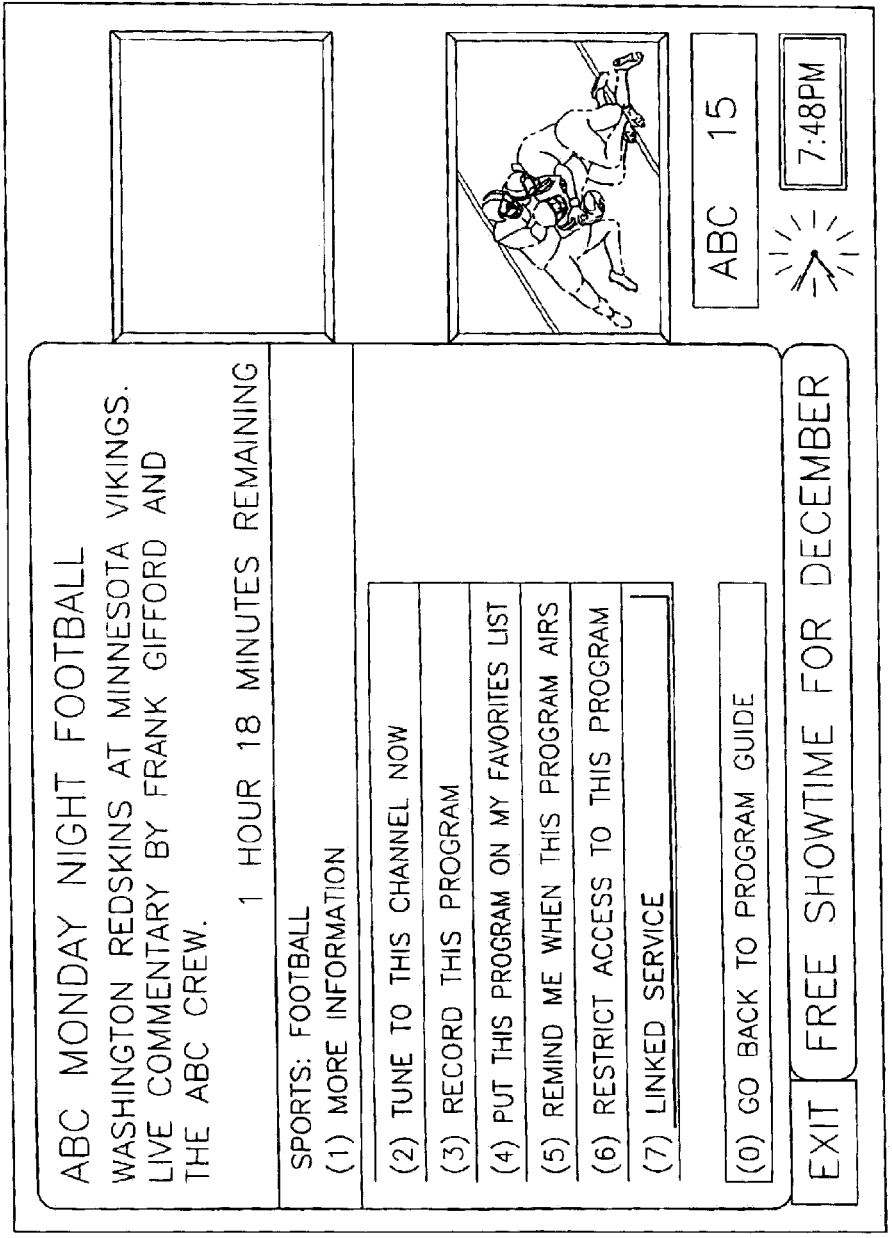
Figure 21C:
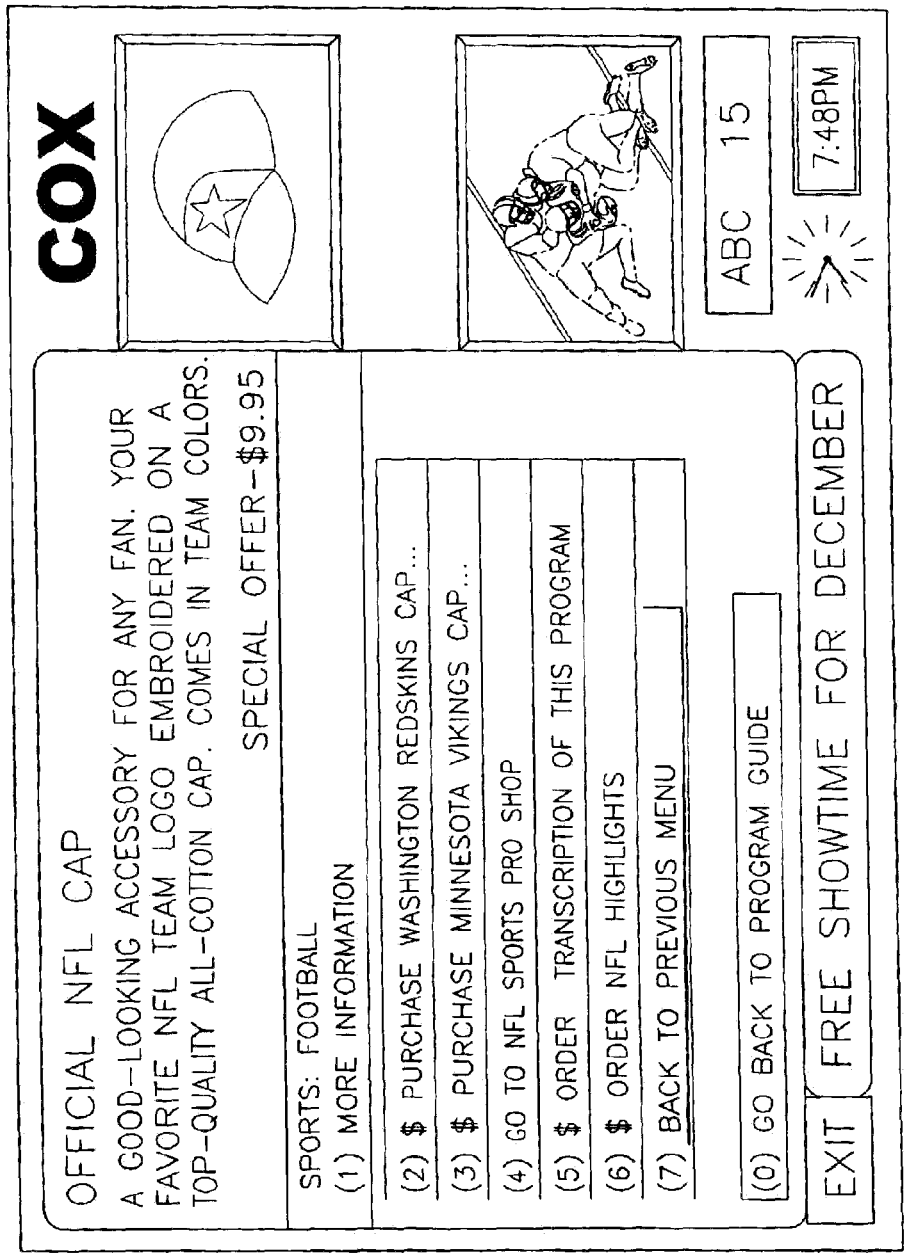
Figure 21E:
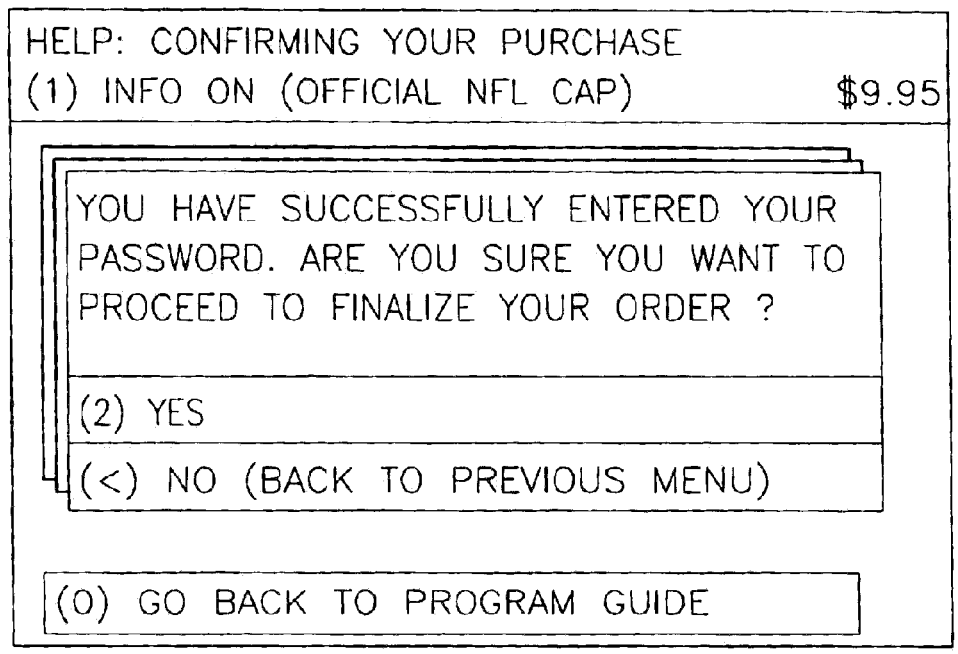

FIGS. 21A-21F illustrate a representative system and method for contextually linking related items and services to a particular program in the program guide 502. As shown in FIG. 21A, the viewer selects a particular program within guide 502, to access that program's info menu. Within the info menu, the viewer then scrolls to linked services and clicks on this window to move into a database that includes items and services contextually related to that particular program. In the example shown, the viewer has been watching a sport event featuring the Washington Redskins v. the Minnesota Vikings. The viewer is transferred to a window that provides a number of options for purchasing items and services related to that game, such as Washington Redskin or Minnesota Vikings paraphernalia, other NFL teams paraphernalia (in an to NFL sports pro shop), or highlights of other games between these two or, other teams. Alternatively, the viewer may order a tape/transcript of the program that is currently being shown on the guide. FIGS. 21C-21F illustrate a case in which the viewer has selected purchasing a Washington Redskin cap. The viewer inputs a password or other input identification, which is confirmed by the system. Alternatively, the viewer can simply swipe his or her credit card or other identification card through the remote control device or the television system to authorize the purchase of the Redskins' cap. The order is confirmed and the cap is delivered to the viewer's home.

Although the foregoing invention has been described in detail for purposes of clarity, it will be obvious that certain modifications may be practiced within the scope of the appended claims. For example, the viewer can automatically tune to a desired program or can select different programs for automatic recording. For more information on automatic tuning and automatic recording, see U.S. Pat. No. B1 4,706,121 and U.S. patent application Ser. No. 08/423,411; this patent and this patent application are, like the present patent application, assigned to Starsight Telecast, Inc. U.S. Pat. No. B1 4,706,121 and U.S. patent application Ser. No. 08/423,411 are hereby incorporated by reference in their entirety for all purposes.

It should be also noted that the present invention is not limited to a television schedule as shown in the enclosed figures. For example, in another embodiment of the invention, a program listing is provided that lists a series of television programs that are available for viewing. This listing can include, for example, a list of movies that are available in a movie library that can be accessed and viewed by the user (e.g., the Turner Classics Film Library or Pay-Per-View programs, such as sporting events or movies). Alternatively, the program listings can be related to digital programming. In this aspect of the invention, the television program is available to access or download for an extended period of time rather than being scheduled as a single live event. Thus, a digital archive of movies, program shows or previously played sporting events can be available to the user. This digital archive may be available through a database directly coupled to the electronic program guide, or on a remote database, such as the World Wide Web, Internet, or the like. In this embodiment, the television guide may be used to both: (1) show when the television programs are first available to the user (i.e., a schedule); and (2) list the shows that have been digitally recorded and, therefore, are available to the user at any time.

In one example of this embodiment, a Jerry Seinfeld fan can browse through a list of previously played Jerry Seinfeld episodes. The episodes can be arranged chronologically, by subject matter, or other convenient methods. Upon reaching one of the episodes in the list, the user may then find out more information about the episode, such as a brief abstract on the episode, when it was first made available to the public, etc. Alternatively, the user may contextually link with other databases, such as the Internet or World Wide Web, to find out more information about the program (e.g., chat with other Jerry Seinfeld fans, read reviews on that particular episode, etc) If the user wishes to play or record the episode, the user may do so by the methods described above.

What is claimed is:

1. An interactive media delivery system including a display screen comprising:
 a database local to a viewer for storing schedule information including information about media programs and a plurality of criteria associated with each media program;
 a microprocessor local to the viewer configured to automatically, without user intervention:
 generate a set of favorite criteria about media programs that the viewer would likely be interested in,
 search the database for identifying a media program that includes at least one of the favorite criteria,
 in response to identifying the media program that includes the at least one of the favorite criteria, automatically tag the identified media program that includes the at least one of the favorite criteria in the local database; and
 a recording device configured to automatically, without user intervention, and independently from the searching for identifying the media program that includes the at least one of the favorite criteria:
 search the database for identifying media programs with a tag, wherein during a same search two or more tagged media programs are identified, and
 store only a portion of video corresponding to the identified two or more media programs that also corresponds to the criterion, while refraining from storing any portion of the video corresponding to the identified two or more media programs that does not correspond to the criterion.

2. The interactive media delivery system of claim 1 further comprising a display controller for automatically displaying on the display screen a portion of the schedule information including the identified media programs in guide format.

3. The interactive media delivery system of claim 1 wherein the favorite criteria includes one or more of actor's name, director's name, type of program, other broadcast times, other broadcast sources, and program theme.

4. The interactive media delivery system of claim 1 wherein the microprocessor is configured to monitor and store the viewer's selections of media programs, and to heuristically learn the viewer's favorite criteria according to the viewer's selections of media programs.

5. The interactive media delivery system of claim 1 wherein the activated function includes automatically tuning to the tagged media programs at a scheduled telecast time.

6. The interactive media delivery system of claim 1 wherein the activated function includes automatically downloading a copy of the tagged media programs to a digital storage medium at a scheduled telecast time.

7. A method for identifying favorite media programs for a viewer in an interactive media delivery system having a display screen, the method comprising:
 storing media schedule information in a database local to the viewer including information about media programs and a plurality of criteria associated with each media program;
 automatically, without user intervention:
 generating a set of favorite criteria about media programs that the viewer would likely be interested in;
 searching the database for identifying a media program that includes at least one of the favorite criteria;
 in response to identifying the media program that includes the at least one of the favorite criteria, automatically tag the identified media program that includes the at least one of the favorite criteria in the local database; and
 automatically, without user intervention, and independently from the searching for identifying the media program that includes at least one of the favorite criteria:
 search the database for identifying media programs with a tag, wherein during a same search two or more tagged media programs are identified, and
 store only a portion of video corresponding to the identified two or more media programs that also corresponds to the criterion, while refraining from storing any portion of the video corresponding to the identified two or more media programs that does not correspond to the criterion.

8. The method of claim 7 further comprising automatically displaying on the display screen a portion of the schedule information including the identified media programs in guide format.

9. The method of claim 7 wherein the favorite criteria includes one or more of actor's name, director's name, type of program, other broadcast times, other broadcast sources, and program theme.

10. The method of claim 7 wherein the step of automatically generating a favorite criteria comprises monitoring and storing the viewer's selections of media programs, and heuristically learning the viewer's favorite criteria according to the viewer's selections of media programs.

11. The method of claim 7 wherein the step of activating a function of the interactive media delivery system comprises automatically tuning to the tagged media programs at a scheduled telecast time.

12. The method of claim 7 wherein the step of automatically activating a function of the interactive media delivery system comprises automatically downloading a copy of the tagged media programs to a digital storage medium at a scheduled telecast time.

13. An interactive media delivery system including a display screen comprising:
 means local to a viewer for storing media schedule information including information about media programs and a plurality of criteria associated with each media program; and
 means local to the viewer for automatically, without user intervention:
 generating a set of favorite criteria about media programs that the viewer would likely be interested in,
 searching the database for identifying a media program that includes at least one of the favorite criteria,
 tagging the identified media program stored in the local database that includes the at least one of the favorite criteria, and, in response to the automatic tagging; and
 means local to the viewer for automatically, without user intervention, and independently from the searching for identifying the media program that includes at least one of the favorite criteria:
 searching the database for identifying media programs with a tag, wherein during a same search two or more tagged media programs are identified, and storing only a portion of video corresponding to the identified two or more media programs that also corresponds to a criterion of the favorite criteria, while refraining from storing any portion of the video corresponding to the identified two or more media programs that does not correspond to the criterion.

14. The interactive media delivery system of claim 13 further comprising means for automatically displaying on the display screen a portion of the schedule information including the identified media programs in guide format.

15. The interactive media delivery system of claim 13 wherein the favorite criteria includes one or more of actor's name, director's name, and type of program.

16. The interactive media delivery system of claim 13 wherein the means for automatically generating a favorite criteria comprises means for monitoring and storing the viewer's selections of media programs, and heuristically learning the viewer's favorite criteria according to the viewer's selections of media programs.

17. A method comprising:
automatically, without user intervention:
generating a set of criteria associated with media assets that a viewer would likely be interested in;
searching to identify a media asset that is associated with a criterion of the set of criteria;
in response to identifying the media asset, automatically tagging metadata associated with the identified media asset; and
automatically, without user intervention, and independently from the searching to identify the identified media asset:
searching to locate media assets associated with tagged metadata, wherein during a same search two or more media assets that are associated with the tagged metadata are identified, and
storing only a portion of video corresponding to the identified two or more media assets that also corresponds to the criterion, while refraining from storing any portion of the video corresponding to the identified two or more media assets that does not correspond to the criterion.

18. The method of claim 17, wherein the invoked function comprises automatically causing the located media assets to be recorded.

19. The method of claim 17, wherein the invoked function comprises automatically causing a reminder associated with the located media assets to be set.

20. The method of claim 17, wherein the invoked function comprises automatically downloading a copy of the located media assets to a digital storage medium.

21. A system comprising a processor configured to:
automatically, without user intervention:
generate a set of criteria associated with media assets that a viewer would likely be interested in;
search to identify a media asset that is associated with a criterion of the set of criteria;
in response to identifying the media asset, automatically tag metadata associated with the identified media asset; and
automatically, without user intervention, and independently from the searching to identify the identified media asset:
search to locate media assets associated with tagged metadata, wherein during a same search two or more media assets that are associated with the tagged metadata are identified, and
store only a portion of video corresponding to the identified two or more media assets that also corresponds to the criterion, while refraining from storing any portion of the video corresponding to the identified two or more media assets that does not correspond to the criterion.

22. The system of claim 21, wherein the invoked function comprises automatically causing the located media assets to be recorded.

23. The system of claim 21, wherein the invoked function comprises automatically causing a reminder associated with the located media assets to be set.

24. The system of claim 21, wherein the invoked function comprises automatically downloading a copy of the located media assets to a digital storage medium.

* * * * *